US011222257B1

(12) United States Patent
Ko et al.

(10) Patent No.: US 11,222,257 B1
(45) Date of Patent: Jan. 11, 2022

(54) NON-DOT PRODUCT COMPUTATIONS ON NEURAL NETWORK INFERENCE CIRCUIT

(71) Applicant: Perceive Corporation, San Jose, CA (US)

(72) Inventors: Jung Ko, San Jose, CA (US); Kenneth Duong, San Jose, CA (US); Steven L. Teig, Menlo Park, CA (US)

(73) Assignee: PERCEIVE CORPORATION, San Jose, CA (US)

( * ) Notice: Subject to any disclaimer, the term of this patent is extended or adjusted under 35 U.S.C. 154(b) by 301 days.

(21) Appl. No.: 16/547,506

(22) Filed: Aug. 21, 2019

Related U.S. Application Data

(63) Continuation-in-part of application No. 16/120,387, filed on Sep. 3, 2018, now Pat. No. 10,740,434.

(60) Provisional application No. 62/886,888, filed on Aug. 14, 2019, provisional application No. 62/873,804, filed on Jul. 12, 2019, provisional application No. 62/853,128, filed on May 27, 2019, provisional application No. 62/797,910, filed on Jan. 28, 2019, provisional application No. 62/792,123, filed on Jan. 14, 2019, provisional application No. 62/773,162, filed on Nov. 29, 2018, provisional application No. 62/773,164, filed on Nov. 29, 2018, provisional application No. 62/753,878, filed on Oct. 31, 2018, provisional application No. 62/742,802, filed on Oct. 8, 2018, provisional application No. 62/724,589, filed
(Continued)

(51) Int. Cl.
*G06N 3/063* (2006.01)
*G06F 7/544* (2006.01)

(52) U.S. Cl.
CPC ........... *G06N 3/063* (2013.01); *G06F 7/5443* (2013.01)

(58) Field of Classification Search
CPC .............................. G06F 7/5443; G06N 3/063
See application file for complete search history.

(56) References Cited

U.S. PATENT DOCUMENTS

| 5,956,703 A | 9/1999 | Turner et al. |
| 9,904,874 B2 | 2/2018 | Shoaib et al. |

(Continued)

OTHER PUBLICATIONS

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

(Continued)

*Primary Examiner* — Michael D. Yaary
(74) *Attorney, Agent, or Firm* — Adeli LLP

(57) ABSTRACT

Some embodiments provide a neural network inference circuit (NNIC) for executing a neural network. The NNIC includes a first circuit that outputs dot products for computation nodes of a first set of neural network layers, that include dot product computations of sets of weight values with sets of input values. The NNIC also includes a second circuit that outputs values for computation nodes of a second set of neural network layers, that apply a set of calculations that do not include dot products to sets of input values. The NNIC also includes a selection circuit that selects a dot product output from the first circuit when a current layer being processed by the NNIC belongs to the first set of layers, and selects a non-dot product output from the second circuit when the current layer belongs to the second set of layers.

20 Claims, 27 Drawing Sheets

Related U.S. Application Data on Aug. 29, 2018, provisional application No. 62/660,914, filed on Apr. 20, 2018.

(56) References Cited

U.S. PATENT DOCUMENTS

| | | | |
|---|---|---|---|
| 2004/0078403 | A1 | 4/2004 | Scheuermann et al. |
| 2017/0011288 | A1 | 1/2017 | Brothers et al. |
| 2018/0018559 | A1 | 1/2018 | Yakopcic et al. |
| 2018/0046900 | A1 | 2/2018 | Dally et al. |
| 2018/0114569 | A1 | 4/2018 | Strachan et al. |
| 2018/0121796 | A1 | 5/2018 | Deisher et al. |
| 2018/0197068 | A1 | 7/2018 | Narayanaswami et al. |
| 2018/0246855 | A1 | 8/2018 | Redfern et al. |
| 2018/0293493 | A1* | 10/2018 | Kalamkar ............ G06N 3/0445 |
| 2018/0293691 | A1 | 10/2018 | Nurvitadhi et al. |
| 2018/0300600 | A1* | 10/2018 | Ma ..................... G06N 3/063 |
| 2018/0307494 | A1 | 10/2018 | Ould-Ahmed-Vall et al. |
| 2018/0307950 | A1 | 10/2018 | Nealis et al. |
| 2018/0315158 | A1 | 11/2018 | Nurvitadhi et al. |
| 2019/0026078 | A1 | 1/2019 | Bannon et al. |
| 2019/0114499 | A1 | 4/2019 | Delaye et al. |
| 2019/0171927 | A1 | 6/2019 | Diril et al. |
| 2019/0187983 | A1 | 6/2019 | Ovsiannikov et al. |
| 2019/0205358 | A1 | 7/2019 | Diril et al. |
| 2019/0205736 | A1 | 7/2019 | Bleiweiss et al. |
| 2019/0236445 | A1 | 8/2019 | Das et al. |
| 2019/0303749 | A1 | 10/2019 | Appuswamy et al. |
| 2019/0325296 | A1 | 10/2019 | Fowers et al. |
| 2020/0134461 | A1 | 4/2020 | Chai et al. |
| 2020/0249996 | A1 | 8/2020 | Addepalli et al. |

OTHER PUBLICATIONS

Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Fu, Yao, et al., "Embedded Vision with INT8 Optimization on Xilinx Devices," WP490 (v1.0.1), Apr. 19, 2017, 15 pages, Xilinx, Inc., San Jose, CA, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Moons, Bert, et al., "Envision: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.

Moshovos, Andreas, et al., "Exploiting Typical Values to Accelerate Deep Learning," Computer, May 24, 2018, 13 pages, vol. 51—Issue 5, IEEE Computer Society, Washington, D.C.

Non-Published Commonly Owned U.S. Appl. No. 16/547,505, filed Aug. 21, 2019, 102 pages, Perceive Corporation.

Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.

Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.

Zhang, Shijin, et al., "Cambricon-X: An Accelerator for Sparse Neural Networks," 2016 49th Annual IEEE/ACM International Symposium on Microarchitecture (MICRO '16), Oct. 15-19, 2016, 12 pages, IEEE, Taipei, Taiwan.

* cited by examiner

2400

| PPU | alu_a | alu_b | alu_c | alu_d |
|---|---|---|---|---|
| 16 | alu0[16] | alu2[16] | alu1[0] | alu1[1:0] |
| 17 | alu0[17] | alu2[17] | alu1[1] | alu1[3:2] |
| 18 | alu0[18] | alu2[18] | alu1[2] | alu1[5:4] |
| 19 | alu0[19] | alu2[19] | alu1[3] | alu1[7:6] |
| 20 | alu0[20] | alu2[20] | alu1[4] | alu1[9:8] |
| 21 | alu0[21] | alu2[21] | alu1[5] | alu1[11:10] |
| 22 | alu0[22] | alu2[22] | alu1[6] | alu1[13:12] |
| 23 | alu0[23] | alu2[23] | alu1[7] | alu1[15:14] |
| 24 | alu0[24] | alu2[24] | alu1[8] | alu1[17:16] |
| 25 | alu0[25] | alu2[25] | alu1[9] | alu1[19:18] |
| 26 | alu0[26] | alu2[26] | alu1[10] | alu1[21:20] |
| 27 | alu0[27] | alu2[27] | alu1[11] | alu1[23:22] |
| 28 | alu0[28] | alu2[28] | alu1[12] | alu1[25:24] |
| 29 | alu0[29] | alu2[29] | alu1[13] | alu1[27:26] |
| 30 | alu0[30] | alu2[30] | alu1[14] | alu1[29:28] |
| 31 | alu0[31] | alu2[31] | alu1[15] | alu1[31:30] |

| PPU | alu_a | alu_b | alu_c | alu_d |
|---|---|---|---|---|
| 0 | alu0[0] | alu2[0] | alu0[0] | alu0[1:0] |
| 1 | alu0[1] | alu2[1] | alu0[1] | alu0[3:2] |
| 2 | alu0[2] | alu2[2] | alu0[2] | alu0[5:4] |
| 3 | alu0[3] | alu2[3] | alu0[3] | alu0[7:6] |
| 4 | alu0[4] | alu2[4] | alu0[4] | alu0[9:8] |
| 5 | alu0[5] | alu2[5] | alu0[5] | alu0[11:10] |
| 6 | alu0[6] | alu2[6] | alu0[6] | alu0[13:12] |
| 7 | alu0[7] | alu2[7] | alu0[7] | alu0[15:14] |
| 8 | alu0[8] | alu2[8] | alu0[8] | alu0[17:16] |
| 9 | alu0[9] | alu2[9] | alu0[9] | alu0[19:18] |
| 10 | alu0[10] | alu2[10] | alu0[10] | alu0[21:20] |
| 11 | alu0[11] | alu2[11] | alu0[11] | alu0[23:22] |
| 12 | alu0[12] | alu2[12] | alu0[12] | alu0[25:24] |
| 13 | alu0[13] | alu2[13] | alu0[13] | alu0[27:26] |
| 14 | alu0[14] | alu2[14] | alu0[14] | alu0[29:28] |
| 15 | alu0[15] | alu2[15] | alu0[15] | alu0[31:30] |

*Figure 24A*

| PPU | alu_a | alu_b | alu_c | alu_d |
|---|---|---|---|---|
| 32 | alu1[0] | alu3[0] | alu2[0] | alu2[1:0] |
| 33 | alu1[1] | alu3[1] | alu2[1] | alu2[3:2] |
| 34 | alu1[2] | alu3[2] | alu2[2] | alu2[5:4] |
| 35 | alu1[3] | alu3[3] | alu2[3] | alu2[7:6] |
| 36 | alu1[4] | alu3[4] | alu2[4] | alu2[9:8] |
| 37 | alu1[5] | alu3[5] | alu2[5] | alu2[11:10] |
| 38 | alu1[6] | alu3[6] | alu2[6] | alu2[13:12] |
| 39 | alu1[7] | alu3[7] | alu2[7] | alu2[15:14] |
| 40 | alu1[8] | alu3[8] | alu2[8] | alu2[17:16] |
| 41 | alu1[9] | alu3[9] | alu2[9] | alu2[19:18] |
| 42 | alu1[10] | alu3[10] | alu2[10] | alu2[21:20] |
| 43 | alu1[11] | alu3[11] | alu2[11] | alu2[23:22] |
| 44 | alu1[12] | alu3[12] | alu2[12] | alu2[25:24] |
| 45 | alu1[13] | alu3[13] | alu2[13] | alu2[27:26] |
| 46 | alu1[14] | alu3[14] | alu2[14] | alu2[29:28] |
| 47 | alu1[15] | alu3[15] | alu2[15] | alu2[31:30] |
| 48 | alu1[16] | alu3[16] | alu3[0] | alu3[1:0] |
| 49 | alu1[17] | alu3[17] | alu3[1] | alu3[3:2] |
| 50 | alu1[18] | alu3[18] | alu3[2] | alu3[5:4] |
| 51 | alu1[19] | alu3[19] | alu3[3] | alu3[7:6] |
| 52 | alu1[20] | alu3[20] | alu3[4] | alu3[9:8] |
| 53 | alu1[21] | alu3[21] | alu3[5] | alu3[11:10] |
| 54 | alu1[22] | alu3[22] | alu3[6] | alu3[13:12] |
| 55 | alu1[23] | alu3[23] | alu3[7] | alu3[15:14] |
| 56 | alu1[24] | alu3[24] | alu3[8] | alu3[17:16] |
| 57 | alu1[25] | alu3[25] | alu3[9] | alu3[19:18] |
| 58 | alu1[26] | alu3[26] | alu3[10] | alu3[21:20] |
| 59 | alu1[27] | alu3[27] | alu3[11] | alu3[23:22] |
| 60 | alu1[28] | alu3[28] | alu3[12] | alu3[25:24] |
| 61 | alu1[29] | alu3[29] | alu3[13] | alu3[27:26] |
| 62 | alu1[30] | alu3[30] | alu3[14] | alu3[29:28] |
| 63 | alu1[31] | alu3[31] | alu3[15] | alu3[31:30] |

*Figure 24B*

NON-DOT PRODUCT COMPUTATIONS ON NEURAL NETWORK INFERENCE CIRCUIT

BACKGROUND

In a typical neural network, a standard computation is a dot product between input values (activations) and weight values. A typical way for an integrated circuit to compute these weight values is to use multiply-accumulate (MAC) circuits that repeatedly perform the multiplication of an input value by a weight value, add that to an existing partial dot product, and store the new partial dot product. However, this requires numerous clock cycles, as each term in the dot product computed by a MAC uses a separate cycle. In addition, the storage of each intermediate term requires the use of memory (contributing to both slowing down of the computation and use of resources for the read/write operations). Accordingly, techniques for parallelization without massively expanding the surface area of the circuit are required.

BRIEF SUMMARY

Some embodiments provide an integrated circuit (IC) for implementing a machine-trained network (e.g., a neural network). The IC of some embodiments includes a set of input processing circuits, a neural network computation fabric that can be configured to apply a neural network to an input value, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

In some embodiments, at startup of the IC, the microprocessor loads neural network configuration data (e.g., weight values, scale and bias parameters, etc.) from off-chip storage and generates instructions for the neural network computation fabric to write the neural network parameters to memory. In addition, the microprocessor loads the neural network program instructions for the computation fabric to its own memory. These instructions are applied by the computation fabric to input data (e.g., images, audio clips, etc.) in order to execute the neural network. The instructions include, e.g., the memory locations to which input values are written, configuration data specifying how to compute specific neural network nodes, etc. Upon receiving input data (e.g., from a sensor on a device that incorporates the IC), the microprocessor provides neural network program instructions to the computation fabric. Once the final output of the neural network is computed, the fabric provides this output back to the microprocessor, so that the microprocessor (or other circuitry on the device) can evaluate this output and perform any actions based on the output.

The microprocessor executes a controller, in some embodiments, that provides the neural network instructions to the computation fabric. Some embodiments provide these instructions to the computation fabric incrementally. For instance, in some embodiments, the system controller on the microprocessor initially loads the instructions for the first layer (or a first portion of the first layer) of the neural network, then waits for a signal from the fabric indicating that these instructions have been completed. Once the first portion of the network is completed by the fabric, the system controller provides the fabric with the instructions for the second portion (either a second portion of the first layer, or the second layer of the network), and so on until the network has been fully executed.

As mentioned, the neural network computation fabric includes numerous cores as well as a global channel that connects the cores, with the various data processing circuits configured by the hierarchical set of control circuits. These data processing circuits operate to compute neural network operations in an efficient, low-power manner, according to the configuration data provided by the control circuits. In some embodiments, the global channel is divided conceptually into interconnected segments, with each segment corresponding to a cluster of cores.

A typical neural network operates in layers, with each layer including numerous nodes. Examples of neural networks include feed-forward neural networks, regulatory feedback networks, radial basis function networks, recurrent networks, etc. In convolutional neural networks (a type of feed-forward network), a majority of the layers include computation nodes with both a linear function followed by a non-linear activation function (applied to the result of the linear function). The linear function is a dot product of input values (either the initial inputs based on the input data for the first layer, or outputs of the previous layer for subsequent layers) and predetermined (trained) weight values, along with bias (addition) and scale (multiplication) terms, which are also predetermined based on training. As such, for convolutional neural networks, the dot products are the primary computation that uses the most circuit resources.

The neural network computation circuit of some embodiments computes numerous neural network nodes simultaneously, with the computation for one node spread across multiple cores (and subsequently the global channel). That is, each of several cores of the computation fabric computes a partial dot product from a subset of the input values and weight values for the node. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

For a dot product computed across more than one core, these multiple cores compute partial dot products and provide these partial dot products to the global channel. In the simplest case, all of the partial dot products for a given computation node are computed in the same clock cycle and provided at the same time to the global channel. In some cases, however (e.g., for dot products with a very large number of terms), each core computes more than one partial dot product, requiring multiple clock cycles. Based on configuration data specifying which outputs from the cores are to be added together (and whether multiple partial dot products are required from the same core), the global channel aggregates these partial dot products to compute the complete dot product for each node, then applies various post-processing functions (e.g., the bias, scale, and non-linear activation functions) to compute the output of each node.

In some embodiments, each segment of the global channel includes a dot product bus, a set of post-processing circuits, and an output bus. The dot product bus, in some embodiments, includes a number of independent dot product bus lanes that each receives partial dot products from the cores, aggregates these dot products together, and provides the aggregated dot products to the post-processing circuits. In some embodiments, configuration data from the control circuitry specifies to which post-processing unit each aggregated dot product is sent. Each lane of the dot product bus spans all of the channel segments, each of which aggregates the partial dot products from its own cores. These aggregated values are then aggregated together further by additional circuits of the dot product bus lane, and configuration data specifies whether to pass the aggregated dot products in one direction of the segment or the other, or whether that segment is the final aggregator for the dot product (in which case that aggregated dot product is provided to a post-processing unit in that segment).

In some embodiments, each segment includes the same number of post-processing units as dot product bus lanes, with each post-processing unit receiving the output of a different dot product bus lane as its primary input. The post-processing units, as mentioned, perform the non-dot product functions of the neural network nodes. For a typical computation node of a convolutional (or fully-connected) layer, this includes a bias factor, a scaling factor, and a non-linear activation function. In some embodiments, the outputs of the linear function are quantized or truncated to a particular number of bits (e.g., 4 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design.

The non-linear activation function, in some embodiments, is implemented as a lookup table rather than a hardwired function. This enables the IC to execute different neural networks that use different activation functions and, in some embodiments, allows for different activation functions to be used in different layers of the neural network. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function.

In addition to these operations, in some embodiments the post-processing units include additional circuitry for (i) performing additional dot product operations if required and (ii) performing operations for neural network computation nodes that do not use dot products. The post-processing units of some embodiments each have the ability to combine dot products from two separate cycles if a dot product is too large to be computed in a single cycle across the cores of the computation fabric. In addition, if a particular filter slice needs to be split across multiple partial dot product computation circuits (because of too many non-zero weight values, as described in greater detail below), the post-processing unit is configured to account for that. Furthermore, some embodiments enable dot products to be double the size of the standard quantized output (e.g., 8-bit rather than 4-bit) by using dot products from multiple cycles and bit-shifting the first set of input data.

As mentioned, in some embodiments the post-processing units also include additional circuitry for performing operations for neural network computation nodes that do not use dot products. For example, a convolutional neural network will typically include pooling layers that reduce the number of activations by performing a computation on spatially-proximate groups of input values (i.e., the outputs of spatially-proximate nodes). Typical pooling operations include average pooling (reducing a group of inputs to a single output value by computing the average of the inputs) and max pooling (reducing a group of inputs to a single output value by selecting the maximum value of the inputs). Element-wise operations, in some embodiments, use inputs from multiple layers that are the same shape (i.e., that have the same number of inputs arranged in the same manner) and add or multiply the corresponding elements from those layers. In some of these embodiments, the cores provide input values directly to the post-processing units without computing dot products, and the post-processing units are configured to perform the appropriate operations on these inputs.

The output bus carries the computation node outputs from the post-processing units back to the cores, to be stored in the memory of the core and used as inputs for the next layer of neural network computation nodes. In some embodiments, the output values may be computed by post-processing units in one cluster but carried to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value.

As mentioned, to compute output values for a set of computation nodes, the cores compute partial dot products in parallel that are provided to the dot product bus of the local channel segment. In some embodiments, the cores include memory that stores the weight values and input values, an input buffer into which input values are loaded for the partial dot product computations, a set of weight value buffers into which weight values are loaded for the partial dot product computations, a controller or set of controller circuits for (i) writing input values and weight values into the memory (e.g., upon receipt of the input values from the output bus as output values of a previous set of computation nodes) and (ii) loading the input values and weight values from memory into the respective buffers, and a set of partial dot product computation circuits.

In some embodiments, the number of partial dot product computation circuits in each core is equal to (i) the number of weight value buffers in the core (or half of the number of weight value buffers, if primary and secondary buffers are used), (ii) the number of independent lanes of the dot product bus, (iii) the number of post-processing units of each segment of the global channel, and (iv) the number of independent lanes of the output bus. Thus, for a typical neural network computation node, the partial dot products computed by the partial dot product computation circuits having a particular index are aggregated by the dot product bus lane with the same index, that aggregated dot product is provided for post-processing to one of the post-processing units with the same index (i.e., the post-processing unit with that index in one of the channel segments), and the computation node output value generated by the post-processing unit with that index is delivered back to one of the cores via the output write bus lane with the same index).

As mentioned, each core includes one input value buffer and numerous weight value buffers in some embodiments. In convolutional neural networks, a set of input values are used as the inputs to a number of different nodes, and each layer has numerous different filters (sets of weight values). For parallelization within the cores, such a set of input values are loaded into the input value buffers of the cores used to compute the dot product for a node (by computing partial dot products that are then aggregated), while the weight values for each of these different nodes are loaded into the weight value buffers (for a node computed across multiple cores, the weight values for a given node are loaded into the weight value buffers with the same index in each of the cores). The partial dot product computation circuits corresponding to these weight value buffers then simultaneously compute the partial dot product computations for the loaded input values.

In some embodiments, the weight values for each layer of the network are ternary values (e.g., each weight is either zero, a positive value, or the negation of the positive value), with at least a fixed percentage (e.g., 75%) of the weight values being zero. Using ternary weight values allows for the weights to be treated as {0, 1, −1} (with a potential multiplication by the actual positive weight value in the post-processor), such that the multiplication of each input value by its weight value can be handled with a simple circuit that avoids actual multiplier circuits. The remainder of the partial dot product computation in a core can then be computed with an adder tree. The sparsity requirement allows for some embodiments to reduce the size of the partial dot product computation circuits by mapping each of a first number of input values (e.g., 144) to a second number of dot product inputs (e.g., 36 or 40), such that each input value with a non-zero corresponding weight value is mapped to a different one of the dot product inputs.

Specifically, in some embodiments, the partial dot product computation circuits include at least two sets of wires for each input value, with each of the sets of wires for a given input value providing that input value to two different dot product inputs. With a guarantee of at least 75% weight sparsity (i.e., at least 75% of the weight values for any set of input values are zero), the number of dot product inputs is set at 25% (or slightly more than 25%, for redundancy) of the number of input values provided to the circuit. In some embodiments, the weight sparsity is guaranteed by the training algorithm used to train the weights to perform a specific purpose, and the neural network computation circuit is adaptable for any set of weights that meets the guarantee. In some cases, individual partial dot product computations will not meet the sparsity requirement, and solutions for handling these situations are described below. In addition to storing discrete weight values (e.g., 0, 1, and −1), in some embodiments the input values (which, other than for the first layer, are output values of previous computation nodes) are discrete values (e.g., 4-bit values).

The use of small amounts of data for the weights (e.g., less than 1 bit per weight of the neural network in some cases) and consistently-sized (e.g., 4-bit) input values allows for optimizing the storage of these values in the core memories. In some embodiments, the weight and input values are aligned both within a core and between cores in such a way as to optimize (i) the efficient retrieval and usage of these values to compute the dot products of the neural network computation nodes and (ii) the minimization of the configuration instructions that the controller circuit hierarchy sends to the core controllers in order to execute this retrieval and usage of the values.

The compiler of some embodiments determines the storage location of each of the weight and input values according to sets of rules defined for how these values should be aligned in the memory. In some embodiments, the weight values for all layers of the neural network are stored in the memory at startup (boot time) of the IC (as the weight values are the same for all inputs processed by the neural network), whereas the input values are determined (and stored) during runtime (these values are different for each input processed by the neural network).

Each core of the neural network computation fabric of some embodiments includes the same circuit structure, including the same amount of memory (e.g., random access memory). In each core, this memory is divided between weight memory and activation memory. The weight memory partition is typically larger than the activation memory partition because the weight memory stores data for all of the weights for the network (e.g., encoded weight data) whereas the activation memory only stores the input/output values for a small number of layers at a time. In some embodiments, at least two layers of activations are stored at a time (i.e., the inputs for a current layer as well as the outputs for that layer, which are the inputs to the next layer). Because some layers have too many filters for the entire layer to be computed in a single pass, the input activation values for that layer cannot be overwritten immediately by the output activation values for that layer (as these inputs will be needed for second/third/etc. passes to generate additional output activation values for the layer).

In some embodiments, the compiler determines how many and which cores store the activation values for each layer of the network. The cores that store the input values for a layer are referred to as "source cores" for the layer and the cores to which the output values for the layer are written are referred to as the "destination cores" for the layer (these are then the source cores for the next layer). In general, the compiler will select cores within the same cluster before expanding to additional clusters (i.e., if only four source cores are to be used, the compiler will choose a single cluster rather than two cores of one cluster and two cores of a second cluster). Irrespective of the number of source cores used for a layer, in some embodiments the activation values are aligned across cores, with the same memory locations used in each source core to store the input activation values for the layer. Depending on the structure of the input activation values for a layer, the number of input activation values stored in each core may differ slightly. However, some embodiments always start the input activation values for a layer at the same memory location in each source core, and use zero-padding in the source cores with fewer activation values.

For convolutional neural networks, the input activation values for each layer (or at least each convolutional layer) are conceptually represented as a three-dimensional array. This three-dimensional array is structured as numerous two-dimensional grids. For instance, the initial input for an image is three two-dimensional pixel grids (e.g., a 1280×720 RGB image will have three 1280×720 input grids, one for each of the red, green, and blue channels). The number of input grids for each subsequent layer is determined by the number of filters used in the previous layer (assuming standard convolutional layers). The size of the grids for the subsequent layer depends on the number of computation nodes in the previous layer, which is based on the size of the filters and how those filters are convolved over the previous layer input activations.

For a typical convolutional layer, each filter is a small kernel of weights (often 3×3 or 5×5) with a depth equal to the number of grids of the layer's input activations. The dot product for each computation node of the layer multiplies the weights of a filter by a subset of the coordinates of the input activation values. For example, the input activations for a 3×3×Z filter are the activation values located at the same 3×3 square of all Z input activation grids for a layer.

To optimize the dot product computations, all of the input activations for a single grid are stored in the same source core, and the total number of grids is divided evenly across the source cores (i.e., if there are Q source cores, then each source core stores the activations of 1/Q of the grids). If the number of grids is not evenly divisible by the number of source cores, then some embodiments use grids of zeros to even out the number of activations in each core.

These activations within a core are not necessarily arranged with all of the activation values of a grid stored contiguously. Instead, within each core, some embodiments store all of the activations for a particular coordinate (i.e., an x-y coordinate) within the grids assigned to that core contiguously. That is, each activation has an x-coordinate, y-coordinate, and z-coordinate in the three-dimensional array, with the z-coordinate indicating the grid to which the activation belongs. Thus, in some embodiments, the activation memory for a layer in a particular core starts with the activations at (0,0) for all of the grids assigned to that core. In some embodiments, if there are more grids assigned to a core than the number of activation values that a memory location (i.e., a RAM word) can store, then these are split up into separate sets of activations, and only a single memory location worth of activation values at the same coordinate are stored contiguously. As a result, a given memory location in one source core for a layer will store activations for the same x-y coordinates as that memory location in any of the other source cores.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIGS. 24A-24B illustrate a table showing the mapping of ALU outputs to the different post-processing units for a neural network computation circuit of some embodiments.

DETAILED DESCRIPTION

Some embodiments provide an integrated circuit (IC) for implementing a machine-trained network (e.g., a neural network). The IC of some embodiments includes a set of input processing circuits, a neural network computation fabric (also referred to as a neural network inference circuit) that can be configured to apply a neural network to a set of input values, and a microprocessor (e.g., for controlling the input processing circuits and configuring the neural network computation fabric). The neural network computation fabric of some embodiments includes (i) a set of cores that compute dot products of input values and corresponding weight values and (ii) a channel that aggregates these dot products and performs post-processing operations (as well as performs other operations), in order to compute the outputs of neural network computation nodes.

Figure 1:
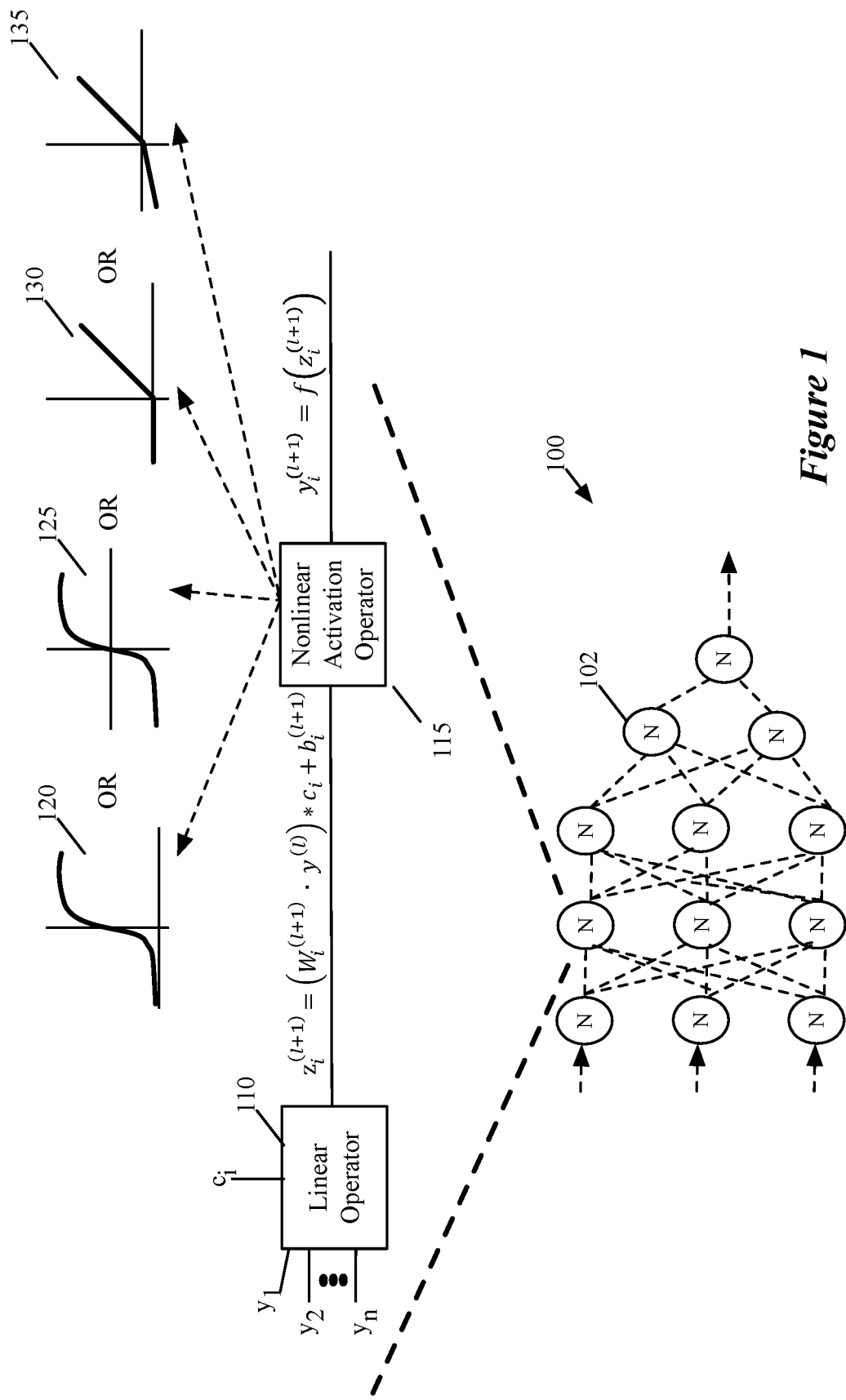
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, the neural networks of some embodiments are convolutional feed-forward neural networks. In this case, the intermediate layers (referred to as "hidden" layers) may include convolutional layers, pooling layers, fully-connected layers, and normalization layers. The convolutional layers of some embodiments use a small kernel (e.g., 3x3x3) to process each tile of pixels in an image with the same set of parameters. The kernels (also referred to as filters) are three-dimensional, and multiple kernels are used to process each group of input values in a layer (resulting in a three-dimensional output). Pooling layers combine the outputs of clusters of nodes from one layer into a single node at the next layer, as part of the process of reducing an image (which may have a large number of pixels) or other input item down to a single output (e.g., a vector output). In some embodiments, pooling layers can use max pooling (in which the maximum value among the clusters of node outputs is selected) or average pooling (in which the clusters of node outputs are averaged).

As shown in FIG. 1, each node in the neural network 100 has a linear component 110 and a nonlinear component 115. The linear component 110 of each hidden or output node in this example computes a dot product of a vector of weight coefficients and a vector of output values of prior nodes, plus an offset. In other words, a hidden or output node's linear operator computes a weighted sum of its inputs (which are outputs of the previous layer of nodes) plus an offset (also referred to as a bias). Similarly, the linear component 110 of each input node of some embodiments computes a dot product of a vector of weight coefficients and a vector of input values, plus an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable l can be any of the hidden layers (i.e., $l \in \{1, \ldots, L-1\}$ index the hidden layers of the network, with $l=0$ representing the input layer and $l=L$ representing the output layer). The variable $z_i^{(l+1)}$ represents the output of the linear component of a hidden node i in layer l+1. As indicated by the following Equation (A), the variable $z_i^{(l+1)}$ is computed as the dot product of a vector of weight values $W_i^{(l+1)}$ and a vector of outputs $y^{(l)}$ from layer l multiplied by a constant value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad (A)$$

The constant value $c_i$ is a value to which all the weight values are normalized. In some embodiments, the constant value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments use a training technique that maximizes the number of weight values that are equal to zero (such that, e.g., 75% or 90% of the weight values equal zero).

The output $y^{(l+1)}$ of the nonlinear component 115 of a node in layer l+1 is a function of the node's linear component, and can be expressed as by Equation (B) below:

$$y_i^{(l+1)} = f\left(z_i^{(l+1)}\right). \quad (B)$$

In this equation, f is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification,"

arXiv preprint arXiv:1502.01852, 2015. In some embodiments, the activation functions can be other types of functions, like cup functions and periodic functions.

Equation (B) can be expressed in the following expanded format of Equation (C):

$$y_i^{(l+1)} = f(z_i^{(l+1)}) = f\left[\left(\sum_{k=1}^{n} w_{ik} * y_k\right) * c_i + b_i^{(l+1)}\right]. \quad (C)$$

In this equation, $w_{ik}$ are weight values associated with the inputs $y_k$ of the node i in layer l+1.

Before a multi-layer network can be used to solve a particular problem, the network is put through a supervised training process that adjusts the network's configurable parameters (e.g., the weight coefficients of its linear components). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values).

Figure 2:
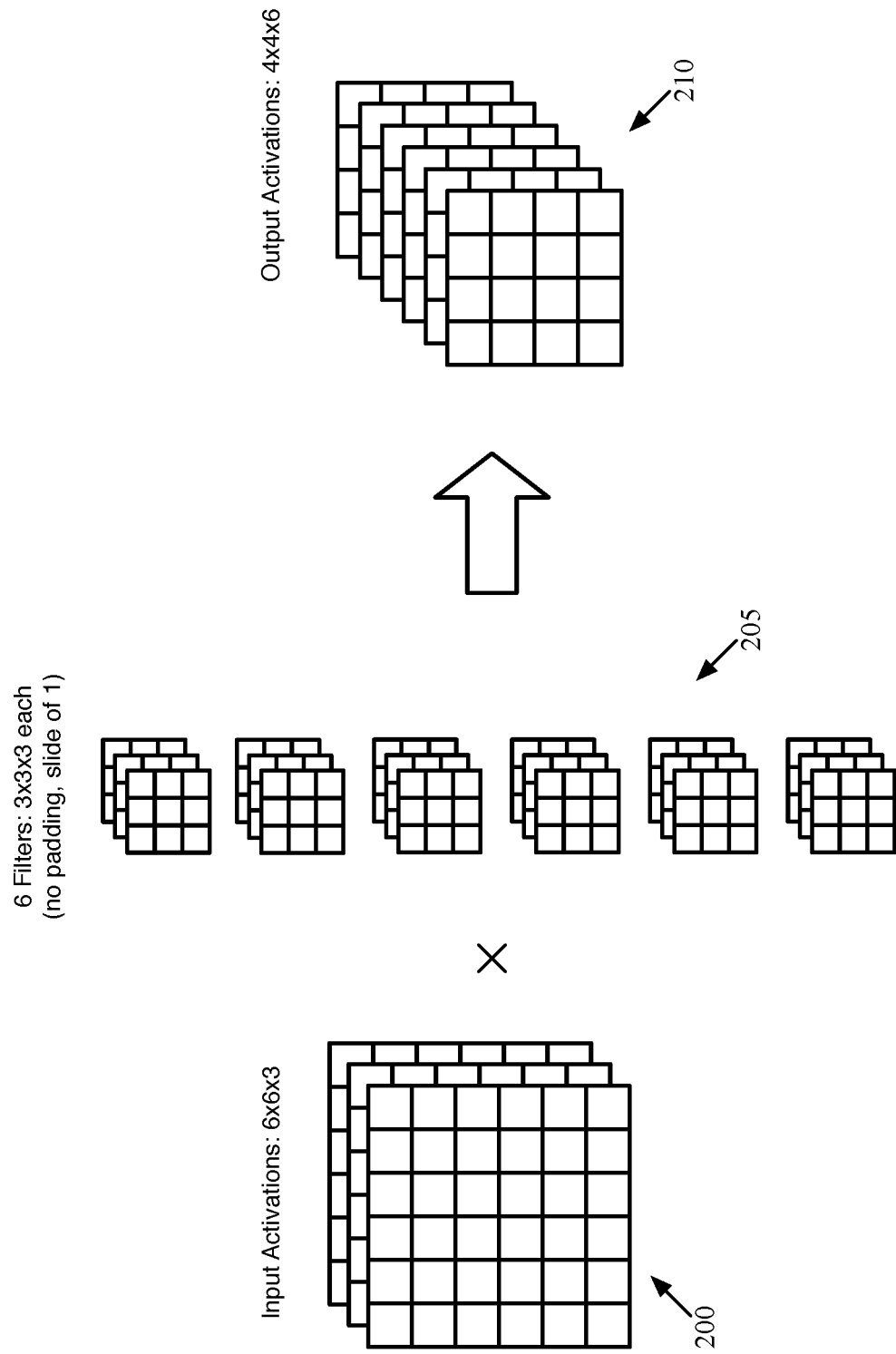
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, as shown in the figure. In this example, the dimensions of the input values is 6×6×3 (i.e., three 6×6 grids).

Each computation node of the convolutional layer involves a linear component (e.g., a dot product followed by scaling and bias functions) as well as a non-linear component, as described above. The input to each computation node is a subset of the input activation values, and the dot product for the computation node involves multiplying those input activation values by one of the filters of the layer. As shown, in this example the layer includes six filters 205, each of which is 3×3×3. Each value in one of the filters is a weight value that is trained using the techniques described above. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three grids, or channels, so the depth is three). The number of filters in a given layer can also vary—in general, each filter is attempting to identify the presence of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values. Specifically, in a typical convolution layer, each 3×3×3 filter is moved across the three-dimensional array of activation values, and the dot product between the 27 activations in the current subset and the 27 weight values in the filter is computed. This process starts in the top left corner (i.e., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids.

The output activation values 210 are arranged in a 4×4×6 array in this example. The outputs from a single filter are arranged in a single grid, and because the example has six filter 205 the output activations have six grids. Using a slide value of 1 with no zero-padding results in a 4×4 output grid for each filter. These output activation values 210 are then the input activation values for the next layer of the neural network.

As mentioned, some embodiments provide an IC that implements a machine-trained network such as that shown in FIG. 1 (e.g., a convolutional neural network with at least some of the layers being similar in structure to that shown in FIG. 2). The ICs of some embodiments are configurable to implement different networks trained to perform a particular function, which may have various different arrangements of nodes and different trained weight values. For instance, the ICs may implement networks for object or facial recognition in images, voice recognition in audio samples, etc. The IC of some embodiments includes a set of input processing circuits, a neural network computation fabric that can be configured to apply a neural network to an input value, and a microprocessor (e.g., for controlling the input processing circuits and configuring the neural network computation fabric).

Figure 3:
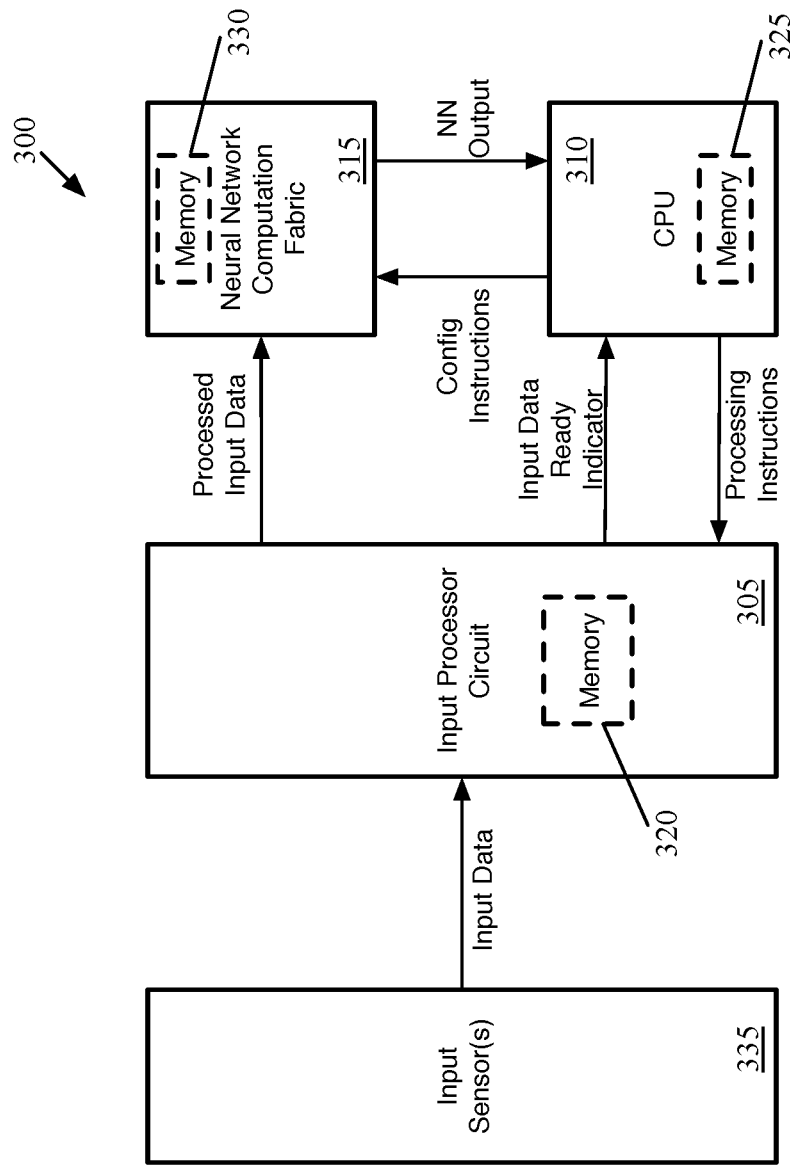
FIG. 3 conceptually illustrates an integrated circuit of some embodiments.

FIG. 3 conceptually illustrates such an IC 300 of some embodiments. As shown, the IC includes an input processor circuit 305, a microprocessor (CPU) 310, and a neural network computation fabric 315. Each of these components 305-315 also has corresponding memory (e.g., random access memory (RAM)) 330. In addition, in some embodiments, the IC is integrated into a device (such as an Internet of Things (IOT) device) with one or more input sensors 335. These input sensors can include cameras (e.g., for capturing video images on which the neural network computation fabric 315 performs face or object recognition, etc.), microphones (e.g., for capturing audio on which the neural network computation fabric 315 performs voice recognition, speech processing, etc.), or other types of input sensors. In other embodiments, the input sensors 335 are located on a separate device that is linked with the IC 300.

In some embodiments, at bootup of the IC 300, the CPU 310 loads neural network configuration data (e.g., weight values, scale and bias parameters, lookup table masks for each layer, memory locations for the weight and input values to use for computing each layer of the network, etc.) from off-chip storage and generates instructions for the neural network computation fabric 315 to write the weight values and other data to its memory 330. In addition, the CPU 310 loads the neural network program instructions for the computation fabric to its own memory 325. These instructions are applied by the computation fabric 315 to input data in order to execute the neural network. These runtime instructions include, e.g., indications as to which pre-loaded sets of instructions to use for each set of calculations, etc.

The input processor circuit 305 receives input data (e.g., still images or video frames, sounds, etc.) from the input sensor(s) 335, and processes these according to processing instructions received from the CPU 310. The CPU 310 stores in its memory instructions for the input processor circuit to prepare input data for the computation fabric 315 as well as the neural network program instructions. These instructions identify, in some embodiments, any sort of initial processing to apply to the raw data (e.g., decompression of compressed data, etc.) as well as how to arrange the data to be provided to the computation fabric 315. For an image, e.g., these instructions might specify the order in which the pixels should be arranged and streamed to the computation fabric 315, so that the computation fabric stores this data in the appropriate locations of its memory 330 for subsequent operations. The input processor circuit 305 also sends signals to the CPU 310 to indicate when it has fully buffered an input (e.g., a frame of video) and when the input is prepared to be sent to the computation fabric 315.

In addition to instructing the input processor circuit 305 how and when to provide input data to the computation fabric 315, the CPU 310 provides the neural network program instructions to the computation fabric. In some embodiments the CPU 310 provides these instructions in stages (e.g., one layer or portion of a layer at a time). Once the final output of the neural network is computed, the fabric 315 provides this output back to the CPU, so that the CPU (or other circuitry on the device) can evaluate this output and perform any actions based on the output.

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 4:
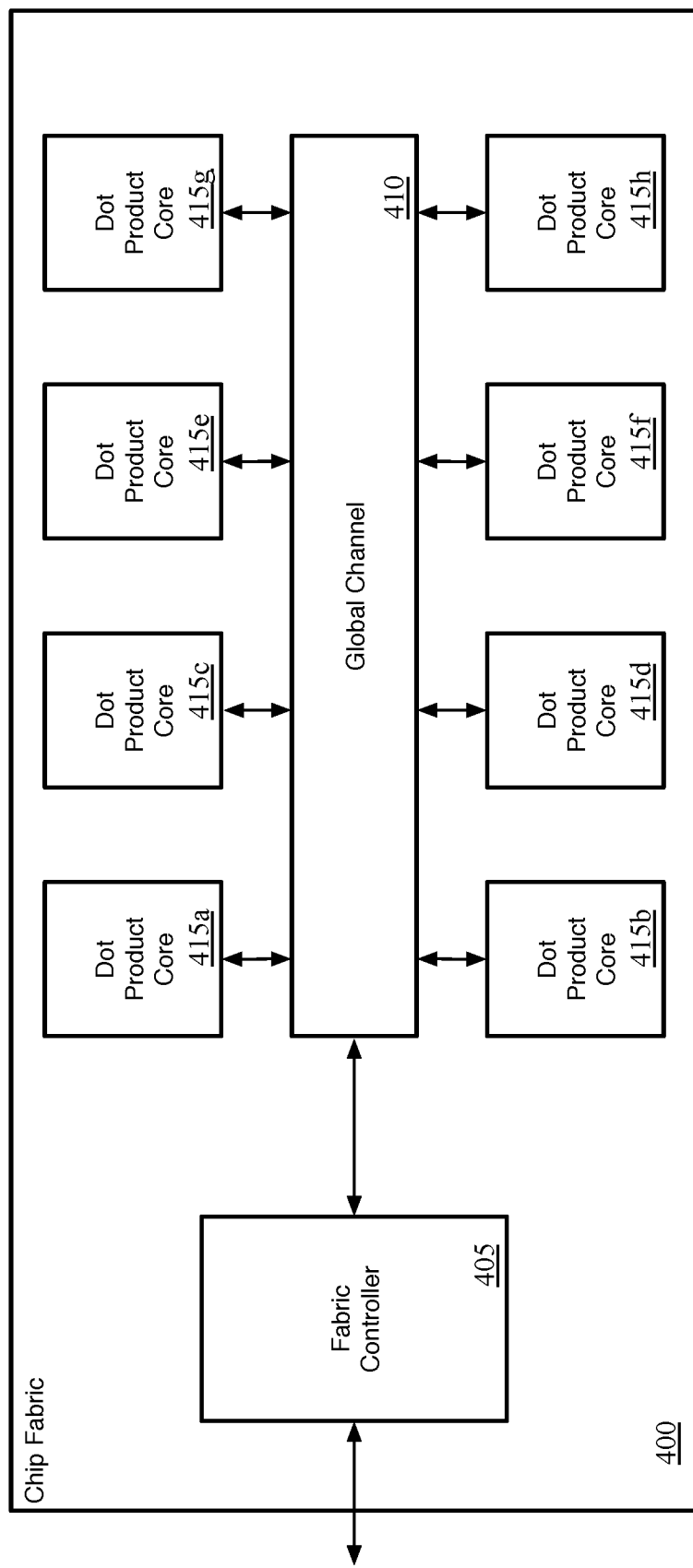
FIG. 4 conceptually illustrates the neural network computation fabric of some embodiments.

FIG. 4 conceptually illustrates the neural network computation fabric 400 (also referred to as the chip fabric) of some embodiments. The chip fabric 400 of some embodiments includes a fabric controller 405, a global channel 410, and a set of dot product cores 415a-h. The connections between the various components 405-415 represent the flow of both control data (e.g., configuration data for a particular neural network layer) and computation data at runtime in some embodiments.

The fabric controller 405 is responsible for managing the operation of the rest of the chip fabric 400 (e.g., the dot product cores 415) in some embodiments. The fabric controller 405 loads instruction arguments (e.g., weight and activation value locations, which cores to use for a particular computation, etc.) from local memory (not shown) on the chip, maps instructions into a sequence of memory-mapped register writes, synchronizes the downstream controllers (e.g., controllers for the various cores 415), etc. The instructions managed by the fabric controller 405 are configured at compile time, in some embodiments, based on the parameters of the network being implemented by the chip fabric 400. In some embodiments, the fabric controller 405 interacts with the microprocessor of the IC as well (i.e., the fabric controller 405 handles the communication with the CPU 310 shown in FIG. 3).

The chip fabric also includes numerous dot product cores 415 as well as a global channel 410 that connects the cores, with these data processing circuits configured by the fabric controller (and a set of hierarchical control circuits, in some embodiments). These data processing circuits 410 and 415 operate to compute neural network operations in an efficient, low-power manner, according to the configuration data provided by the control circuits.

The dot product cores 415a-h include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The core memory, controllers, adder trees, and other core circuitry of some embodiments are described below in greater detail.

The global channel 410 is responsible for providing a communications bus for control and computation data between the fabric controller 405 and the cores 415, as well as from one core to another. The global channel 410, among other operations, accumulates partial dot products from multiple cores when computing dot products that require more computations than can be performed in a single core, and performs post-processing on these dot products. In addition, the global channel 410 carries activations (i.e., computation node outputs) after post-processing for storage (and for use as inputs to subsequent computation nodes) in other cores 415. In some embodiments, the global channel 410 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 410, as described further below.

The chip fabric 400 of some embodiments computes numerous neural network computation nodes simultaneously, with the computation for one node often spread across multiple cores (and subsequently the global channel). In some cases, if a neural network layer is small enough, then computation for that layer may be confined to a single core 415. However, if multiple cores are used for a given layer (any number of cores may be used in some embodiments), then each dot product computed for that layer is spread across all of the cores 415 in use.

That is, for a dot product computed across more than one core 415, each of these cores computes a partial dot product from a subset of the input values and weight values for the node, then provides these partial dot products to the global channel 410. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 410. In some cases, however (e.g., for dot products with a very large number of terms or using larger than standard activation values, or when filters have too many nonzero weight values), each core 415 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 410 aggregates these partial dot products to compute the complete dot product for each node, then applies various post-processing functions (e.g., the bias, scale, and non-linear activation functions) to compute the output of each node.

Figure 5:
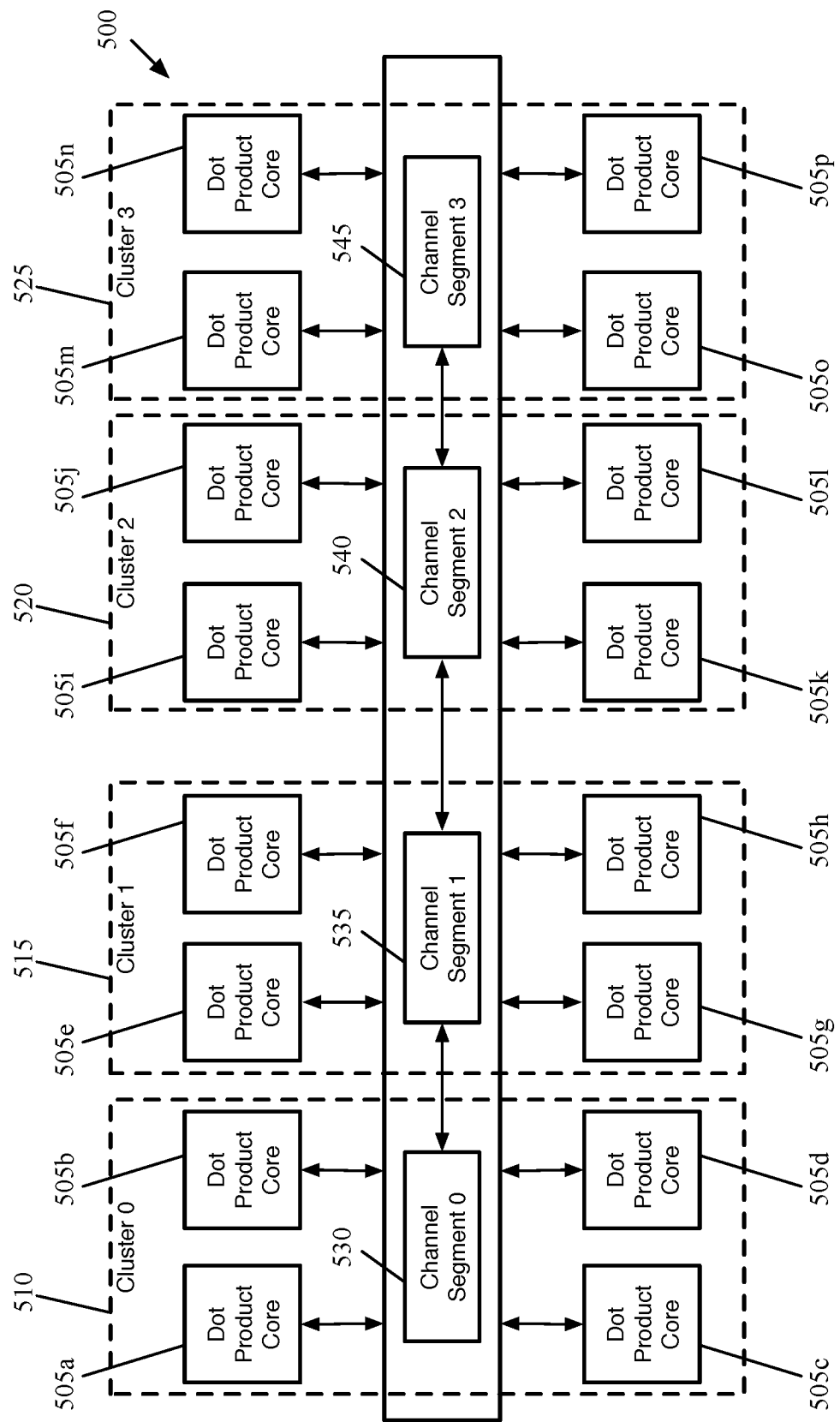
FIG. 5 illustrates a neural network computation fabric of some embodiments with sixteen dot product cores grouped into four clusters.

In some embodiments, the dot product cores are grouped into clusters, and the global channel includes separate segments for each such cluster. FIG. 5 illustrates a neural network computation fabric 500 of some embodiments with sixteen dot product cores 505a-p grouped into four clusters 510-525. In addition, the global channel includes four channel segments 530-545. Each of these channel segments includes the same circuitry in some embodiments, with the exception that buses in the first channel segment 530 and last channel segments 545 only connect to corresponding buses in one other channel segment while the buses in the intermediate channel segments 535 and 540 connect to corresponding buses in two neighboring channel segments.

The data processing circuitry of each of the channel segments 530-545 includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits are the computation node outputs (activations). The output bus, or activation write bus, carries the outputs of the post-processing circuits to the cores 505a-p to be stored as inputs for the next computation layer.

In some embodiments, each cluster 510-525 or group of clusters (e.g., clusters 510 and 515 being one group and clusters 520 and 525 being a second group) can execute a separate neural network. This allows the fabric to execute multiple networks simultaneously, so long as the networks are not so large as to require more than the cores of the allocated cluster or clusters. For instance, a single chip of an IOT device could run both a facial recognition network and an object recognition network, a facial recognition network and a language parsing network, etc.

Figure 6:
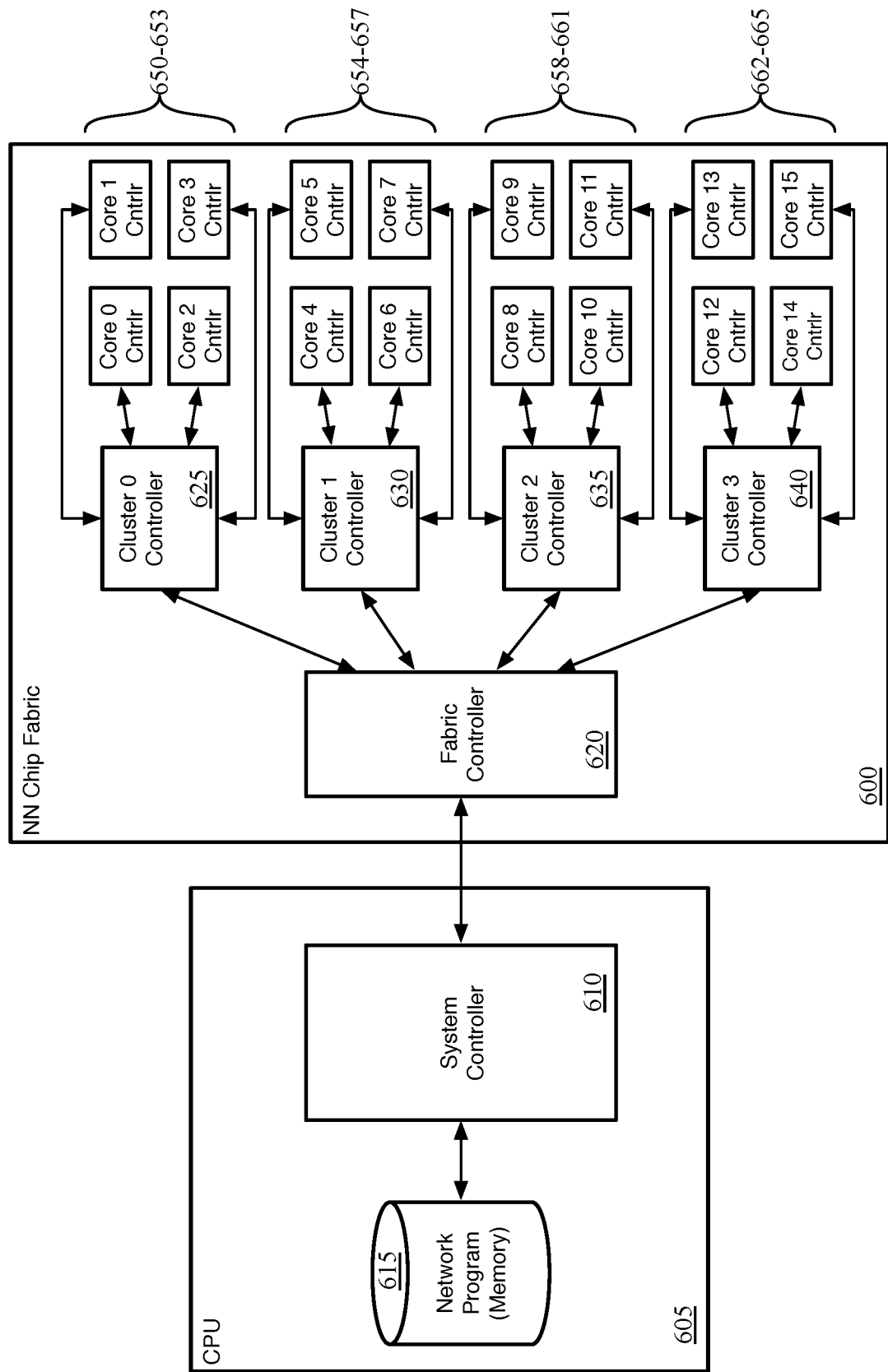
FIG. 6 conceptually illustrates a set of controller circuits for configuring a neural network chip fabric of some embodiments to execute a neural network.

Before describing the structure of the computation circuitry in greater detail, the hierarchical control and configuration of the neural network chip fabric will be described. FIG. 6 conceptually illustrates the set of controller circuits for configuring a neural network chip fabric 600 of some embodiments to execute a neural network. As shown, a CPU 605 executes a system controller 610 and stores a neural network program 615 (i.e., the compiled version of the neural network) in its memory.

The system controller 610 provides the neural network instructions to the chip fabric 600 (per the stored network program 615) for the chip fabric to execute the program on incoming input data (e.g., images, etc.). In some embodiments, the system controller 610 provides these instructions to the chip fabric 600 incrementally. For instance, in some embodiments, the system controller 610 initially loads the instructions for the first layer of the neural network, or a portion of the first layer, then waits for a signal from the chip fabric 600 indicating that these instructions have been completed.

If a layer of the network is small enough to be completed in a single pass, then the compiler of some embodiments schedules the entire layer for one pass. However, in some embodiments, there is a maximum number of filters that can be loaded in a single pass (e.g., 64) due to the structure of the chip fabric. In addition, in some embodiments there is a maximum number of output sets that can be written to the same core in the same pass, so this can also constrict the number of filters in a pass. The chip fabric computes the output for all of the nodes for each filter loaded (i.e., each pass loads all of the input activations for the layer in the correct order for the outputs to be computed). However, if a layer has more than this maximum number of filters, then the layer will be divided across multiple passes. Once the first portion of the network is completed, the system controller 610 provides the fabric 600 with the instructions for the second portion (e.g., a second layer, or a second pass of the first layer), and so on until the chip fabric has fully executed the network.

The chip fabric 600 includes a hierarchical control structure for configuring the data processing circuitry (i.e., the dot product cores and global channel segments) to execute the neural network instructions from the system controller 610. As shown, the chip fabric 600 of some embodiments includes (i) a fabric controller 620 that interacts with the system controller 610 on the CPU 605, (ii) a set of cluster controllers 625-640, and (iii) a set of core controllers 650-665. Some embodiments include one cluster controller for each cluster of the chip fabric and one core controller for each core (in this case the chip fabric 600 has four clusters with four cores each).

The fabric controller 620 provides the point of interaction with the CPU 605 for the chip fabric 600, receiving neural network program instructions from the system controller 610 and sending signals to the system controller to indicate when instructions have been completed. Upon receiving neural network instructions (e.g., for a layer of the network or portion of a layer), the fabric controller 620 parses the instructions to identify the active cores (and thus the active clusters), and unpacks additional arguments stored in local instruction memory on the chip fabric. In some embodiments, in order to minimize power usage, the instructions provided from the CPU are high-level commands that the fabric controller parses in order to determine more detailed instructions for the lower-level controllers. Doing so limits control signal power consumption on the chip while encapsulating implementation details of the lower-level (cluster, core) circuits.

For example, in some embodiments the instructions from the system controller 610 to the fabric controller 620 specify to execute a particular pass of a particular layer of the network, and the fabric controller memory includes the required information to execute this specific pass. In some embodiments, this information is conveyed by the system controller instructions specifying to execute a particular type of pass or layer (e.g., convolution) based on the arguments found at a particular memory location of the fabric controller's memory. The specified memory location stores arguments such as the source cores for the computations (i.e., the cores that will perform the dot product calculations) and the destination cores for the output values (i.e., the cores to which the output values are stored), the memory locations in the cores at which to find the weight and/or input values for the computations (in some embodiments, the weight values are loaded into memory initially such that these memory locations are the same across all of the source cores), information for calculating the non-linear activation function for the layer (e.g., the lookup table mapping information), etc.

Because layers may potentially include thousands of output activation values, having the CPU specify a core and RAM location for each such activation value would require a lot of power. Instead, as described, some embodiments specify only a few parameters required for the chip fabric to determine the memory locations for each activation value (e.g., the cores at which the values will be stored, the starting memory address that is the same for each core, and the dimensions of the activation layer). In addition, similar principles apply to the use of input values already stored in RAM (the outputs of the previous layer) for the dot products of the current layer. The weight values and their location in memory, the location of the input values, the lookup table configuration for a layer, etc. are all the same for each network input (e.g., each frame of video) as the network is statically scheduled, so resources can be saved by storing all of this information on the chip at bootup, with a minimal amount of instruction information sent from the CPU for each layer or pass (i.e., only the location in the fabric controller of the arguments for the current layer).

The fabric controller then provides cluster instructions to the cluster controllers for the identified clusters that are in use for the current neural network layer, and waits for completion signals from the clusters indicating that the current set of instructions has been executed (and thus, that the fabric controller can notify the system controller on the CPU that the current set of instructions is complete, causing the system controller to provide the next set of instructions). Avoiding use of some of the clusters when possible provides power savings, as these cores can be powered down, or at least the memories in the cores put to sleep. Even for networks that require the use of all of the cores of the chip fabric, often the initial layers have smaller dot product computations that require fewer cores. In addition, in some embodiments, the fabric controller synchronizes the cluster controllers, ensuring that dot products computed across multiple clusters are aggregated together correctly.

In some embodiments, the cluster instructions provided by the fabric controller are not fully parsed instructions, pushing some of this work to the cluster and/or core controllers. For instance, the fabric controller may only provide the starting memory address for the activations and the activation layer dimensions, allowing the cluster controllers to determine at which core (and the RAM location within that core) each activation value is to be stored. The fabric controller also broadcasts these instructions in some embodiments, while including certain bits that specify the difference in setup between the clusters (or whether certain clusters even need to act on the instructions). Some embodiments broadcast the instructions only to the clusters involved in the computation (which could include clusters with source cores, destination cores, or both). This broadcasting reduces latency and power consumption as compared to sending separate sets of instructions to each cluster.

Each of the cluster controllers 625-640 receives instructions from the fabric controller and configures its own segment of the global channel in addition to parsing the instructions to identify configuration data for each of the cores in its cluster. That is, each cluster controller 625-640 that receives cluster instructions for a given high-level instruction directly configures the dot product bus, the post-processing units, and the activation write bus in its channel segment. In addition, these cluster controllers 625-640 determines which of its cores require the instructions and provides these instructions to the core controllers for these identified cores.

Much as the fabric controller 620 parses the high-level instructions from the system controller 610, the cluster controllers 625-640 of some embodiments decompose the instructions from the fabric controller 620 to determine the configuration data to provide to its channel segment circuits (dot product bus, post-processing units, and activation write bus) as well as the sets of instructions for each of its cores. The cluster controllers configure the channel segment circuits to, e.g., aggregate the partial dot products from the cores correctly (both within a channel segment and across channel segments), provide these aggregated dot products to the post-processing units in the correct channel segment, perform post-processing operations, and provide the output of the post-processors to the correct core. In some embodiments, this information both comes from the fabric controller (e.g., the lookup table mapping for the non-linear activation function) as well as from information stored in cluster controller memory.

The use of separate cluster controllers enables the ability of the chip fabric to execute multiple separate networks simultaneously in some embodiments. The fabric controller 620 can provide instructions to the first cluster controller 625 for a layer of a first neural network and, so long as those instructions do not require the use of other clusters, the first cluster can execute the entire neural network layer in a self-contained manner. At the same time, the fabric controller 620 could provide instructions to the second cluster controller 630 for a layer of a second neural network, with the second cluster executing the entire neural network layer in a self-contained manner. The third and fourth cluster controllers 635 and 640 could receive instructions for third and fourth networks as well, to execute at the same time as the first two. In addition, other combinations of clusters can execute multiple networks simultaneously (e.g., the first two clusters executing a first network and the second two clusters executing a second network, the first two clusters executing a first network while the third and fourth clusters each separately execute second and third networks, etc.

The cluster controllers 625-640, as mentioned, also provide the appropriate configuration data to each of the core controllers 650-665, which coordinate the dot product processing in the core (as well as the direct delivery of input activation values to the global channel for pooling, element-wise operations, etc.). In some embodiments, the cluster controllers do not fully parse the instructions to specify each individual memory read or write, but instead provide the higher-level instructions to each core controller. In addition, some embodiments broadcast the instructions from a particular cluster controller to each of the core controllers within the cluster (or the core controllers for each of the cores active in the current pass), while including certain bits that specify the difference in setup between the cores. This broadcasting reduces latency and power consumption as compared to sending separate sets of instructions to each core.

The core controllers 650-665 then parse these instructions to determine the specific configuration data for the operations of the core. This configuration data includes memory locations for various read operations to read and align weight and activation values, enable bits for the dot product operations, memory locations for write operations after activations have been computed, etc. Once the instructions are fully executed, the core controllers 650-665 send completion signals to the cluster controllers 625-640. Similarly, once the cluster controllers 625-640 receive these completion messages, they send similar messages to the fabric controller 620, which can then notify the system controller executing on the CPU that the instructions are complete. In some embodiments, the last set of neural network instructions is a set of memory read operations, for the computation fabric to deliver the neural network output results to the system controller for any post-processing operations (e.g., a soft-max operation to generate a probability, etc.). After this, the system controller puts the fabric to sleep until the next set of input data is to be processed, in some embodiments. If only a portion of the fabric is involved in executing the neural network (e.g., because one or more clusters execute a different neural network in parallel), then that portion of the fabric is put to sleep in some embodiments.

Figure 7:
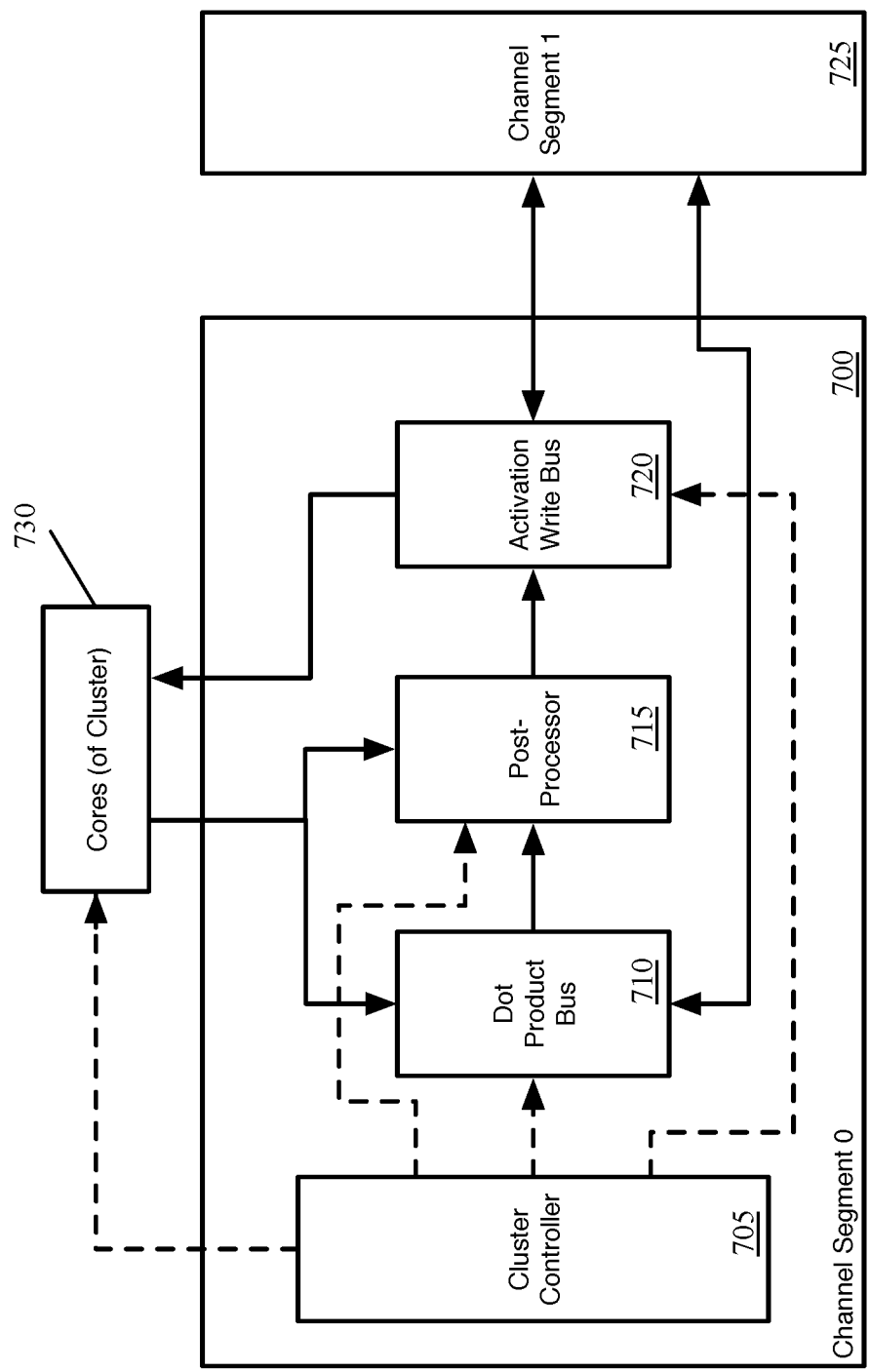
FIG. 7 conceptually illustrates the circuit blocks of a channel segment of some embodiments.

Returning to the neural network computation circuitry, FIG. 7 conceptually illustrates the circuit blocks of a channel segment 700 of some embodiments (e.g., one of the channel segments 530-545 shown in FIG. 5). The channel segment 700 includes a cluster controller 705, a dot product bus 710, a post-processor 715, and an activation write bus 720 (also referred to as an output bus). In addition to the channel segment 700, the figure also illustrates an additional channel segment 725 and the cores 730 of the local cluster for the channel segment 700, as the circuit blocks of the channel segment 700 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 730 to the post-processor 715 for pooling nodes or element-wise operators, is also shown.

The cluster controller 705 configures the dot product bus 710, post-processor 715, and activation write bus 720 as per the configuration instructions received from the fabric controller in some embodiments. For the dot product bus 710, this configuration data specifies, in some embodiments, (i) which partial dot products are to be added together as part of the same neural network computation node, (ii) to which post-processing unit each aggregated dot product is sent (the post-processor 715 of some embodiments includes numerous post-processing units with the same circuitry), and (iii) to which core the activation write bus 720 transports each computation node output. In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 715, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table), as well as other data. For the activation write bus 720, the configuration data indicates to which cores each output value is to be delivered, in some embodiments.

As mentioned, the solid lines indicate the flow of neural network computation data, for a node in a convolutional or fully-connected layer. The cores 730 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 710, which aggregates the partial dot products from the cores 730 of the local cluster. The dot product bus 710, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), and (ii) one of the post-processing units in each of the clusters (i.e., dot product bus lane N provides its aggregated output to the post-processing unit Nin one of the clusters, as specified by the configuration data).

Each lane of the dot product bus 710 spans all of the channel segments, and the dot product bus lanes in each channel segment aggregate the partial dot products from the cores of its local cluster. The dot product bus 710 in the channel segment 700 also exchanges locally-aggregated dot products with its neighboring segments for further aggregation if needed (i.e., if the source cores for the dot product computation span multiple clusters). In this case, the channel segment 700 only has one neighboring segment, but internal channel segments (e.g., the segments 535 and 540 in FIG. 5) will have two such neighboring segments. The configuration data from the cluster controller 705 specifies whether to send these dot products in one direction or the other along the global channel for each dot product bus lane, or to aggregate the dot products from the neighboring channels locally, depending on where post-processing will occur for each dot product.

The post-processor 715 includes numerous post-processing units that receive the dot products from their corresponding dot product bus lane and perform the non-dot product functions of the neural network computation nodes. For a typical computation node of a convolutional (or fully-connected) layer, these functions includes an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table rather than a hardwired function. This enables the IC to execute different neural networks that use different activation functions and, in some embodiments, allows for different activation functions to be used in different layers of the neural network.

The activation write bus 720 receives the computation node activation outputs from the post-processing units and carries these outputs back to the cores 730, to be stored in the memory of the cores and used as inputs for the computation nodes of the next layer of the neural network. The activation write bus connects to the cores 730 in the local cluster as well as the activation write bus in the neighboring cluster segment 725. As with the dot product bus 710, the activation write bus 720 of some embodiments includes lanes, with each post-processing unit of the post-processor 715 sending its output to a different one of these lanes.

In some embodiments, the output values may be computed by the post-processor 715 in one cluster but carried by the activation write bus 720 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 720 also includes a right shift circuit for each core that is used to align the output values for the core, in order for the values to be stored in contiguous blocks within the core RAM.

Figure 8:
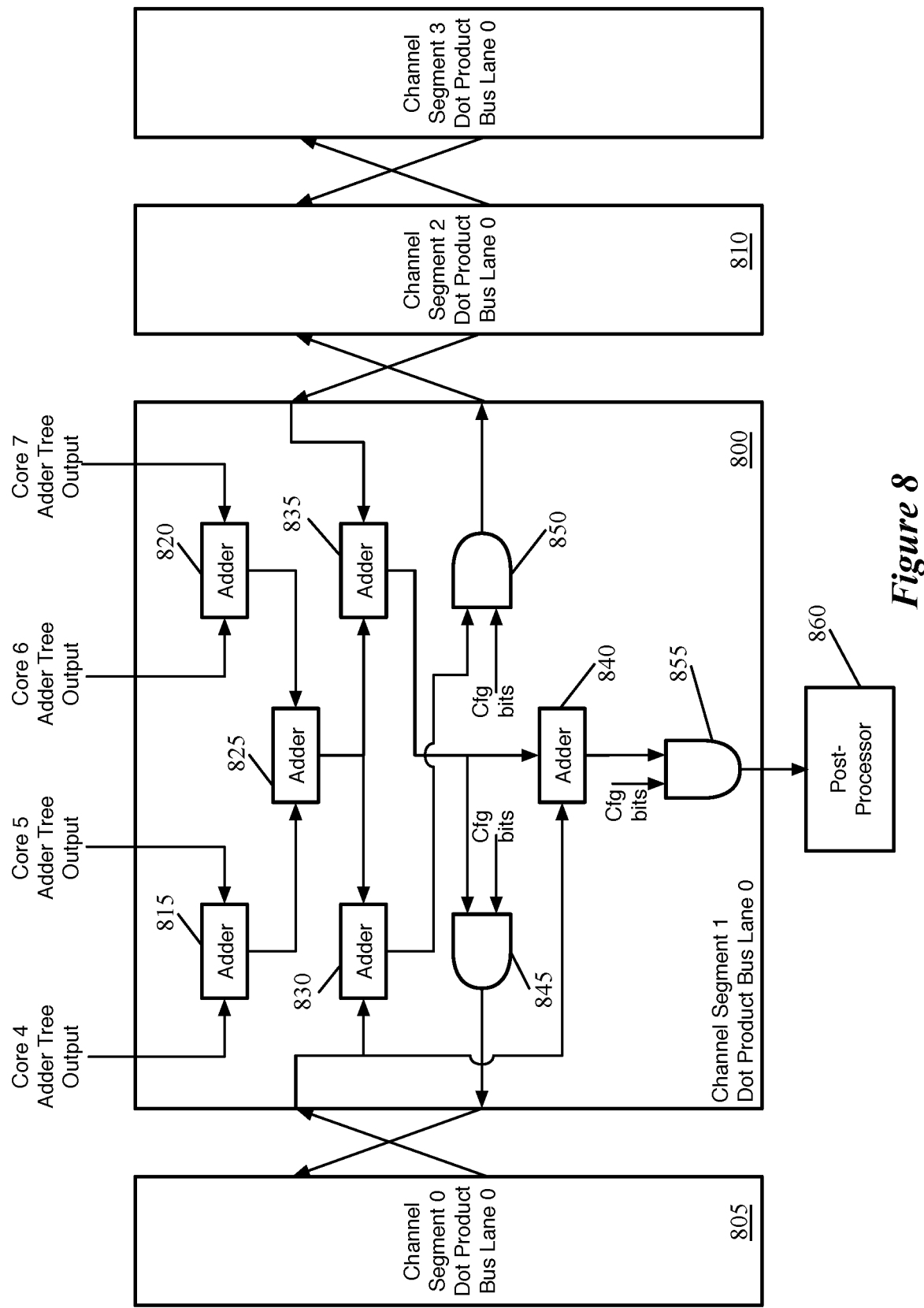
FIG. 8 conceptually illustrates a portion of the dot product bus of some embodiments.

Now that the primary circuit blocks of the global channel have been introduced, these circuits of some embodiments will be explained in greater detail. FIG. 8 conceptually illustrates a portion 800 of a dot product bus of some embodiments. In this example, the segment for which the dot product bus portion 800 is shown is an internal segment (in that it has two neighboring segments 805 and 810). The dot product bus of some embodiments includes, within each segment, numerous (N) non-interacting lanes, and the portion 800 is a segment of one of these lanes. In some embodiments, each segment includes the same number of lanes, and lane n∈N in one segment is connected to lane n in its neighboring segments for the aggregation of dot products across clusters. In some embodiments, the number N of dot product bus lanes is equal to the number of adder trees computing partial dot products in each core, the number of post-processing units in each post-processor block of a channel segment, and the number of activation write bus lanes. Thus, each computation node has its partial dot product computed by the same adder tree in each of one or more cores, which is aggregated across the corresponding dot product bus lane to calculate the complete dot product. This complete dot product is (in the typical case) provided to the corresponding dot post-processing unit, which provides its output to the corresponding activation write bus lane to be carried to the appropriate core.

The dot product bus portion 800 includes a set of adders 815-840 as well as a set of AND gates 845-855. The first three adders 815-825 form an adder tree to aggregate the partial dot products output by the corresponding adder trees of the four cores of the local cluster for the channel segment. In some embodiments, if a core does not compute a partial dot product for a particular computation node, then that core outputs a 0 value to the dot product bus. This aggregated partial dot product is output to both of the adders 830 and 835.

These adders 830 and 835 handle the computation of dot products that are "moving" downstream (to a lower-numbered segment, in this case segment 805) and downstream (to a lower-numbered segment, in this case segment 810). The adder 830 receives the aggregated dot product from the corresponding downstream dot product bus lane 805 and combines it with the locally aggregated dot product from the adder 825. If either (i) the cores of the downstream cluster(s) do not participate in the dot product computation or (ii) the dot product will be completely aggregated and sent to a post-processor downstream, then this value received from the downstream dot product bus lane 805 is gated to 0 (i.e., by the equivalent of AND gate 850 in the downstream segment).

Correspondingly, the adder 835 receives the aggregated dot product from the corresponding upstream dot product bus lane 810 and combines it with the locally aggregated dot product from the adder 825. If either (i) the cores of the upstream cluster(s) do not participate in the dot product computation or (ii) the dot product will be completely aggregated and sent to a post-processor upstream, then this value received from the upstream dot product bus lane 810 is gated to 0 (i.e., by the equivalent of AND gate 845 in the upstream segment).

The output of the adder 830 is sent to the AND gate 850, which ANDS this output with configuration bits from the local cluster controller based on where the post-processing for the completed dot product will be performed. If the post-processing segment is upstream, then these configuration bits are 1 (resulting in the aggregated dot product being passed upstream), whereas if the post-processing segment is either downstream or local, then these configuration bits are 0 (resulting in 0 values being passed upstream).

Similarly, the output of the adder 835 is sent to the AND gate 845, which ANDs this output with configuration bits from the local cluster controller based on where the post-processing for the completed dot product will be performed. If the post-processing segment is downstream, then these configuration bits are 1 (resulting in the aggregated dot product being passed downstream), whereas if the post-processing segment is either upstream or local, then these configuration bits are 0 (resulting in 0 values being passed downstream).

The final adder 840 receives (i) the output of the adder 835 and (ii) the aggregated dot product from the downstream segment 805 of the dot product bus lane. It should be noted that the directions could be reversed in other embodiments with an equivalent effect, with this adder 840 instead receiving the output of the adder 830 and the aggregated dot product from the upstream segment 810 of the dot product bus lane. This adder aggregates the complete dot product (accounting for the partial dot products from the local cores and upstream cores via the output of adder 835 and the partial dot products from the downstream cores via the output from the segment 805).

The output of the final adder 840 is provided to the post-processor 860 (e.g., to the post-processing unit that corresponds to the lane of the dot product bus). However, AND gate 855 is used to gate this output to 0 if the post-processor for this dot product bus lane is not local (i.e., either upstream or downstream). In summary, the dot product bus lane segment 800 is configured (via the AND gates 845-855) to (i) add the local cluster partial product with the downstream partial product and pass this aggregated partial product upstream if the post-processing segment is upstream, (ii) add the local cluster partial product with the upstream partial product and pass this aggregated partial product downstream if the post-processing segment is downstream, and (iii) add the local cluster partial product with the downstream and upstream partial products and pass this completed dot product to the local post-processor if the post-processing will be performed locally. In some embodiments, the post-processing segment is selected by the compiler, with the primary factor in this selection being that the post-processing segment is centrally located among the source clusters (i.e., the cores that compute the partial dot products and a secondary factor being that the selected segment is as close to the destination core(s) as possible, in order to reduce the power required for the computation and write operations.

In addition to the circuitry shown in FIG. 8, the dot product bus also includes a control block in some embodiments. This block is responsible for outputting a signal to the post-processor block to indicate when the output of the dot product bus is valid (i.e., when the dot products are aggregated by the dot product bus), so that the post-processor acts on the data from the dot product bus.

Figure 9:
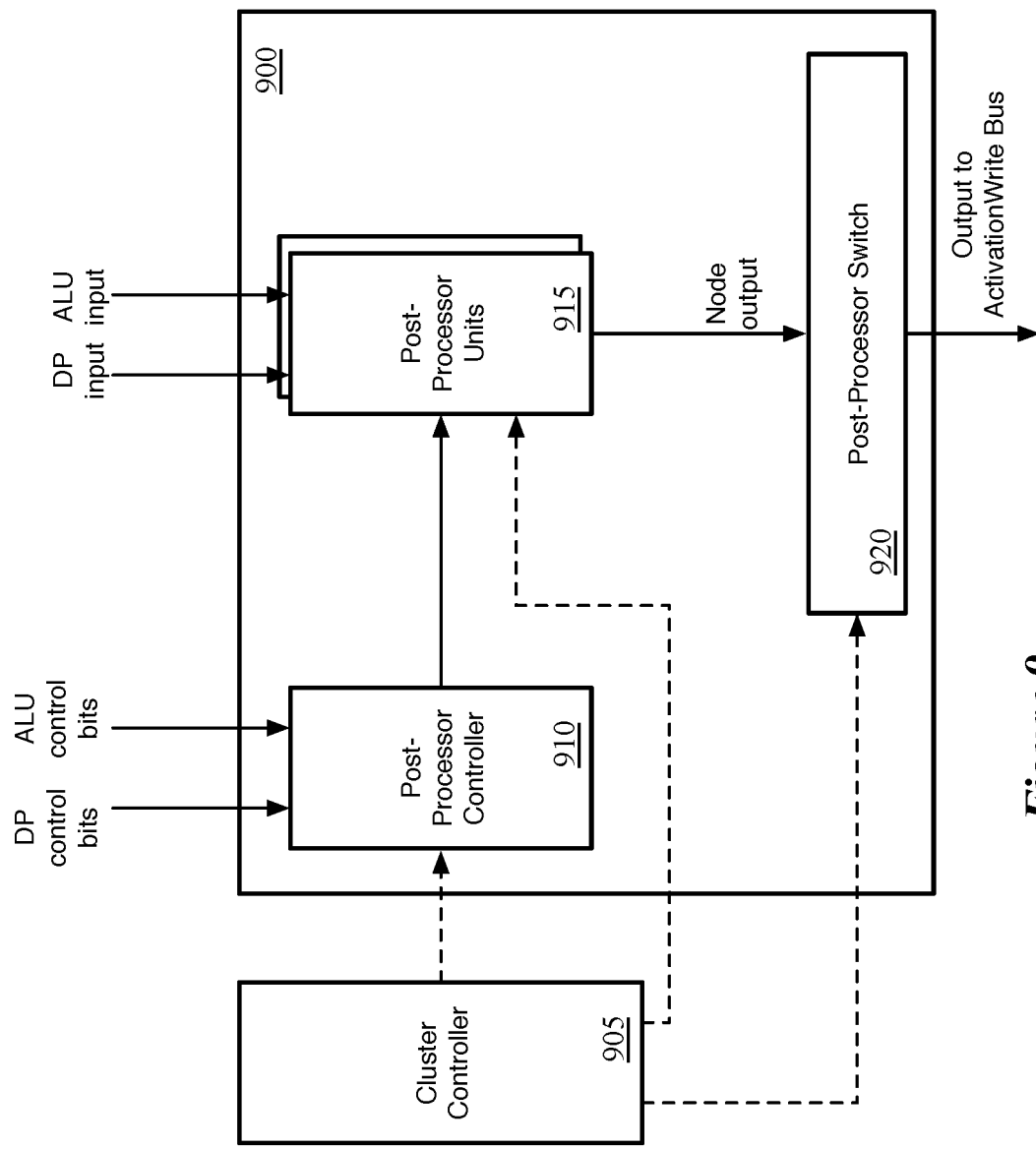
FIG. 9 conceptually illustrates the post-processing circuit block of a channel segment of some embodiments, along with the local cluster controller that provides configuration data to this post-processor.

FIG. 9 conceptually illustrates the post-processing circuit block 900 for a channel segment of some embodiments, along with the local cluster controller 905 that provides configuration data to this post-processor 900. As shown, the post-processing circuit block 900 includes as sub-blocks a post-processor controller 910, a set of post-processing units 915, and a post-processor switch 920. The cluster controller 905 provides configuration data to each of these sub-blocks in order to synchronize operations, and to configure the post-processing units 915 with the correct bias and scale factors as well as the activation function.

The post-processor controller block 910 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus carries activation values directly from the cores without having dot products performed, to be used for pooling and element-wise operation layers. The accumulate and valid signals indicate to the post-processor whether the incoming ALU data is to be used, while the end of row signals that different configuration data should be used for certain post-processing operations when the end of a row of input values is reached (e.g., on account of padding, etc.). The post-processor controller block 910 aggregates these signals, as mentioned, and outputs signals to the post-processing units 915 to indicate when the post-processing units are receiving valid dot product or ALU data.

The post-processor 900 includes numerous post-processing units 915 that handle the non-dot product computation of the neural network nodes. In some embodiments, the post-processor block within a segment includes the same number of post-processing units 915 as there are dot product bus lanes and activation write bus lanes (which is also the number of adder trees in each core for computing partial dot products). Each post-processing unit 915 receives two types of data inputs: (1) dot products from the dot product bus for convolution and fully-connected neural network nodes and (2) activation inputs (ALU inputs) from the core RAM for pooling nodes and element-wise operator nodes.

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Some of the details of the post-processing units are described further below by reference to FIGS. 10-12.

The post-processing switch 920 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 10:
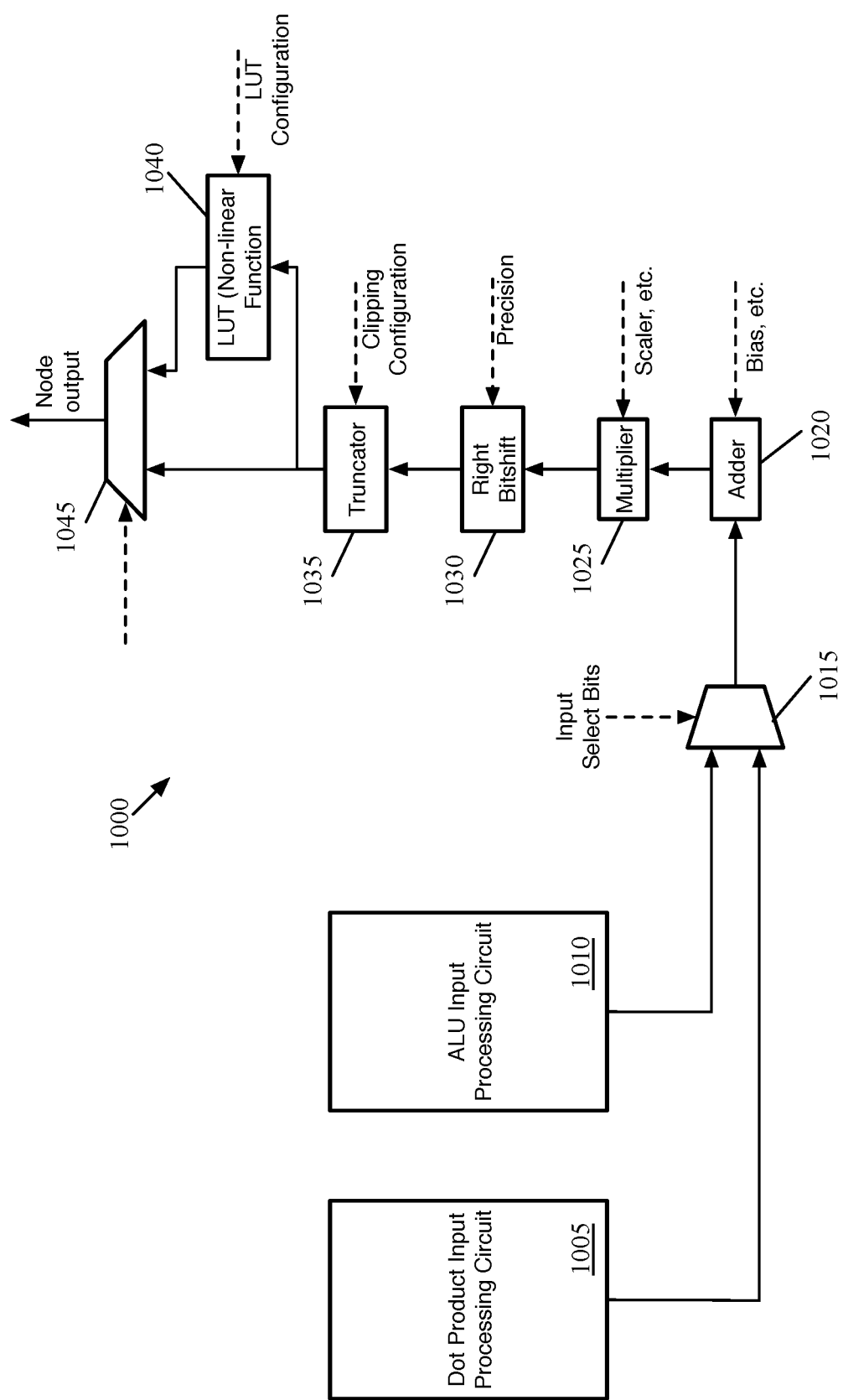
FIG. 10 conceptually illustrates the structure of a post-processing unit of some embodiments.
Figure 11:
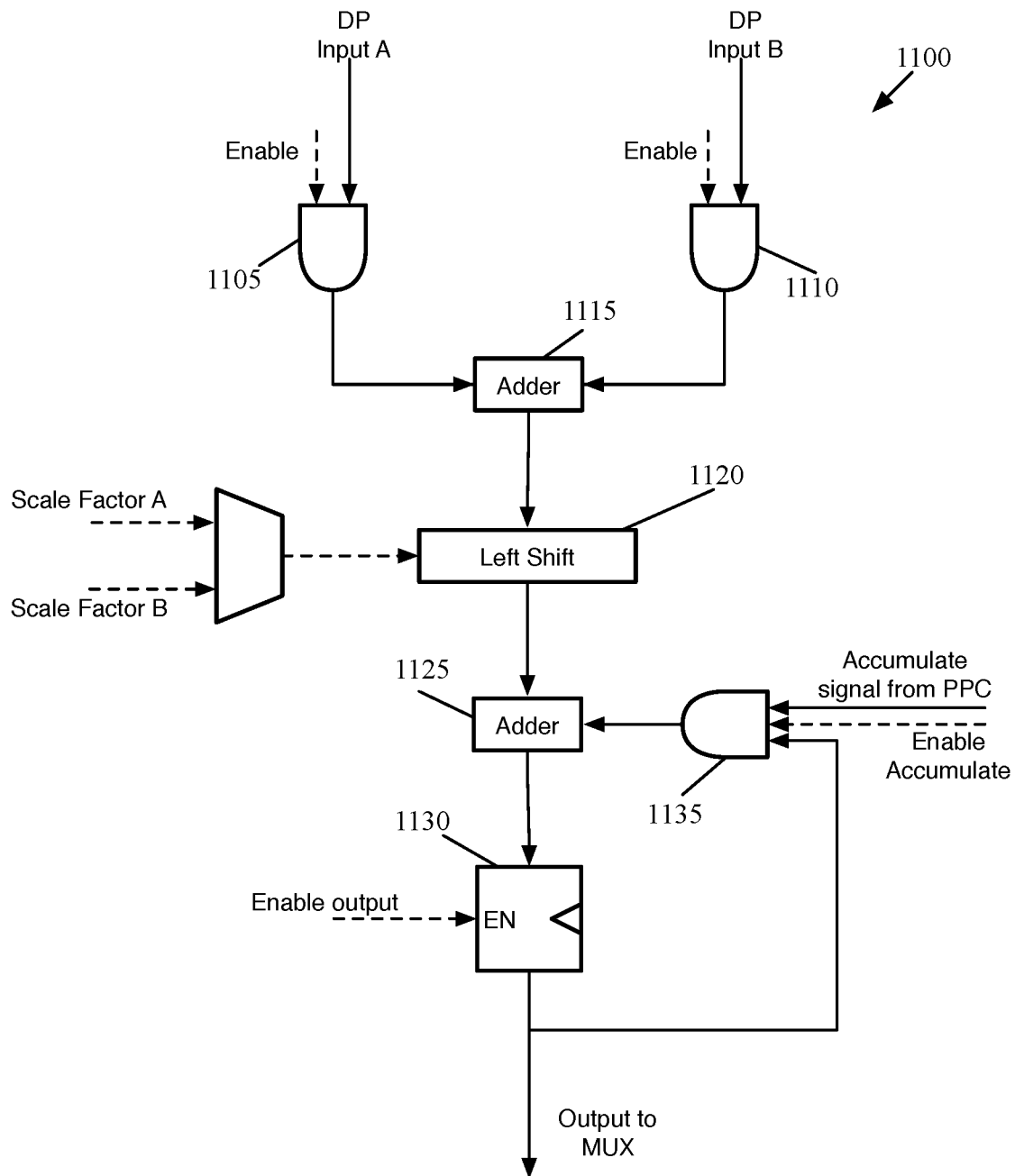
FIG. 11 conceptually illustrates a dot product input processing circuit of some embodiments.
Figure 12:
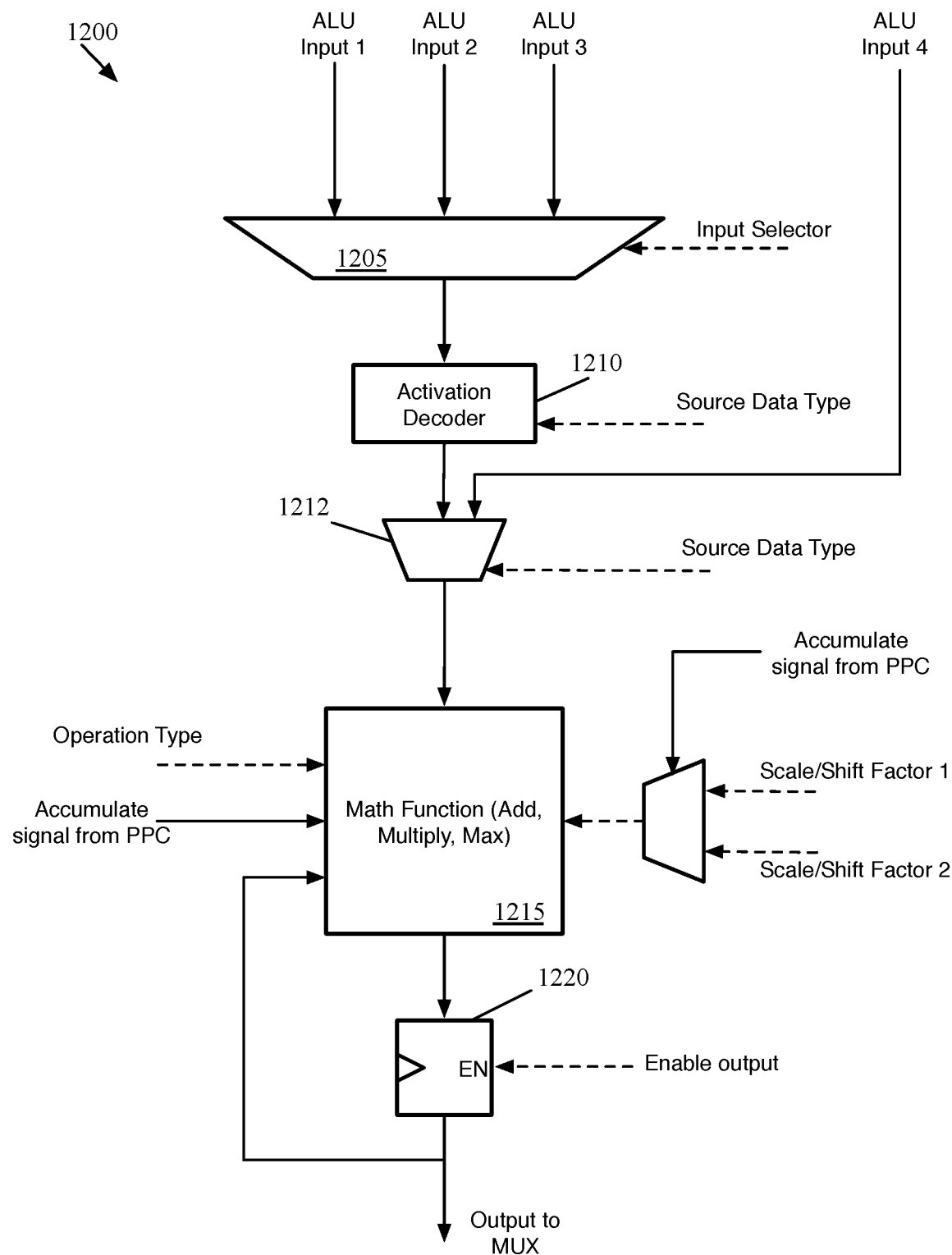
FIG. 12 conceptually illustrates an ALU input processing circuit of some embodiments.

As mentioned, FIGS. 10-12 illustrate the post-processing units in more detail. FIG. 10 conceptually illustrates the structure of a post-processing unit 1000 of some embodiments. As shown, the post-processing unit 1000 includes a dot product input processing circuit 1005, an ALU input processing circuit 1010, a multiplexer 1015 that selects between the outputs of these two circuits, and a set of post-processing operation circuits.

The dot product input processing circuit 1005, described in further detail by reference to FIG. 11, is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bit-shifting the first set of input data.

The ALU input processing circuit 1010, described in further detail by reference to FIG. 12, is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations. In some of these embodiments, the cores provide input values directly to the post-processing units without computing dot products, and the post-processing units are configured to perform the appropriate operations on these inputs.

The output of each of these circuits 1005 and 1010 is sent to a multiplexer 1015, and a set of configuration bits is used to select between these two possible inputs. This input value is sent to an adder 1020 and then to a multiplier 1025. For dot product outputs, the adder 1020 adds the bias of the linear function for the node and the multiplier 1025 multiplies this by the scaling factor for the linear function. The bias value sent to the adder 1020, in some embodiments, is a combination of (i) the bias value computed during the training of the neural network and (ii) a number of negative weight values. As described in more detail below, in some embodiments the weight values are ternary in each layer (i.e., either 0, a positive value, or a negation of that positive value). The partial dot product calculation in the cores treats these ternary weights as {0, 1, and −1}, and uses a ternary MAC circuit that performs one's complement addition to account for negative weights. The bias factor in the configuration data then accounts for the number of negative weights, to effectively turn the one's complement addition into two's complement addition.

Furthermore, for larger input and output values (e.g., 8-bit input and output values), in which the dot product input processing circuit 1005 left shifts the dot product of the most significant bits of the inputs (e.g., by 4 bits), the bias factor has to add a larger amount for the negative weights. For the 8-bit case (in which the dot product of the weights with the most significant nibble of the inputs is shifted by 4 bits), the bias factor adds 17 for each negative weight. The value sent to the multiplier 1025, in some embodiments, is a combination of (i) the scaler value computed during the training of the neural network (which is often 1) and (ii) the positive value of the ternary weight (which was removed in order to scale the weight values used in the dot product to 1 and −1).

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and element-wise operator layers may use the same value for all of the nodes (often zero). For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1030 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions.

The truncator 1035 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1035 receives (as output from the right bit shifter 1030) more bits than it outputs (e.g., receiving 32 bits but outputting a maximum of 16 bits).

Finally, the LUT 1040 implements the non-linear activation function. The full (e.g., 16-bit, 8-bit) output of the truncator 1035 is passed to the multiplexer 1045, while a subset of the output bits (e.g., 5 bits) are also split off to the LUT 1045. This LUT effectively implements a mapping table representing the activation function for the neural network computation node, and the multiplexer 1045 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions such as the Rectified Linear Unit (RELU), periodic activation functions, etc. are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions with can be implemented using the modulus function of the truncator 1035. In this case, the period of the period function is the full truth table provided to the lookup table 1040, with the modulus function meaning that only the 5 least significant bits of the output from the right bit shifter 1030 will affect the value output by the lookup table 1040.

FIG. 11, as mentioned, conceptually illustrates a dot product input processing circuit 1100 of some embodiments. As shown, the circuit 1100 receives the output of two dot product bus lanes (dot product input A and dot product input B). These inputs are each gated by AND gates 1105 and 1110, which use enable bits from the cluster controller to specify which dot product to use as input (or both), in certain cases. As mentioned above, in some embodiments each post-processing unit receives the output of a different corresponding dot product bus lane as its first dot product input (i.e., DP input A). That is, if there are N dot product bus lanes and N post-processing units in a cluster, then the nth post-processing unit receives its first dot product from the nth dot product bus lane. The second dot product input (i.e., DP input B) for each post-processing unit is from a different lane.

In this example, the activation size has the option of being either a first size (e.g., 4-bit) or twice that size (e.g., 8-bit). In the simplest case, in which (i) the dot product for a node has few enough input/weight values to be performed in one cycle, (ii) the activation size is the smaller size, and (iii) there are no sparsity violations with the filter slices assigned to each core, then the remainder of the circuit 1100 effectively acts as a pass-through for the first dot product input. The AND gate 1105 enables this first dot product input, while the AND gate 1110 gates the second dot product to 0. However, in other situations, the adder 1115, left-shift operator 1120, and adder 1125 enable the dot product calculation for a neural network node to be completed and provided to the other post-processing operations. In addition, the left shift circuit 1120 can also be used to align a dot product to ensure that the binary point is in the correct location for the input value. The operations of these circuits to compute more complex dot products are described further below.

In addition to these dot product operations, in some embodiments the post-processing units include additional circuitry for performing operations for neural network computation nodes that do not use dot products. As noted above, the nodes of some neural network layers use computations that do not include dot products. For example, a convolutional neural network will typically include pooling layers that reduce the number of activations by performing a computation on spatially-proximate groups of activations (i.e., the outputs of spatially-proximate nodes). Typical pooling operations include average pooling (reducing a group of activations to a single activation value by computing the average of the activations) and max pooling (reducing a group of activations to a single activation value by selecting the maximum value of the activations). Element-wise operations, in some embodiments, use inputs from multiple layers that are the same shape (i.e., that have the same size and number of activation grids), and add or multiply the corresponding elements from those layers.

FIG. 12, as mentioned, conceptually illustrates an ALU input processing circuit 1200 of some embodiments. As shown, the ALU input processing circuit 1200 receives a set of ALU inputs (in this case 4) from an ALU bus that carries activation values directly from the cores. The ALU inputs for each post-processing unit are selected from more than one core, as described in more detail below by reference to FIG. 24. A multiplexer 1205 selects one of these inputs (based on configuration data from the local cluster controller).

The selected input is sent to the activation decoder 1210, which sign-extends the input value (e.g., by adding an extra bit to this value). For instance, a 4-bit input activation would be sign-extended into a 5-bit value. A fourth ALU input is also provided in some embodiments, that carries an input activation of a different (e.g., larger) size. For example, if the first three ALU inputs carry 4-bit inputs (sign-extended to 5-bits each), the larger fourth ALU input of some embodiments carries an 8-bit input activation (e.g., stored in a portion of the core RAM that could hold two adjacent 4-bit activation values). A multiplexer 1212 selects either the sign-extended smaller input activation from the activation decoder 1210 or the larger input activation, depending on configuration data from the local cluster controller (e.g., based on the size of the current input activations).

The math circuit 1215 is a set of circuit blocks that performs operations on a pair of operands. In some embodiments, the first operand is the decoded ALU input from the activation decoder 1210 (or the larger fourth ALU input) and the second operand is either a preset value or the previous output of the math circuit 1215. Some embodiments also subject the first input to a reverse shift and scale, if needed, to put this input in the same number system as the second operand. The shift and scale values are determined by configuration data from the cluster controller, which also provides data to the math circuit 1215 to indicate which of a set of possible operations the math circuit 1215 performs in a given cycle.

In some embodiments, the math circuit 1215 can be configured to perform addition (e.g., for both element-wise addition and average pooling), multiplication (e.g., for element-wise multiplication) and comparison (for maximum pooling). In some embodiments, for average pooling and addition, an 18-bit adder is used. For maximum pooling, an 8-bit comparator is used. For multiplication, an 8-bit×8-bit multiplier is used, with the lowest two bits of precision of the result rounded off to keep the binary place in the same position. Other embodiments use different circuits to enable these computations.

In addition, the math circuit can also perform post or copy operations. Both of these operations read through one activation layer, possibly doing some computation on each activation (post) and transporting the result to a core for storage. They rely on configuration instructions from the cluster controller to setup the computation and transportation. For these operations, the math function is identity, and can be implemented as addition with 0 as the second input.

The post operation is used in some embodiments to pass an activation value through the network to be used as an input to a subsequent layer, skipping over at least one layer in between. The activation value may still be used as an input to in-between layers, but is also consumed by the later layer. In some embodiments, some computations are still performed on the activation value during the post operation (e.g., scaling) in order to prepare the activation value for input to the later layer.

The copy operation is used in some embodiments to move activations (without performing any intermediate computations) to different locations in order to optimize processing. For example, as layers are processed, the activation memory partition (described in more detail below with reference to FIG. 17) may no longer be optimally packed for subsequent layers. The copy operation is therefore used by the compiler to defragment the activation memory across cores and clusters. Another example is in situations where there are competing constraints on the destination for the output of a given layer. One such situation is a skip layer, which feeds two layers each with a possibly different computation footprint (e.g., number of dot product terms per filter). The compiler would need to reshape the activations of the skip layer for the second computation, and can do this by using the copy operation in some embodiments (as well as other related operations, including merge operations or split operations).

Each of these mathematical operations requires multiple clock cycles in the circuit of some embodiments, as only a single input can be received each cycle. The register 1220 holds the previous output of the math circuit 1215 until that output is required as an operand for the next operation of the math circuit 1215, or the operation is complete and the value is sent to the other post-processing operations (as shown in FIG. 10).

FIGS. 13-16 conceptually illustrate different examples of math computations by the math circuit 1215, specifically average or maximum pooling, element-wise addition, and element-wise multiplication. As discussed above, the math circuit takes as its first input operand the decoded ALU input, shifted and scaled as necessary, and as the second input operand either a preset value or the previous output of the math circuit. In some embodiments, the math circuit selects the second operand based on an accumulate signal from the controller.

The circuit selects from the available math operations using an operation type input from the controller. In some embodiments, the operation type input is a 6-bit opcode that specifies whether the operation is a pooling, addition, or multiplication operation. In some such embodiments, the input also includes an additional bit that specifies an additional sub-type. For example, when the opcode is for a pooling operation, the additional bit specifies whether it is an average pooling or maximum pooling operation.

Figure 13:
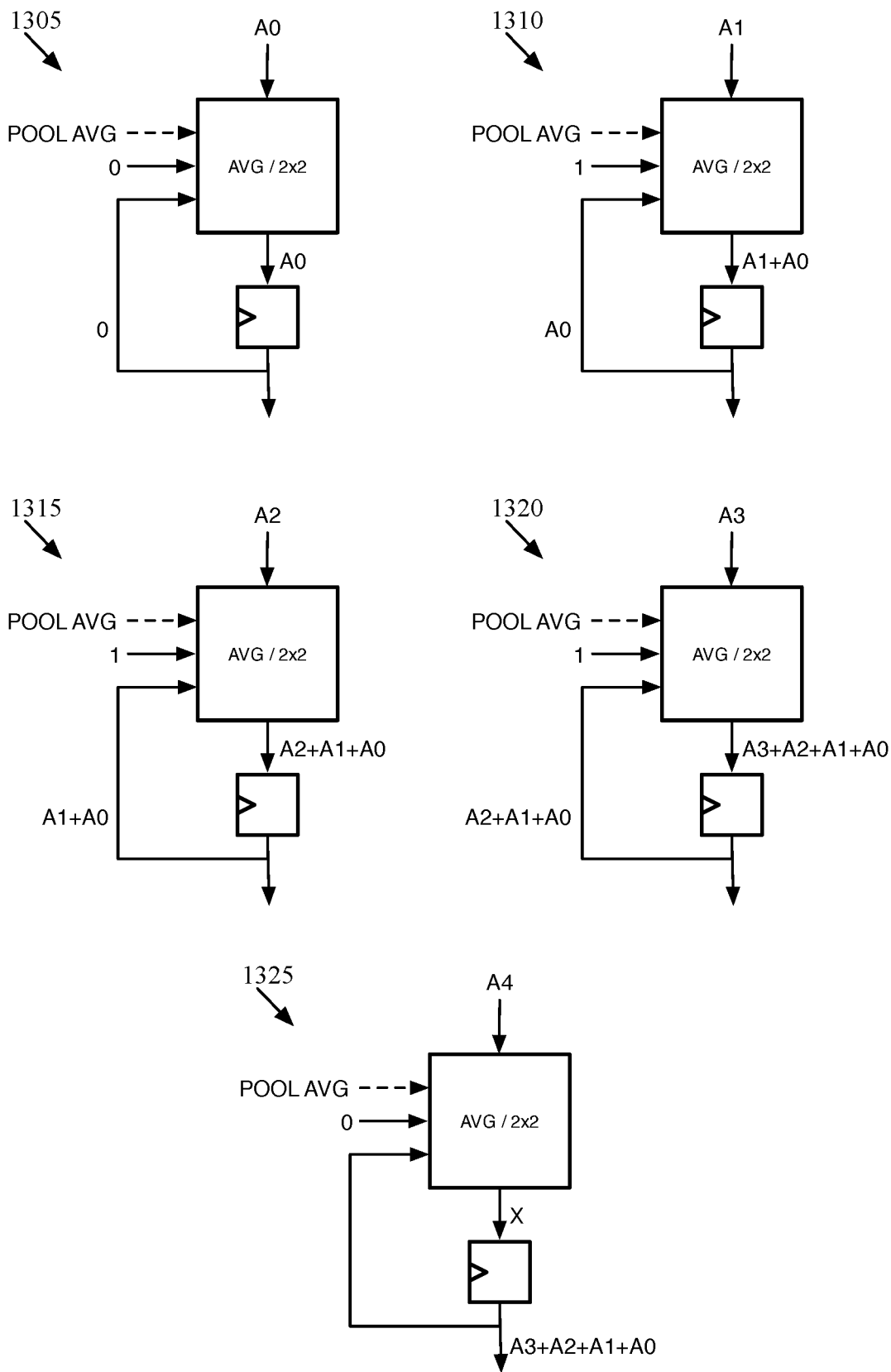
FIG. 13 conceptually illustrates an example of an average pooling computation by the math circuit component of some embodiments.

FIG. 13 illustrates an example of the math circuit performing an average pooling operation for a 2×2 grid of activation inputs from a single layer. The four inputs (A0, A1, A2, A3) are received one at a time (e.g., in subsequent clock cycles) as primary input, added using the 18-bit adder, and scaled appropriately to calculate the average value. In this example, the operation type is seven bits (six bits to specify a pooling operation and one extra bit to specify that it is an average pooling operation). The math circuit also receives shift/scale factors (not shown) as configuration data in some embodiments.

In the first (initial) cycle 1305, the activation input A0 is received at the first operand input. The accumulate signal input is off, indicating that the secondary operand input should be a preset value (zero, in this case defined as the preset based on the operation type). Accordingly, the math circuit 1215 receives input value A0 and outputs value A0 to the register.

In the second cycle 1310, the circuit receives the next input A1 as the first operand. The accumulate signal input is on, so the second operand is read from the register 1220, currently storing the result of the previous output, A0. The math circuit therefore outputs value A1+A0 to the register. In the third cycle 1315, the circuit receives the next input A2 as the first operand. The accumulate signal input is on, so the second operand is read from the register 1220, currently storing the result of the previous output, A1+A0. The math circuit therefore outputs value A2+A1+A0 to the register. In the fourth cycle 1320, the circuit receives the final input A3 as the first operand. The accumulate signal input is on, so the second operand is read from the register 1220, currently storing the result of the previous output, A2+A1+A0. The math circuit therefore outputs value A3+A2+A1+A0 to the register.

Finally, in the fifth cycle 1325, the accumulate signal is off, so the math circuit either begins a new calculation (if the input data is available at this time) or does not perform an operation. The accumulated result of the previous calculation is not used as the second operand input. In this example, the first operand input to the math circuit is the next activation A4 for the next calculation, in this case a new average pooling operation. However the math circuit 1215 could be configured to perform any different operation now that the accumulation is reset. The final output of the example calculation, namely A3+A2+A1+A0, is selected by the multiplexer 1015 and used for additional post-processing operations as described above with reference to FIG. 10.

In some embodiments, the math circuit output is scaled after each cycle, whereas in other embodiments the output is scaled after all the inputs have been added, either by the math circuit or further downstream as part of the scaling operations performed in the shared post-processing datapath after the ALU datapath. For instance, in some embodiments the averaging and any other scaling operations are applied to the output by the multiplier 1025 in the shared post-processing datapath.

In certain cases, average pooling operations may be performed by pooling in one direction (e.g., along each row) of a grid and then subsequently pooling in the other direction (e.g., by averaging the averages of each row). For instance, for 9×9 pooling, adding all of the 81 inputs together in the adder may result in too large of an output value for the adder in the math circuit. As such, some embodiments add together and average the 9 inputs in the first row, then add together and average the 9 inputs in the second row, etc., before adding together and averaging all of these 9 resultant values. However, because each of the 9 intermediate values are quantized for storage by the shared post-processing datapath shown in FIG. 10, precision is lost using this technique as well in some embodiments.

Figure 14:
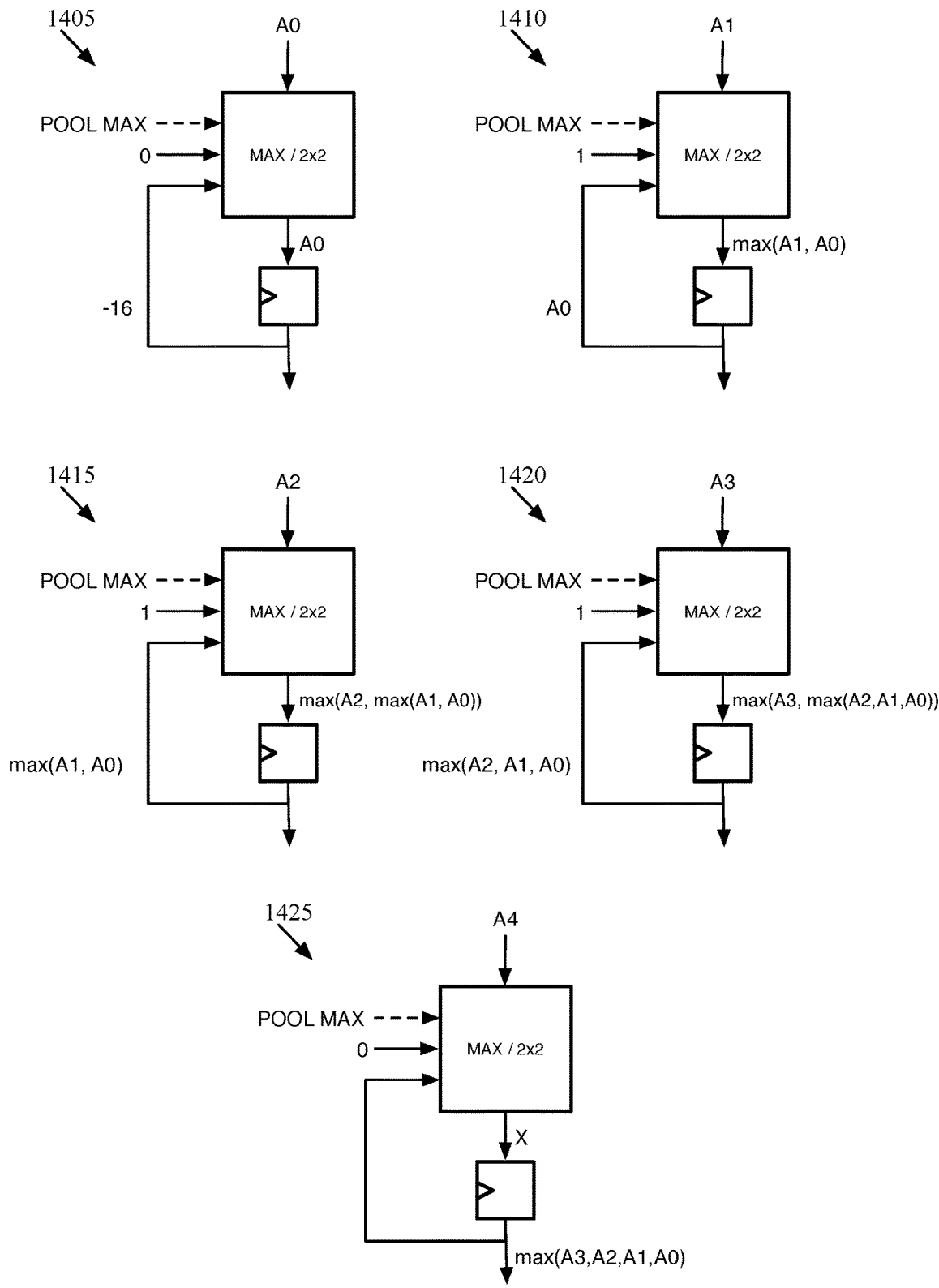
FIG. 14 conceptually illustrates an example of a max pooling computation by the math circuit component of some embodiments.

FIG. 14 illustrates an example of the math circuit performing a maximum pooling operation for a 2×2 grid of activation inputs from a single layer. The four inputs (A0, A1, A2, A3) are received one at a time (e.g., in subsequent clock cycles) as primary input, and compared using the 8-bit comparator. In this example, the operation type configuration input uses seven bits (six bits to specify a pooling operation and one extra bit to specify that it is a maximum pooling operation).

In the first (initial) cycle 1405, the activation input A0 is received at the first operand input. The accumulate signal input is off, indicating that the secondary operand input should be a preset value (−16, in this case defined as the preset based on the operation type). The preset value is chosen as the lowest value possible, which is −16 for 5-bit signed integers. This ensures that the output of this first comparison will always be the value received at the primary input, so that the initial value A0 is the one stored at the register 1220 instead of a result from a previous computation.

In the second cycle 1410, the circuit receives the next input A1 as the first operand. The accumulate signal input is on, so the second operand is read from the register 1220, currently storing the result of the previous output, A0. The math circuit therefore outputs value max(A1,A0) to the register. For example, if A1>A0, then the math circuit outputs A1, and if A0>A1 the math circuit outputs A0. In the third cycle 1415, the circuit receives the next input A2 as the first operand. The accumulate signal input is on, so the second operand is read from the register 1220, currently storing the result of the previous output, max(A1,A0). The math circuit therefore outputs the maximum of A2 and max(A1,A0) to the register. This is the same as outputting the value max(A2,A1,A0). For example, if A2>A1>A0, then the math circuit outputs A2. In the fourth cycle 1420, the circuit receives the final input A3 as the first operand. The accumulate signal input is on, so the second operand is read from the register 1220, currently storing the result of the previous output, max(A2,A1,A0). The math circuit therefore outputs the maximum of A3 and max(A2,A1,A0) to the register. This is the same as outputting the value max(A3, A2,A1,A0). For example, if A3>A2>A1>A0, then the math circuit outputs A3.

Finally, in the fifth cycle 1425, the accumulate signal is off, so the math circuit either begins a new calculation (if the input data is available at this time) or does not perform an operation. The accumulated result of the previous calculation is not used as the second operand input. In this example, the first operand input to the math circuit is the next activation A4 for the next calculation, in this case a new maximum pooling operation. However the math circuit 1215 could be configured to perform any different operation now that the accumulation is reset. The final output of the example calculation, namely max(A3,A2,A1,A0), selected by the multiplexer 1015 and used for additional post-processing operations as described above with reference to FIG. 10.

In certain cases, maximum pooling operations may be performed by taking the maximum in one direction (e.g., along each row) of a grid and then subsequently taking the maximum in the other direction (e.g., by taking the maximum of the maximums of each row). Unlike with the average pooling operation, there is no quantization penalty since a single value is being kept in each case, rather than combining values.

Figure 15:
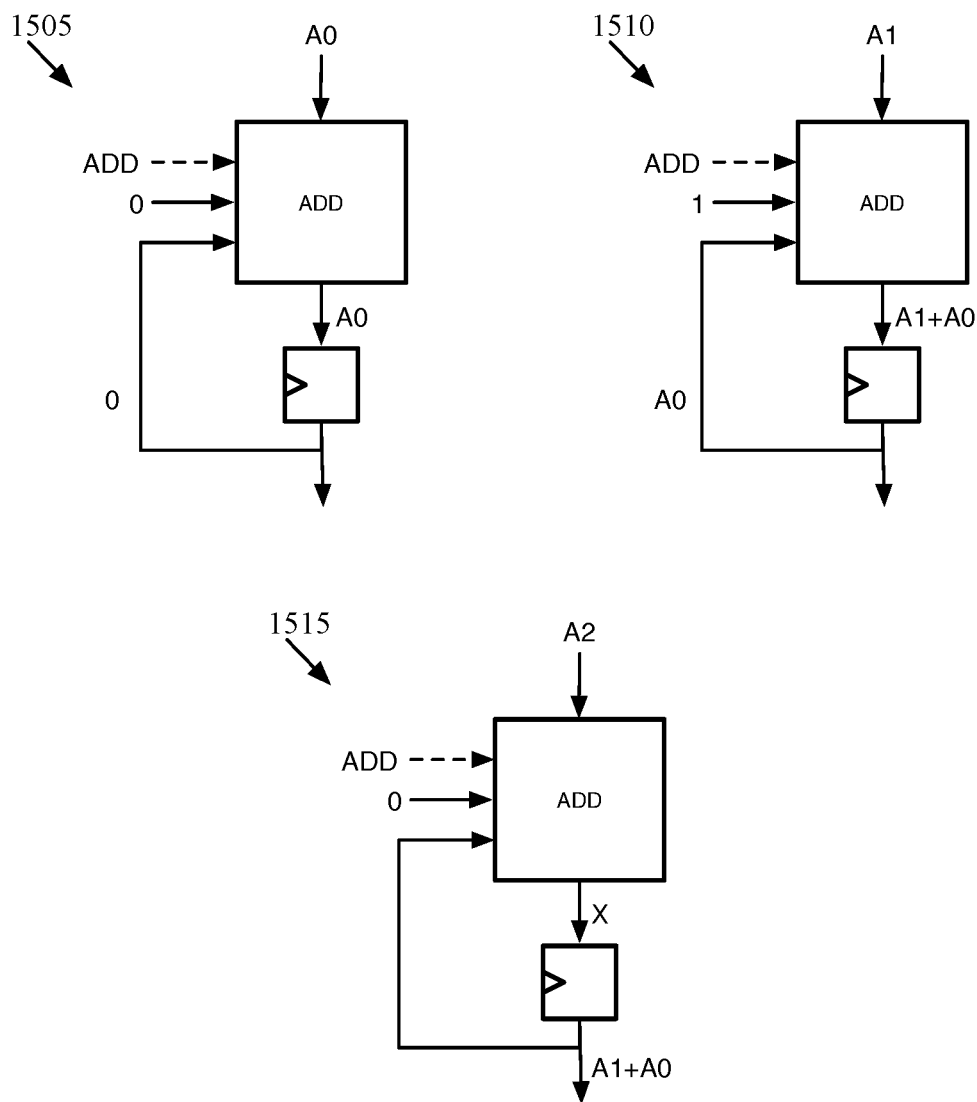
FIG. 15 conceptually illustrates an example of an element-wise addition computation by the math circuit component of some embodiments.

FIG. 15 illustrates an example of the math circuit performing an element-wise addition operation for activation inputs from two layers. The two inputs (A0, A1) are received one at a time (e.g., in subsequent clock cycles) as primary input, and added using the adder sub-block of the math circuit block. In this example, the configuration data specifying the operation type specifies an addition operation (unlike for the pooling operations, the seventh bit that differentiates between average and max pooling can be ignored in this case).

In the first (initial) cycle 1505, the activation input A0 is received at the first operand input. The accumulate signal input is off, indicating that the secondary operand input should be a preset value (0, in this case defined as the preset based on the operation type because 0 is the additive identity). Accordingly, the math circuit 1215 receives input value A0 and outputs value A0 to the register. In the second cycle 1510, the circuit receives the next input A1 as the first operand. The accumulate signal input is on, so the second operand is read from the register 1220, currently storing the result of the previous output, A0. The math circuit therefore outputs value A1+A0 to the register.

Finally, in the third cycle 1515, the accumulate signal is off, so the math circuit either begins a new calculation (if the input data is available at this time) or does not perform an operation. The accumulated result of the previous calculation is not used as the second operand input. In this example, the first operand input to the math circuit is the next activation A2 for the next calculation, in this case a new addition operation. However the math circuit 1215 could be configured to perform any different operation now that the accumulation is reset. The final output of the example calculation, namely A1+A0, is selected by the multiplexer 1015 and used for additional post-processing operations as described above with reference to FIG. 10.

Figure 16:
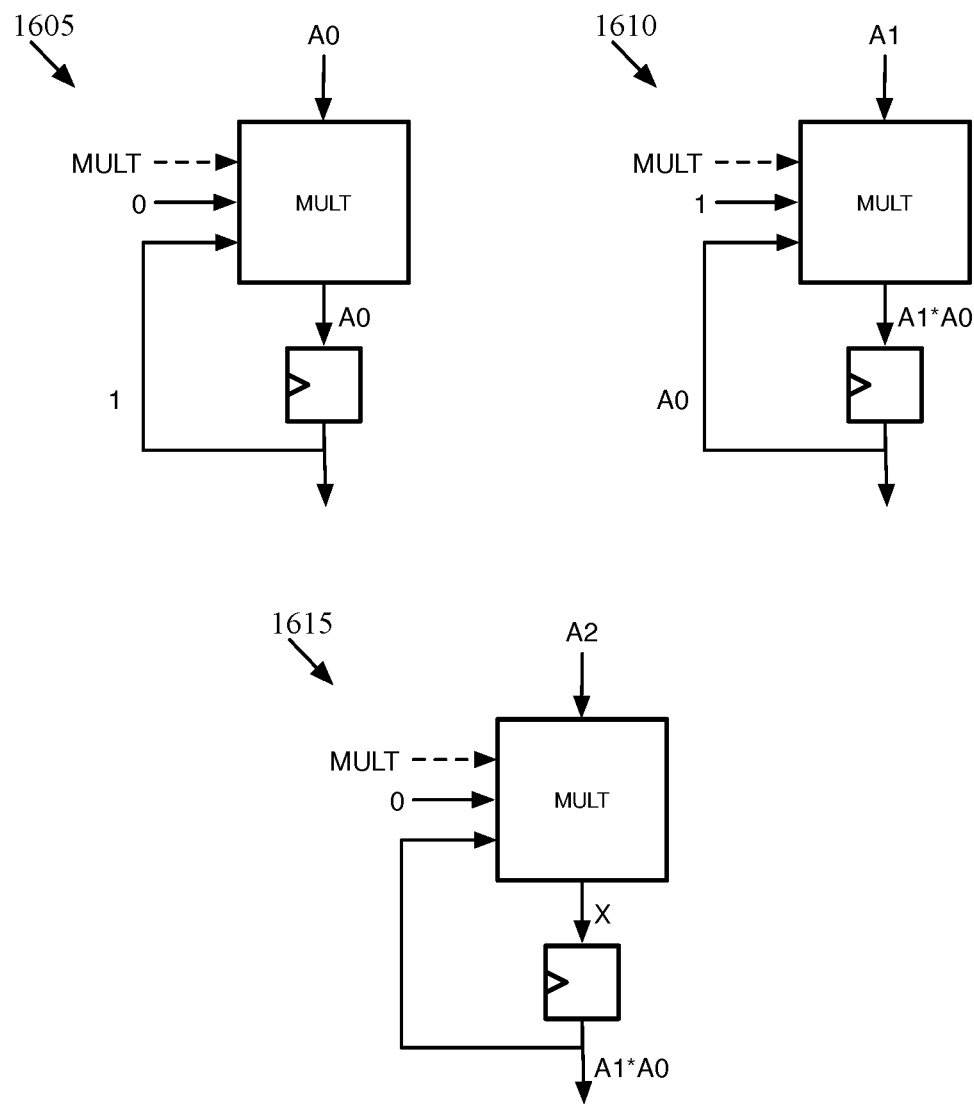
FIG. 16 conceptually illustrates an example of an element-wise multiplication computation by the math circuit component of some embodiments.

FIG. 16 illustrates an example of the math circuit performing an element-wise multiplication operation for activation inputs from two layers. The two inputs (A0, A1) are received one at a time (e.g., in subsequent clock cycles) as primary input, and multiplied using the multiplier sub-block of the math circuit block. In this example, the configuration data specifying the operation type specifies an addition operation (unlike for the pooling operations, the seventh bit that differentiates between average and max pooling can be ignored in this case).

In the first (initial) cycle 1605, the activation input A0 is received at the first operand input. The accumulate signal input is off, indicating that the secondary operand input should be a preset value (1, in this case defined as the preset based on the operation type because 1 is the multiplicative identity). Accordingly, the math circuit 1215 receives input value A0 and outputs value A0 to the register. In the second cycle 1610, the circuit receives the next input A1 as the first operand. The accumulate signal input is on, so the second operand is read from the register 1220, currently storing the result of the previous output, A0. The math circuit therefore outputs value **A1*A0** to the register.

Finally, in the third cycle 1615, the accumulate signal is off, so the math circuit either begins a new calculation (if the input data is available at this time) or does not perform an operation. The accumulated result of the previous calculation is not used as the second operand input. In this example, the first operand input to the math circuit is the next activation A2 for the next calculation, in this case a new multiplication operation. However the math circuit 1215 could be configured to perform any different operation now that the accumulation is reset. The final output of the example calculation, namely **A1*A0, is selected by the multiplexer 1015 and used for additional post-processing operations as described above with reference to FIG. 10. As described above, the multiplexer 1015 selects between the output from the math circuit (e.g., the average pooling, max pooling, element-wise addition, or element-wise multiplication) or the output of the dot product input processing circuit 1005**.

Figure 17:
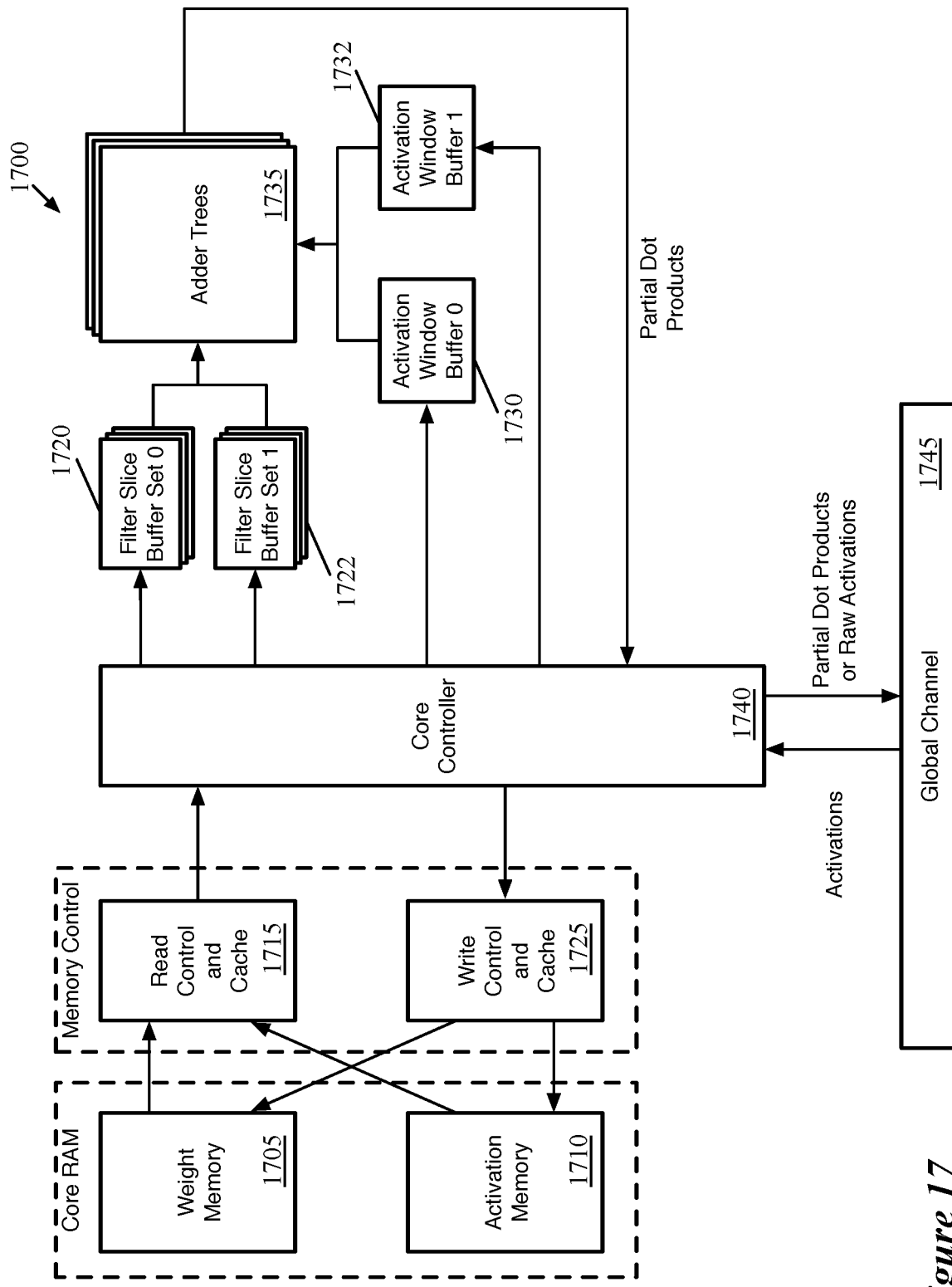
FIG. 17 conceptually illustrates the data flow within one of the cores of some embodiments for a dot product computation.

As mentioned, the dot product cores perform the majority of the dot product computation of the chip fabric of some embodiments. FIG. 17 conceptually illustrates the data flow 1700 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1705 and activation values in the activation memory 1710. In some embodiments, as shown, these memories 1705 and 1710 are part of a single block of memory for the core (e.g., banks of random access memories such as SRAMs). In addition to storing weight and activation values, in some embodiments the microprocessor of the IC can use the memories in the cores as overflow memory (e.g., to store an image before the image is processed and provided as input to the neural network fabric). The manner in which the weight data and activation values are stored in some embodiments is described in detail below by reference to FIGS. 20-23.

The weight values are part of the network parameters and thus are determined at compile time (and do not change at runtime), while the activation values (the input values to a particular node or set of nodes being computed) are the output values from a previous computation (or, for the first layer, are otherwise based on the network input) and thus are determined at runtime. Thus, the weight memory 1705 is typically larger than the activation memory 1710 (e.g., 512 KB to 64 KB), as the activation memory is at least party overwritten for each new layer of the neural network while the weight memory 1705 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/−1). In other embodiments, the weights are encoded in such a manner that less than 1 bit of the weight memory 1705 is allocated per weight value (e.g., by encoding the weight values in such a way that many of the zeros are removed, while storing additional data for each non-zero weight value).

The read controller and read cache 1715 reads data from the weight memory 1705 into sets of filter slice buffers 1720 and 1722 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values, as described in detail below).

Some embodiments include both primary filter slice buffers 1720 and secondary filter slice buffers 1722, as shown in this figure. In a given clock cycle, at most one of these sets of filter slice buffers is used to compute dot products (e.g., using multiplexers to select only one of the sets of weight value data). For simpler dot product computations, only the primary filter slice buffer 1720 is needed, so there is no need to load weight values into the secondary filter slice buffers 1722. However, in other cases, both sets of filter slice buffers may be used, as described below (e.g., when dot products are too large to be computed in a single clock cycle using only the primary buffers).

The read control and cache 1715 also reads data (input values) from the activation memory 1710 into the activation window buffers 1730 and 1732. In addition, the read controller 1715 arranges the input values within the activation window buffers 1730 and 1732 in some embodiments to match up with the weight values in the filters. In some embodiments, the input values in an activation window read into the buffers 1730 (and 1732) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1730 and a secondary activation window buffer 1732. In a given clock cycle, at most one of these sets of activation window buffers is used to compute dot products (e.g., using multiplexers to select only one of the sets of activation input values). For simpler dot product computations, only the primary activation window buffer 1720 is needed, so there is no need to load activation inputs into the secondary activation window buffer 1722. However, in other cases, both activation window buffers may be used (e.g., when dot products are too large to be computed in a single clock cycle using only the primary buffers). In some embodiments, as shown, the same read controller and cache 1715 is used to read data from both the weight memory partition 1705 and the activation memory partition 1710. In such embodiments, the cache is used to store weight value data when reading the weights from the weight memory 1705. For each pass, this memory control circuit first reads the encoded weight data and provides this data to the core controller 1740 (which decodes weight data and loads the decoded weight data into the filter slice buffers), then reads input values and provides these values to the core controller 1740 (for the core controller to load the input values into the activation window buffer(s) interspersed with the computation of dot products by the adder tree circuits 1745).

The adder trees 1745 compute the dot products between the weight values represented in the filter slice buffers 1720 and the input values in the activation window buffer 1730. The details of these partial dot product computation circuits of some embodiments are described below by reference to FIG. 18. These adder trees 1745 output partial dot products (e.g., 10-bit values) that are provided to the dot product bus, which combines the partial dot products with other partial dot products as described above. In some embodiments, the number of filter slice buffers in each of the sets 1720 and 1722 is equal to the number of adder trees 1735 in the core, as well as the number of dot product bus lanes, post-processing units, and activation write bus lanes in each segment. Thus, for a typical neural network computation node, the partial dot products computed by the adder trees 1735 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index) to its destination core.

The core controller 1740 configures and coordinates the operation of the read and write controllers 1715 and 1725 in addition to the filter slice buffers 1720, activation window buffer 1730, and adder trees 1735. Furthermore, the core controller 1740 receives the input activations and weights from the read controller 1715, and loads them into the correct slots in the sets of filter slice buffers 1720 and 1722 and the activation window buffers 1730 and 1732. Lastly, when the adder trees 1735 output their partial dot product values, the core controller 1740 sends these values to the dot product bus in the global channel 1745. Alternatively, the core controller 1740 directs the input activations to the ALU bus in the global channel for non-dot product computations. When the activations for the next layer are output, the activation write bus carries these values to the core controller 1740, which provides them to the write control and cache 1725 to be written to activation memory 1710.

To reduce the circuit area and power required for dot product computations (which use the majority of resources for neural network inference), the partial dot product computation circuits (e.g., the adder trees 1735) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 18:
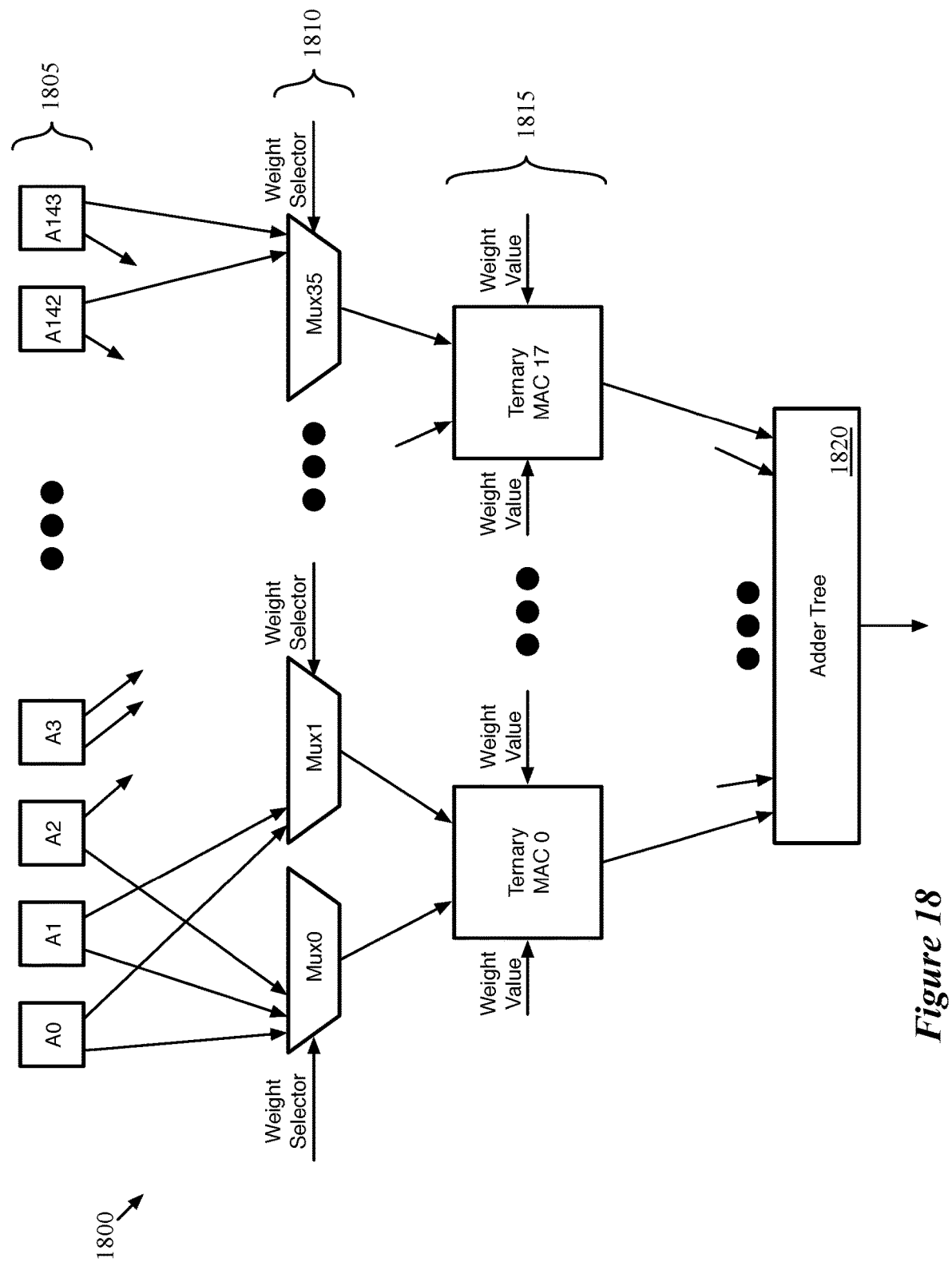
FIG. 18 conceptually illustrates an example of a partial dot product computation circuit for a guaranteed weight sparsity of at least 75%.

FIG. 18 conceptually illustrates an example of such a partial dot product computation circuit 1800 for a guaranteed weight sparsity of at least 75%. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 1800 includes a set of activation inputs 1805, a set of multiplexers 1810, a set of ternary multiplier-accumulator (MAC) circuits 1815, and an adder tree 1820.

In this example, the dot product computation circuit 1800 includes 144 input values 1805. In different embodiments, the activation window buffer may have different sizes, which defines the size of the partial dot product computation. Each input value storage (e.g., each location in the activation window buffer) is connected to two of the thirty-six multiplexers 1810. In this example, at least 75% sparsity is assumed for each set of weight values, and thus the 144 activation inputs can be reduced to 36 inputs for the actual dot product computation. This significantly reduces the circuit area required for the dot product computation, as the number of adders is reduced by 75% (the adder tree effectively starts with 36 values rather than 144 values), in addition to reducing the amount of weight data that is stored in memory.

The multiplexers 1810 each have eight inputs and receive a set of select bits (the weight selector input) from the core controller that specifies which of these eight inputs to pass to the dot product computation. In some embodiments the weight selector input is a 3-bit value that is stored as part of the weight data for each non-zero weight. Having thirty-six 8-input multiplexers 1810 allows for 288 sets of wires from the activation inputs 1805 to the multiplexers 1810, which is two wires for each activation input. If the sparsity guarantee was only 50%, then seventy-two 4-input multiplexers could be used with two sets of wires for each activation input 1805 (or seventy-two 8-input multiplexers with four sets of wires for each activation input 1805), with similar proportions for different sparsity guarantees and numbers of wires per activation input.

The wire sets from the activation inputs to the multiplexers are arranged such that the compiler can verify that each input value with a nonzero corresponding weight is provided to a different one of the multiplexers 1810. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1805 to the multiplexers 1810. In some embodiments, this algorithm computes two hashes (e.g., with two different hash functions) for each of the activation input locations 1805 that map to two different multiplexers 1810 (e.g., by computing the hash modulo 36). Each activation input location 1805 is wired to these two different multiplexers 1810 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1810 are determined by which of the inputs to the multiplexer carries an input activation value with a nonzero corresponding weight value, and are received from the filter slice buffer. As described further below, these multiplexer select bits are stored for each non-zero weight value (for multiplexers that do not receive any inputs corresponding to non-zero weights, the multiplexer select bits do not matter, and thus do not need to be stored in the encoded weight data). These multiplexers 1810 provide their output to a set of ternary multiply-accumulator (MAC) circuits 1815. The ternary MAC circuits effectively form the leaves of the dot product computation, and the number of such circuits is half the number of multiplexers 1810 (18 ternary MAC circuits 1815 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and −1, with a single multiplication by the positive value afterwards. Removing the multiplication at the leaves saves significant circuit area for a chip with numerous such computation circuits.

To combine the two input values while accounting for the ternary weight values, the ternary MAC circuits 1815 add the two input values from the multiplexers 1810 while also receiving as inputs the corresponding weight data for these input values. In some embodiments, as described further below, the ternary MAC receives two bits of weight data for each of its inputs. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The negative values are accounted for in the bias computation within the post-processing unit, as described above.

The outputs of the ternary MACs provide the inputs to the adder tree 1820 that computes the output for the partial dot product computation. In some embodiments, this adder tree is a standard adder tree circuit that adds pairs of values over several layers. For example, the adder tree 1820 receives 18 inputs for 9 adders, which in turn provide outputs to 4 adders (with an additional output to be added in later), etc. In some embodiments, the inputs to the ternary MACs 1815 are 4-bit inputs (the length of the quantized activation values), and the ternary MACs 1815 output 6-bit values. The adder tree 1820 receives these 6-bit values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs).

While this diagram shows the wires (or some of the wires) connecting each of the input values 1805 to a single partial dot product computation circuit, in some embodiments each of these input values 1805 in the activation window buffer is actually connected to each of the partial dot product computation circuits in the core. That is, for the case with 64 such circuits, each value in the activation slice register is carried by 128 total wires to 128 multiplexers (two for each of the partial dot product computation circuits). In some embodiments, the wiring arrangement is the same for each set of multiplexers (i.e., for each partial dot product computation circuit).

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. In this case, some of the activations 1805 are mapped to three of the multiplexers 1810, rather than two.

Figure 19:
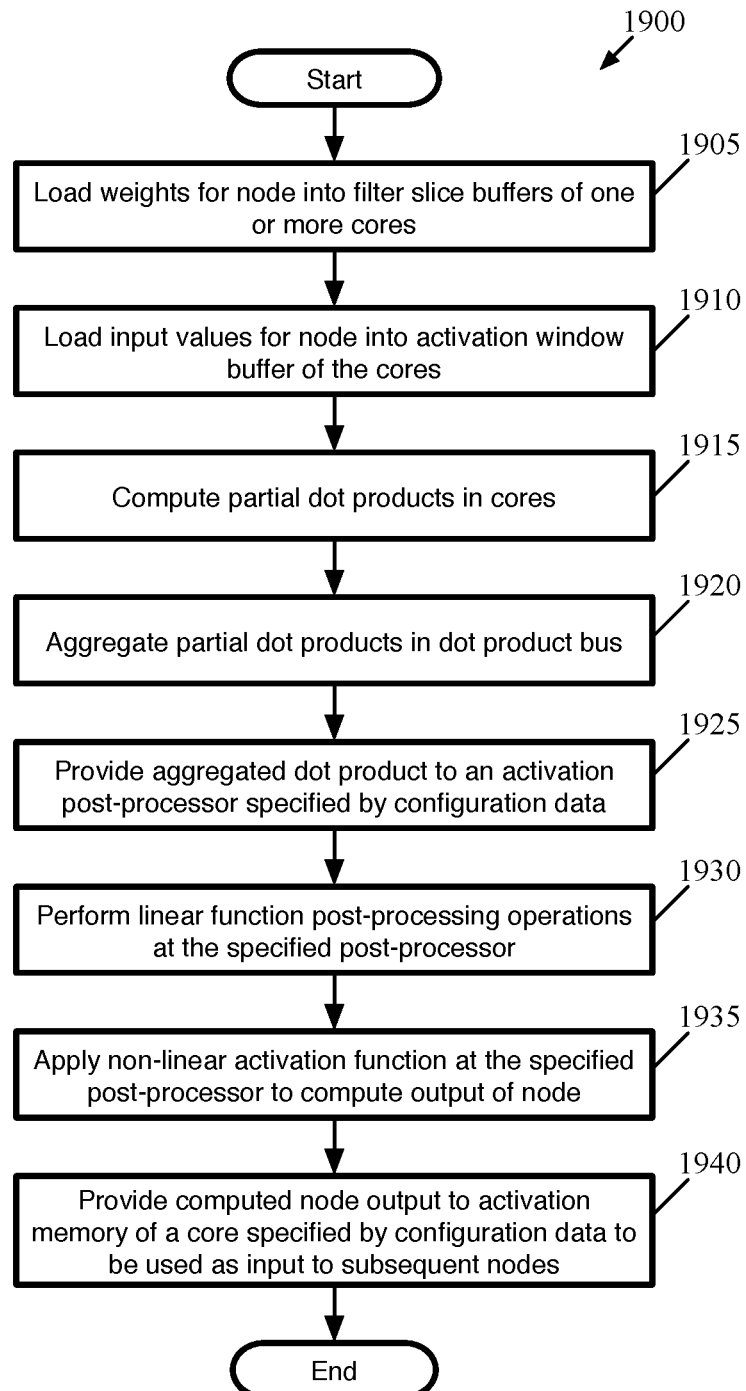
FIG. 19 conceptually illustrates a process of some embodiments for executing a set of instructions (or a portion of a set of instructions) to compute the output of a neural network node.

FIG. 19 conceptually illustrates a process 1900 of some embodiments for executing a set of instructions (or a portion of a set of instructions) to compute the output of a neural network node (specifically, a convolutional or fully-connected node). The process 1900 is executed by the chip fabric of a neural network IC, such as that described above. Typically, the process 1900 is executed simultaneously for multiple nodes, and operations 1910-1940 are performed repeatedly for multiple activation windows (i.e., multiple groups of input values loaded into the activation window buffer) in order to completely execute a layer (or portion of a layer) of the neural network. In the case of the process 1900, the dot product can be computed in a single cycle and does not involve any split filter slices (i.e., no time-multiplexing is required). Additional processes are described below for nodes that involve large dot products, larger input values, or split filters.

As shown, the process begins (at 1905) by loading the weights for a node into filter slice buffers of one or more cores. In addition, the process loads (at 1910) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

The process 1900 then computes (at 1915) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIG. 18, and with ternary weight values of {0, 1, −1}, the multiplication is handled by the ternary MAC circuits shown in this figure.

Next, the process aggregates (at 1920) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1900 then provides (at 1925) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1900 performs (at 1930) linear function post-processing operations. For all dot products, this includes the bias and scale operations described by reference to FIG. 10 above, with the values for these operations sent as configuration data from the cluster controller. In addition, as described below, certain dot products are aggregated over multiple cycles by the dot product input processing circuit shown in FIG. 11 (e.g., if time-multiplexing is required to handle dot products with a large number of components, or for dot products with double the standard number of bits).

Next, the process 1900 applies (at 1935) the non-linear activation function at the post-processing unit to complete the calculation of the node output value. In some embodiments, as shown in FIG. 10, a lookup table is used for this computation (e.g., a 5-bit to 4-bit mapping table). The mapping for each possible set of input bits is provided by configuration data from the cluster controller in some embodiments.

In some embodiments, the operations 1915-1935 are executed to compute the node output without storing the any intermediate values in memory. That is, none of the partial dot products are stored in any memories (e.g., RAM) during the computation within the core, and the same is true before and during the aggregation within the dot product bus. As described below, in some embodiments, the register 1130 is used to aggregate multiple dot product bus inputs. However, in a standard case (e.g., for 4-bit dot products), this register passes the dot product input through and the entire set of operations 1915-1935 is executed in a single clock cycle.

Finally, the process 1900 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s). As described below, once at the specified core, the node output value may be temporarily stored in a write cache until the write cache is full and the data is written to the core memory.

As mentioned, the process 1900 illustrates the most simplistic case for computing a dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs×16 cores=2304 total input values), (iii) all of the weight values are either 0, +α, or −α (and thus can be stored as 0, 1, and −1), and a large enough percentage of the weight values are 0 that the input values with non-zero weight values can each map to a different multiplexer input.

As mentioned above by reference to FIG. 17, each core includes a block of memory to store the weight data and activation values used by the core to compute dot products (i.e., the activation values that are loaded into the activation window buffer and the weight data that is loaded into the filter slice buffers). In some embodiments, each core is allocated the same amount of memory in total, which is divided between weight memory and activation memory for a particular network by the compiler that designs the program for the inference circuit to execute the network. Some embodiments require that each core be divided between weight memory and activation memory in the same manner (i.e., the allocation of weight/activation memory to each core is the same for all of the cores), while other embodiments allow for different allocations between the cores. For example, in some embodiments the allocation is the same for each core within a cluster, but can vary between cores in different clusters (e.g., if a subset of cores are used for a majority of the layers of the network, then that subset of cores might need more of its memory allocated to weight data storage).

Within a core, the weight memory and activation memory partitions are themselves subdivided between layers of the network. As described above, all of the weight data used by a core is stored in the memory of that core at bootup time, because these values are the same for every input provided to the network. On the other hand, the activation values are determined at runtime (and occupy more memory per value than the weight data), so the cores do not store all of the activation values at a time. Depending on the type of network, only two layers of activations may need to be stored at once (the input activation values for the current layer being executed as well as the output activation values for that layer). In this case, once layer L is being executed (using the layer L activations as inputs and outputting the layer L+1 activations), the circuit can overwrite the layer L−1 activations. On the other hand, if a network has residual connections (i.e., the output activations from layer L are used as inputs for more than just layer L+1), then more than two layers of activations may need to be stored at once.

Figure 20:
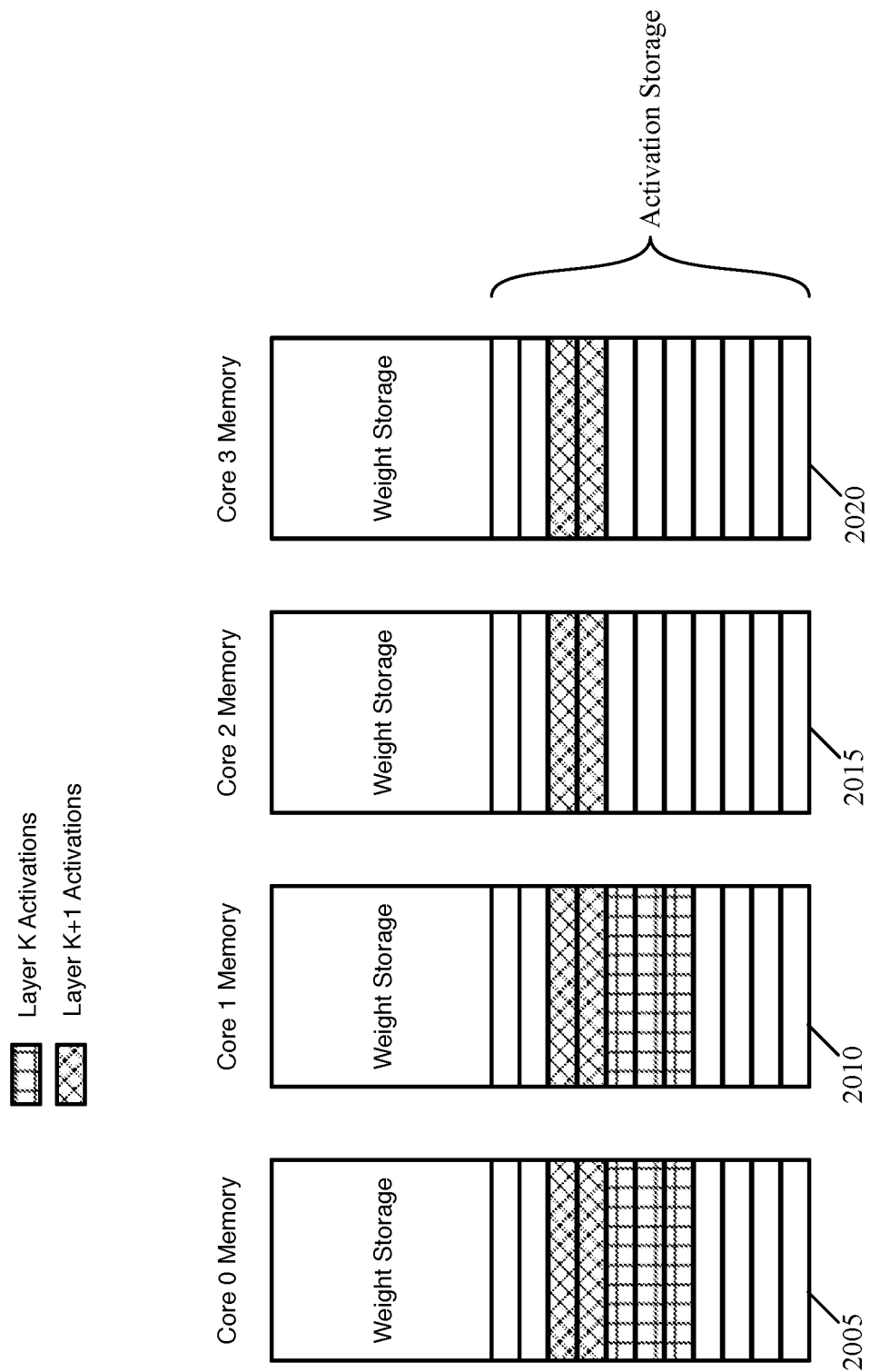
FIG. 20 conceptually illustrates the assignment of layers of activations to memories of four cores within a cluster.

FIG. 20 conceptually illustrates the assignment of layers of activations to memories 2005-2020 of four cores within a cluster. In this example, each of the cores is partitioned into weight storage (shown in the figure as a single block) as well as activation storage (shown as blocks of memory). Each of the blocks within the activation storage represents a set of memory locations (e.g., RAM words) in some embodiments. Though the figure shows a small number of such blocks within each core memory 2005-2020, it should be understood that a typical neural network computation circuit will have thousands of RAM words per memory. In addition, although the activation partition is larger than the weight partition in these examples, the weight partition will often be the larger partition because all of the weight values are stored in the memories at boot time.

The figure illustrates (using different types of cross-hatching) the memory portions allocated to the activation values (i.e., input activations) for each of two layers (layer K and layer K+1). In this example, the activations for layer K are divided across the memories 2005 and 2010 for two of the cores (meaning that only these two cores participate in the dot product calculations for this layer), whereas the activations for layer K+1 are divided across the memories 2005-2020 for all four illustrated cores. For each of the layers, the first RAM word storing activations for that layer is aligned to the same memory address (i.e., the first activation for the layer stored in each core starts at an equivalent memory location within the respective core). In addition, the first activation for a layer starts at the beginning of a RAM word (i.e., the least significant bit in the word) in some embodiments.

In some embodiments, the activation values for a layer are divided evenly among the cores storing the activations for that layer (or as close to evenly as possible). Some embodiments require that the number of cores for a layer is a multiple of the number of cores in a cluster (e.g., a multiple of four for the chip fabric shown above in FIG. 5). Other embodiments simply impose the requirement that the number of two-dimensional activation grids assigned to each core is equal (or as close to equal as possible). Referring to the three-dimensional structure of a layer of activations shown in FIG. 2, each two-dimensional grid of activations is assigned entirely to a single core. As such, if the number of activation grids is not evenly divisible by the number of cores to which those activations are assigned, then some of the cores will be assigned more of the actual activation values than other cores. However, some embodiments assign zero-grids (i.e., grids of activation values equal to zero) to make up the difference and even out the number of activations in each core for the layer. In other embodiments, rather than specifically ensuring the activation values are all zero (which would require generating one or more extra activation value grids of zeros and loading these values into the RAM each time the network is executed), the compiler ensures that the corresponding weight values stored in the weight memory are all zero, such that the data used for these activation value grids does not matter).

In addition, as shown in FIG. 20, all of the activation values for a layer are assigned to a contiguous block of each core's memory. As described further below, in certain cases, a portion of a RAM word may be zero-padded (or left with unverified data that is not used in the computations for the layer) within this contiguous block of memory.

Figure 21:
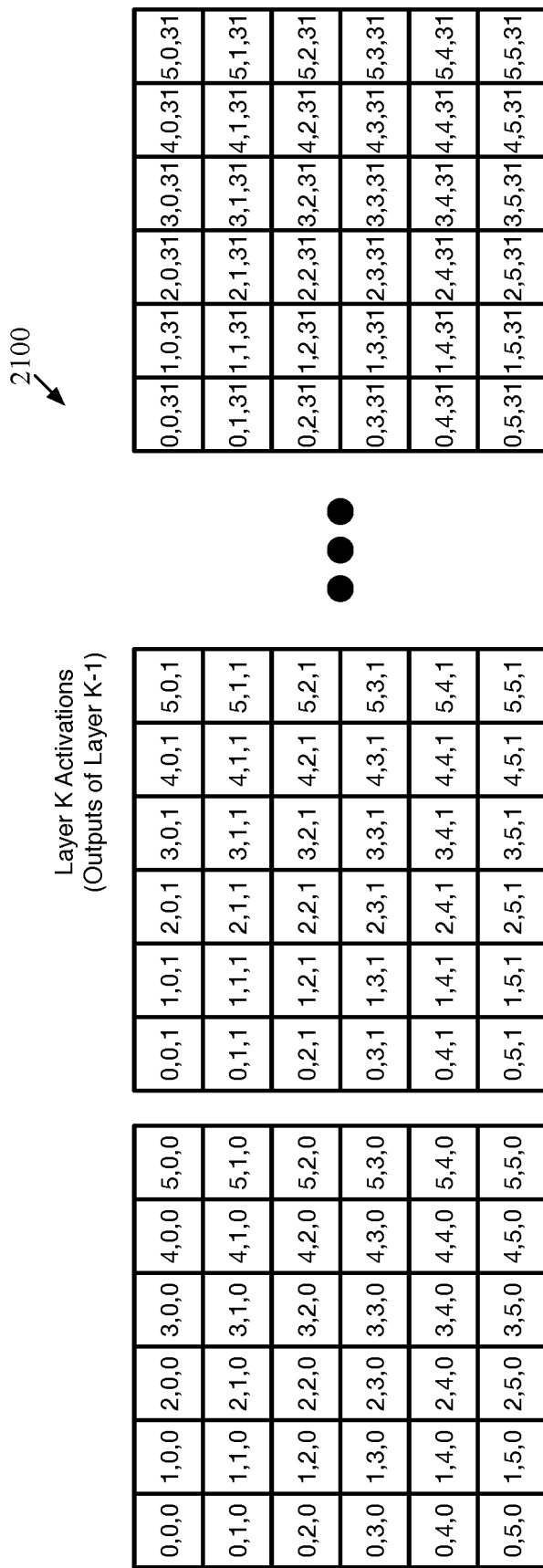
FIG. 21 conceptually illustrates a layer of activation values.
Figure 22:
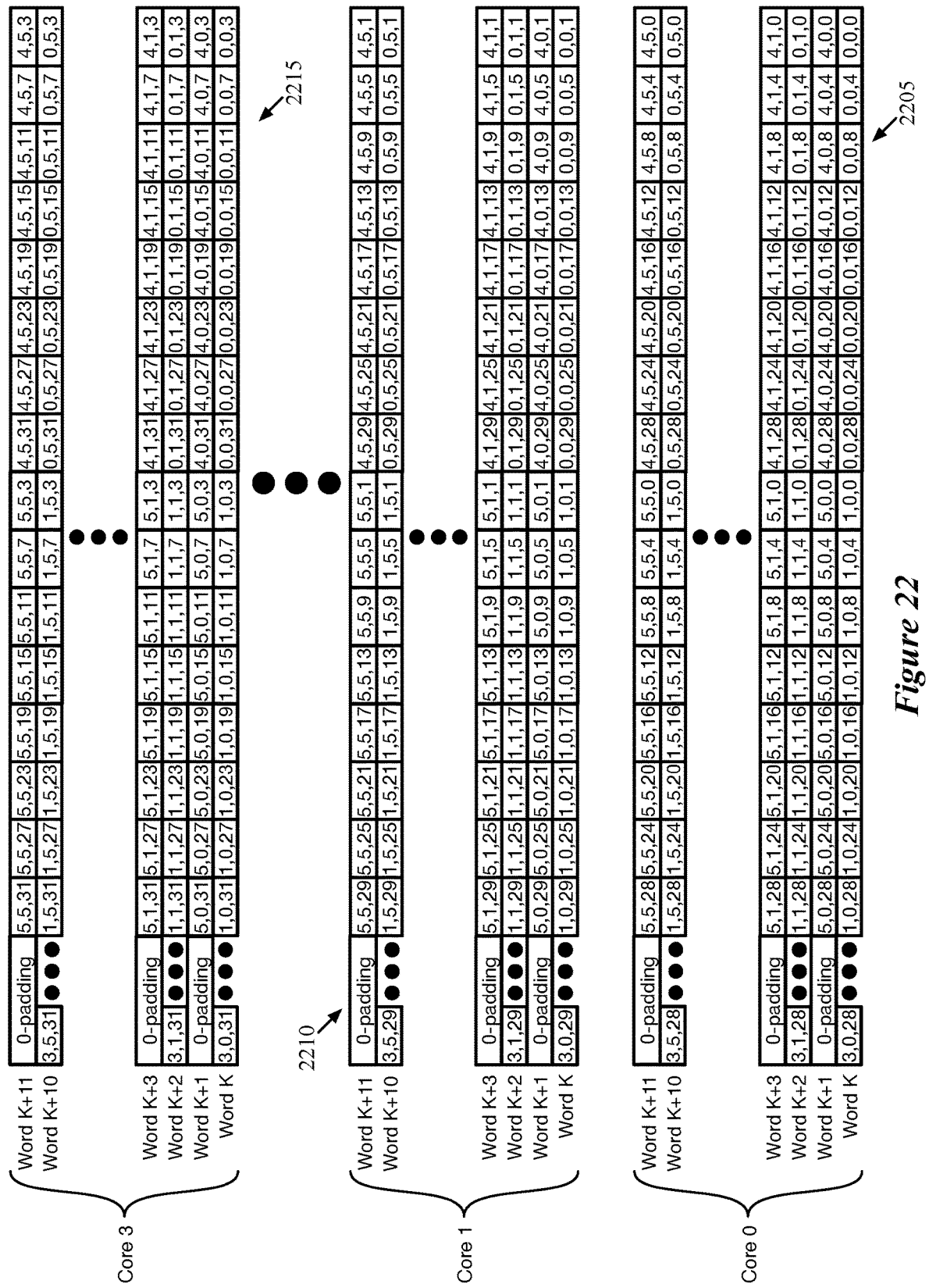
FIG. 22 conceptually illustrates the arrangement of the activation values of FIG. 21 among the memory of four cores.

FIG. 21 conceptually illustrates a layer of activation values 2100, and FIG. 22 conceptually illustrates the arrangement of these activation values 2100 among the memory of four cores. As shown in FIG. 21, the layer K activation values are structured as a 6×6×32 layer (i.e., 32 6×6 grids, meaning that the previous layer most likely had 32 filters). Each activation value in the layer is labeled with a three-dimensional (x, y, z) coordinate. The x-coordinate refers to the column to which the activation belongs (0-5), the y-coordinate refers to the row to which the activation belongs (0-5), and the z-coordinate refers to the grid to which the activation belongs (0-31). Each of these activations will have different values depending on the input data provided to the network, but the activation value at a given coordinate will be stored in the same location in the core memories each time the network is executed.

FIG. 22, as mentioned, illustrates the arrangement of the activation values 2100 according to the activation storage rules of some embodiments. In this case, the compiler determined that the activation values 2100 of Layer K will be stored in four cores of the neural network computation fabric (Cores 0-3). The memories 2205-2215 of each of the cores include numerous banks of RAM in some embodiments, divided into words that can each be read from or written to individually. These words may have different lengths in different embodiments; in this example, the words are each 128 bits long. Thus, if the activation values are each 4-bit values (as is the case in some embodiments), then a single word can hold 32 activation values. When larger 8-bit activation values are used, then a single word holds 16 activation values. In the figure, each word is shown with the least significant bits on the right, which will be referred to as the "start" of the word. Thus, the rightmost 4 bits (least significant nibble) of each word holds the first activation value of the word. In addition, the words are ordered, with this example showing the first word in each core (or at least the first word for the illustrated layer of activation values) at the bottom of the diagram.

To optimize the use of the core memory as well as the efficiency with which the activation values are read from the core memory, some embodiments organize the activation values in the memory according to a set of defined rules (which are shown by way of example in FIG. 22). As mentioned, each two-dimensional grid of activation values is assigned entirely to a single core. In this example, grids $\{0, 4, 8, \ldots 28\}$ are assigned to Core 0, grids $\{1, 5, 9, \ldots 29\}$ are assigned to Core 1, grids $\{2, 6, 10, \ldots 30\}$ are assigned to Core 2, and grids $\{3, 7, 11, \ldots 31\}$ are assigned to Core 3. The compiler may use different algorithms to assign grids of activation values to different cores in some embodiments, so long as the grids are assigned evenly (or as close as possible to evenly) to the cores.

The activation values within a core are not necessarily arranged with all of the activation values of a grid stored contiguously. Instead, within each core, some embodiments store all of the activations for a particular coordinate (i.e., an x-y coordinate) within the grids assigned to that core in a contiguous block. For a typical convolution, all of the activation values at a particular (x,y) coordinate will be used for dot product computations at the same time, so storing these values contiguously helps minimize resources used (and latency) for loading the activation values when computing the dot products for a layer.

As shown, the activation memory for layer K in each core starts with the activations at (0,0) for all of the grids assigned to that core. In this case, eight grids of activation values are assigned to each of the four cores (the 32 grids are evenly divisible by 4, so no zero-grids are required). Thus, the first eight values of the first word in each core (designated as word K) are the activations with (x,y) coordinates of (0,0). In some embodiments, if there are more grids assigned to a core than the number of activation values that a memory location (i.e., a RAM word) can store, then these are split up into separate sets of activations, and only a single word worth of activation values at the same coordinate are stored contiguously. That is, if 35 grids of activation values were assigned to Core 0, then only the first 32 activation values would have coordinates of (0,0). Those first 32 grids would be stored as a contiguous block that iterates through each (x,y) coordinate, followed by the remaining 3 grids of activation values (stored in the same way, iterating through each (x,y) coordinate).

Within the memory 2205-2215 of each core, the first 8 activation values are those located at coordinate (0,0). Next, the algorithm for activation value storage moves to the activation values coordinate (1,0)—that is, the x-coordinate is incremented as the next value in the same row of each grid is stored. This proceeds until the end of the current row is reached (i.e., the activation values with coordinate (5,0)). In some embodiments, once the end of a row in the activation grids is reached, the remainder of the current RAM word is 0-padded. As shown in the figure, this means that the last half (64 bits, or 16 activations) of word K+1 (as well as words K+3, K+5, etc.) in each of the memories 2205-2215 is 0-padded (or padded with unverified data that is never loaded into the activation window buffer). This pattern (arranging the activation values in row-major order) is repeated for each row of activation values in the grids assigned to a given core.

When loading the activation values as inputs to dot product computation, upon reaching the end of a row of the activation grids, the core memory controller returns to the start of the next row, and the activation values from the end of the previous row are not reused. The use of 0-padding (rather than starting the next row of activation values in the same RAM word) avoids the need to read multiple words when starting a new row of convolutional layer computations (which would require additional clock cycles).

As a result of this activation storage algorithm, a given memory location in one source core for a layer will store activations for the same x-y coordinates as that memory location in any of the other source cores. For example, the tenth activation in RAM word K+1 of Core 0 is the activation for coordinate (5,0) in activation grid 4. Correspondingly, the tenth activation in RAM word K+1 of any of the other cores is also an activation for coordinate (5,0), in different activation grids.

The weight values are stored in a similar manner, in some embodiments, with certain differences. Just as activation values for a layer are divided across multiple cores (and, specifically, the activation values for each particular dot product in a layer are divided across the multiple cores), the weight values for each filter in a layer also divided across these same multiple cores. Over the course of a convolutional layer, a particular weight value in a filter is multiplied by numerous activation values, all of which are in the same activation grid. As such, each weight value is stored in the same core as the activation grid that contains the activations by which that weight value is multiplied. However, in some embodiments, the length of each filter slice may be different, even within a single layer, due to the different number of non-zero weight values. That is, even if a filter slice buffer always has 36 (or 40) weight values, the amount of memory required to store those weight values may differ depending on the number of non-zero weight values.

The above-described storage pattern of the input activation values for one layer, in some embodiments, influences the assignment of filters to different indices (i.e., partial dot product computation circuit, dot product bus lane, post-processing circuit, and output bus lane) for the previous layer. As indicated above, in some embodiments the activation write bus operates such that all of the output activation values (which are input activation values for a subsequent layer or layers) computed at a given time (i.e., in a given clock cycle) that are to be stored in a particular core should be computed by post-processing units having a contiguous range of indices. In the typical scenario (e.g., in which the filter slices do not need to be split across multiple partial dot product computation circuits), this means that all of the filters used to compute output activation values that will be stored in a particular core will be assigned by the compiler to a contiguous range of weight value buffers (and thus to a contiguous range of activation write bus lanes).

As mentioned, arranging the input activation values for a layer in this manner enables optimized use of these activation values for computing dot products of the various computation nodes of a layer. Specifically, the arrangement (and use of a cache for words that are read but not fully loaded into the input buffer) enables the cores to load the values into the activation window buffers while minimizing the number of memory reads that are required. In addition, the buffer in each core is implemented as a configurable shift register, so that activation values do not need to be re-loaded between subsequent sets of dot product computations.

Figure 23:
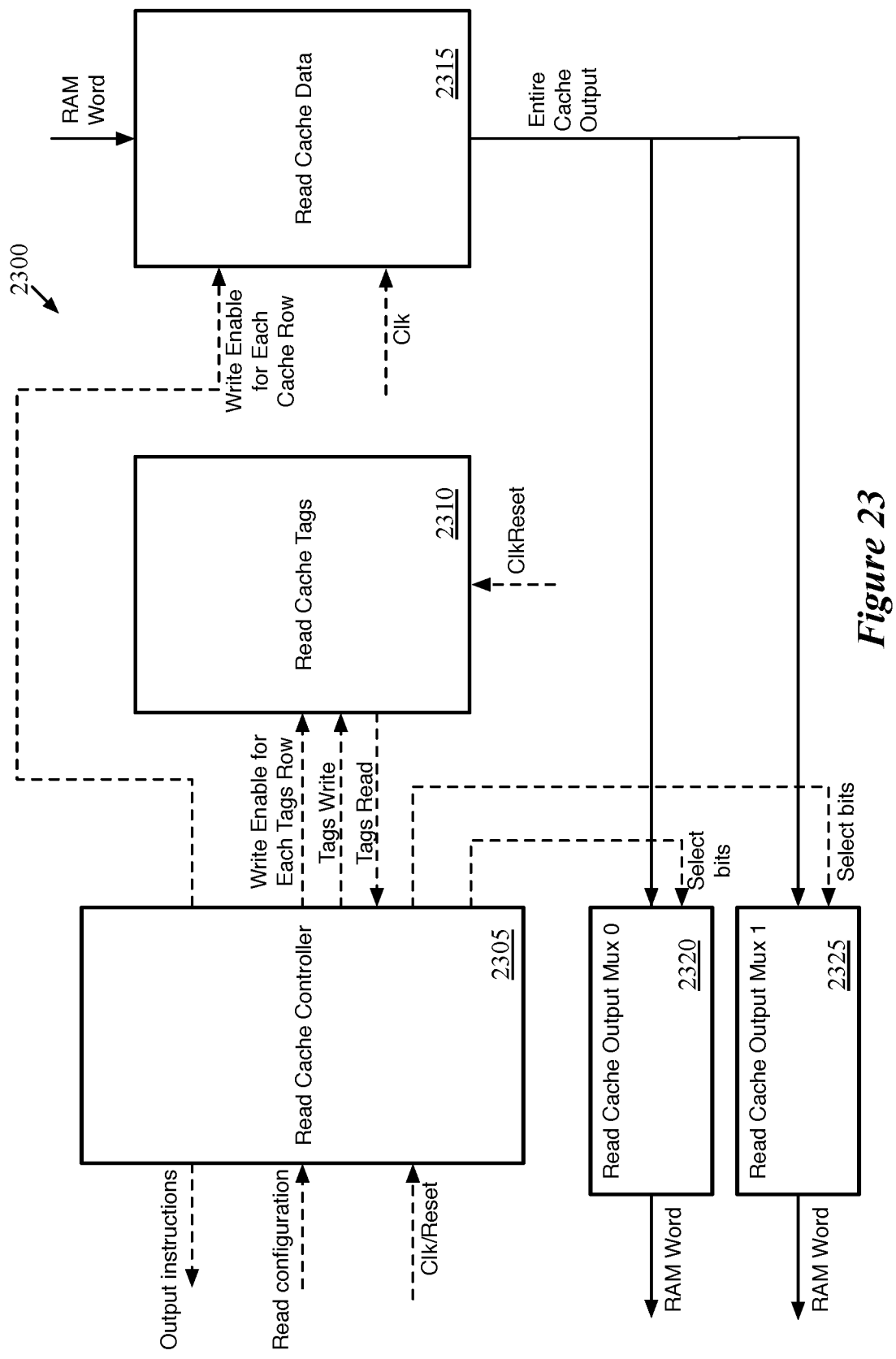
FIG. 23 conceptually illustrates the structure of an activation read cache of some embodiments.

FIG. 23 conceptually illustrates the structure of a read cache 2300 of some embodiments. In some embodiments, the read cache 2300 is a sub-block of the memory control circuit (e.g., the activation memory controller 1725 of FIG. 17). In some embodiments, the read cache 2300 is used for reading both weight data into the filter slice buffers and activation data into the activation window buffers of a core. As shown, the read cache 2300 includes a cache controller 2305, a tags block 2310, a data block 2315 (the cache storage), and output multiplexers 2320 and 2325.

The cache controller 2305 receives read configuration data, which in some embodiments includes some or all of one or more memory addresses for data to be fetched (e.g., one or more addresses in the core RAM for data to be fetched), a read enable bit, a clear bit (to clear the cache), one or more mode bits (indicating in which of at least two possible modes the cache is currently operating), and data indicating whether the read data abuts or crosses a RAM word boundary. In addition, the cache controller 2305 receives clock and reset bits. As output (e.g., to other circuit blocks of the memory controller), in some embodiments the cache controller 2305 provides instructions data regarding read operations from the core memory and whether to read data from the cache data block 2315 (and in which row of the cache this data is found).

The cache controller 2305 receives one or more requested memory addresses (generated based on the read configuration data) and compares this with the memory addresses of the data stored in the cache, received from the tags block 2310. In some embodiments, when the cache is operating in a first mode for reading memory locations in order (e.g., when reading from weight memory to load weight data into the filter slice buffers), the cache controller 2305 performs two comparisons. On the other hand, when the cache is operating in a second mode that allows for reading RAM words out of order (e.g., when loading activation values for a typical convolutional layer), the cache controller 2305 performs only one comparison. When the data is already stored in the cache, the cache controller 2305 instructs the data block 2315 to output that data by providing a cache row number. Otherwise, the cache controller outputs a bit to initiate a read request from the core RAM, along with the required memory address. In some embodiments, if the requested activation data wraps across two RAM words, the cache controller 2305 outputs the incremented memory address (with the bit initiating a read request) as well as the cache row storing the matching RAM word.

The tags block 2310 stores the memory addresses (i.e., core RAM addresses) of the data stored in the data block 2315. When the contents of a memory address are written into the data block 2315, the cache controller 2305 also writes this address to the tags block 2310 (for use in later comparison operations, when a memory address is requested). As such, the tags block 2310 stores the same number of entries as the cache data block 2315, but with fewer bits. The tags block 2310 also stores one additional bit for each row, indicating whether the address data in that row is valid (the cache can be reset by setting all of these bits to the same value that indicates that the data is not valid). In some embodiments, each of these blocks is implemented as a group of registers. When instructed to by the cache controller 2305, the data block 2315 stores a RAM word read from the core memory (the write enable bit specifies which row of the cache will store this RAM word). The data block 2315 outputs its stored data to the output multiplexers 2320 and 2325.

The output multiplexers 2320 and 2325 can each output one of the rows of activation data from the data block 2315, when instructed by the cache controller 2305. The select bits from the cache controller 2305 specify, in some embodiments, which of the cache data rows are to be output by each of the multiplexers. In some embodiments, these two outputs, as well as a RAM word from the core memory, are merged by a separate circuit block of the memory controller and provided to the filter slice buffer or the activation window buffer (both of which are described below), depending on whether weight data or activation values are being read from memory. In some embodiments, the second output is used when the cache is operating in the mode for reading continuously-increasing RAM words (e.g., for weight data). Otherwise, such embodiments only output one RAM word from the cache at a time. In addition, when the merge circuit block merges activation values from the cache with activation values from a RAM word read from the core memory, some embodiments delay the output of the cache row by the latency required for the memory read operation (e.g., 5 clock cycles). This merge circuit block then shifts and merges the data as needed to provide the required set of data to the core controller (for provision to either the filter slice buffers or the activation window buffer). If the amount of data in a given cycle is less than a full RAM word (e.g., the amount of weight data or number of activation values is less than a full RAM word), in some embodiments this merge circuit block aligns the required data (e.g., weight information or activation values) such that there are no gaps within the data.

As described above, in addition to being transferred into the activation slice buffer, activations stored in RAM as shown in FIG. 22 may also be sent directly to the post-processing units via the ALU bus. The ALU bus maps activations to the PPUs for different types of operations in such a way as to take advantage of the manner in which the activations are stored in the core RAM.

FIG. 24 illustrates a table 2400 showing the mapping of ALU outputs to the different post-processing units for a neural network computation circuit of some embodiments with 64 post-processing units (PPUs) per global channel segment. In this table, the first column is a PPU index, the second, third, and fourth columns are 4-bit ALU inputs by index, and the fifth column is an 8-bit ALU input (using adjacent indexes). For a given PPU, the inputs come from the ALUs of two or more of the four cores in the cluster corresponding to the global channel segment (e.g., alu0 is the ALU for core 0, alu1 is the ALU for core 1, etc.). The first two inputs (alu_a, alu_b) to each post-processing unit are output from the same index of two different cores (e.g., post-processing unit 27 receives the output from index 27 from cores 0 and 2). In some embodiments, this structure is repeated for each global channel segment with a set of PPUs and four cores that can store activation inputs.

In some embodiments, the different inputs are reserved for different types of math operations. In the example of FIG. 24, alu_a is selected for pooling operations (average or maximum) from cores 0 and 1, and alu_b is selected for pooling operations from cores 2 and 3. The third input alu_c is selected for element-wise operations (e.g. addition or multiplication). As discussed above, the fourth input alu_d is selected for any operations requiring 8-bit values. Based on the type of operation being performed, configuration data provided to the PPUs specifies which of these inputs to select.

As discussed above with reference to FIG. 20, layers of activations are stored as RAM words in the activation memory of the cores. As noted above, these words may have different lengths in different embodiments. For example, if the words are each 128 bits long and the activation values are each 4-bit values (as is the case in some embodiments), then a single word can hold 32 activation values. During a single clock cycle, the activation memory controller can output a single RAM word to the ALU bus. Accordingly, for 128-bit words and 4-bit activations, 32 activations can be read from each core simultaneously. When larger 8-bit activation values are used, then the corresponding block size is 16 activation values per core. For the subsequent discussion, 4-bit activations and 128-bit words are assumed for purposes of explanation.

In the example of FIG. 24, two inputs (alu_a and alu_b) are used for pooling operations, and each have indices that range from 0 to 32 from each of two cores. Therefore, for pooling operations a maximum block size of 32 activations per core can be output during a single clock cycle. The third input (alu_c) is used for element-wise operations, and has indices that range from 0 to 16 for each of all four cores in the cluster. Therefore, for element-wise operations a maximum block size of 16 activations per core are output during a single clock cycle, leaving 16 activations per core unused in some embodiments. The fourth input (alu_d) is used for 8-bit activations from all four cores, with a maximum block size of 16 (8-bit) activations per core. As noted above, for non-dot product computations the activations are directly sent to the ALU bus from the core controller, and do not need to be sent to the activation window buffers. In some embodiments, these activations are still read to and output from the read cache shown in FIG. 23. The read cache output data is directed to the ALU bus rather than to the activation window buffer when the configuration data specifies for ALU operations to be performed.

For pooling operations (e.g., average or maximum pooling), a group of activations from a single layer are combined. Specifically, typical pooling operations combine adjacent activation values from the same grid of a layer (i.e., activation values that have adjacent (x,y) coordinates in a single grid as illustrated in FIG. 21). These pooling operations effectively reduce the dimensions of the layer (i.e., downsampling the layer) by combining the input activation values in 2×2, 3×3, etc. portions of a grid into a single pooled output activation value.

According to the activation storage rules of some embodiments described above with reference to FIG. 22), each core used for storing activation values of a particular layer stores all of the activations in a subset of the grids of that particular layer. Thus, groups of activations to be pooled together are all stored in the same core. In some embodiments, each grid stored together in a block in a given core is pooled at the same time (up to the maximum of 32 grids in a storage block). That is, all of the values to be pooled together within a first grid are sent to the same PPU (over multiple clock cycles, as each PPU only processes one activation value per clock cycle).

As an example, 2×2 pooling (as described above with reference to FIGS. 13 and 14) will be described for the activations in grids 0-31 of FIG. 21. This 2×2 pooling downsamples each grid by a factor of 4, resulting in 9 values in each grid (3×3) instead of 36 values each grid (6×6). The retrieval of activations from core memory and input to the PPUs will now be discussed in detail for this illustrative example.

With 32 grids in the layer, the activation values are evenly divided across the four cores of a cluster, with 8 grids per core, as shown in FIG. 22. Therefore, to ensure that each PPU receives activations from the same grid during each clock cycle, a read block size of 8 activations is used in some embodiments (i.e., of the 32 available PPUs, only the first 8 are used). As illustrated in FIG. 22, core 0 stores grids 0, 4, 8, 12, 16, 20, 24, and 28; core 1 stores grids 1, 5, 9, 13, 17, 21, 25, and 29; core 2 stores grids 2, 6, 10, 14, 18, 22, 26, and 30; and core 3 stores grids 3, 7, 11, 15, 19, 23, 27, and 31. As an example, pooling of the activations from the first grid (grid 0) is described; however, the same discussion below applies to pooling the activations from the other grids. Specifically, some embodiments first use PPUs 0-7 to pool the 8 grids stored in core 0 while at the same time using PPUs 32-39 to pool the 8 grids stored in core 1. Once pooling has been completed for these grids, the circuit then uses PPUs 0-7 to pool the 8 grids stored in core 1 while at the same time using PPUs 32-39 to pool the 8 grids stored in core 3.

To pool the first 2×2 sub-grid of four activation values {(0,0,0), (1,0,0), (0,1,0), (1,1,0)} from the first grid (grid 0) in FIG. 21, these activation values are read from the appropriate core and delivered to the same PPU over four clock cycles. As shown in FIG. 22, these four activation values are stored in the activation memory of core 0, in the first and ninth nibbles of words K and K+2.

Therefore, the read controller of core 0 reads word K and then word K+2 into the read cache, and initially provides the first 8 activation values {(0,0,0) . . . (0,0,28)} to PPUs 0-7 during the first clock cycle of the pooling computation (some embodiments wait until word K+2 is read into the cache before outputting the first 8 values from the cache, so that the PPUs receive all of the values to be pooled in immediately subsequent clock cycles). PPU 0 receives the first activation value (0,0,0) and stores this value in register 1220 (as per FIG. 13 or 14, depending on whether average or max pooling is being performed). During the next clock cycle, the read controller provides the next 8 activation values from word K {(1,0,0) . . . (1,0,28)} to PPUs 0-7. PPU 0 receives the first activation value output from the cache (1,0,0), which is actually the ninth activation value stored in word K. PPU 0 performs the pooling operation (as described above with reference to FIGS. 13 and 14) on the two activation values (0,0,0) and (1,0,0) and stores the result in the register 1220.

The read controller of core 0, which has stored word K+2 in the read cache as well, next provides the first 8 activations {(0,1,0) . . . (0,1,28)} of work K+2 to PPUs 0-7 during the next (third) clock cycle of the pooling operation. PPU 0 receives the first activation value (0,1,0), and performs the pooling operation to combine this activation value with the result from register 1220 of the previous pooling operation, and stores the result in the register. During the next (fourth) clock cycle, the read controller provides the next 8 activation values from word K+2 {(1,1,0) . . . (1,1,28)} to PPUs 0-7. PPU 0 receives the first activation value output from the cache (1,1,0), which is actually the ninth activation value stored in word K+2. PPU 0 performs the pooling operation to combine this activation value with the result from register 1220 of the previous pooling operation, and stores the final result in the register. At this point, the ALU datapath 1200 has pooled all four activations {(0,0,0), (1,0,0), (0,1,0), (1,1,0)}. This pooling result is output to the multiplexer 1015, which is configured to select the ALU input (rather than the dot product input), so that post-processing can be performed on the pooling result, which is then output to be stored in core memory as an input for the next layer of the neural network.

The example above is a simple case of pooling within a grid (intra-grid pooling). Pooling can however by performed on larger sub-grids within each grid, e.g. 3×3, 4×4, etc. Further, the pooling sub-grid can be non-rectangular in some embodiments. Inter-grid pooling across multiple grids may also be performed in some embodiments, or pooling may be performed on other subsets of activations from a layer. For these different pooling geometries, in some embodiments the activation storage rules for pooling operations may be different in some embodiments than that shown in FIG. 22. The storage of the activation values from a previous dot-product computation layer may also be rearranged optimally for alternative pooling operations by using post or copy operations.

For element-wise operations (e.g., multiplication or addition), activations from multiple different layers are combined. Typically, activations from two layers of the neural network are added or multiplied, though some embodiments allow for more than two layers to be combined and/or for other operations to be performed. As a typical example, activation values that have the same (x,y,z) coordinate in two different layers are combined. In this case, the two layers will generally have the same dimension sizes in order for element-wise operations to be performed. To use the example illustrated in FIG. 21, the activation values at each (x,y,z) coordinate of layer K are combined with the values at the identical (x,y,z) coordinate of layer K+1 (Note: the indices K represent different entities in FIG. 21 than they do in FIG. 22). According to the activation storage rules of some embodiments described above with reference to FIG. 22, each core used for storing activation values of a particular layer stores all of the activations in a subset of the grids of that particular layer. In addition, when two identically-sized layers are to be combined in an element-wise operation layer, the compiler of some embodiments ensures that the grids of the first layer are stored in the same cores as the corresponding grids of the second layer.

For example, suppose that the activations in grids 0-31 of layer K (shown in FIG. 21) are to be combined with the activations in corresponding grids 0-31 of layer K+1 using an element-wise operation, as described above by reference to FIGS. 15 and 16. The activations of layer K are stored across four cores 0-3 as shown in FIG. 22, and the activations of layer K+1 would be stored across the same four cores 0-3, with the same eight grids of activations stored in each of the four cores.

The retrieval of these activations from core memory by the read controller and the provision of this data to the PPUs will now be discussed in detail for this illustrative example. As illustrated in FIG. 24, the input alu_c is reserved for element-wise operations, with PPUs 0-15 receiving activations from core 0, PPUs 16-31 receiving activations from core 1, PPUs 32-47 receiving activations from core 2, and PPUs 48-63 receiving activations from core 3. Thus, some embodiments use a fixed read block size of 16 for these element-wise operations. Because activations from the same layer do not need to be combined in any way (as they are for dot products or pooling operations), the actual block size of the activations in storage can be ignored in some embodiments. That is, the number of grids stored in each core is inconsequential to these operations, as 16 values from one layer are output from each core in a first cycle and the corresponding 16 values from the other layer are output from each core in the next clock cycle. In this case, the read controller can proceed sequentially through the RAM words in each core, rather than jumping back and forth.

Thus, in the example, the read controller in each core initially reads word K from the core memory, as well as the corresponding RAM word for layer K+1, an stores these two RAM words in the cache. In some embodiments, while the element-wise operations are being performed on these values, the next words of activations for each layer are also read into the cache. During the first cycle of computation, the read controllers in the various cores provide the first 16 activation values from RAM word K in core 0 {(0,0,0) . . . (1,0,28)} to PPUs 0-15, the first 16 activation values from RAM word K in core 1 {(0,0,1) . . . (1,0,29)} to PPUs 16-31, the first 16 activation values from RAM word K in core 2 {(0,0,2) . . . (1,0,30)} to PPUs 32-47, and the first 16 activation values from RAM word K in core 3 {(0,0,3) . . . (1,0,31)} to PPUs 48-63. Each of these PPUs stores this RAM word in its register 1220.

In the subsequent clock cycle, the read controllers in each core provide the corresponding activation values of layer K+1 from their respective cores to the PPUs. That is, the read controllers of the various cores provide the activation values {(0,0,0) . . . (1,0,28)} of layer K+1 from core 0 to PPUs 0-15, the activation values {(0,0,1) . . . (1,0,29)} of layer K+1 from core 1 to PPUs 16-31, the first activation values {(0,0,2) . . . (1,0,30)} of layer K+1 from core 2 to PPUs 32-47, and the activation values {(0,0,3) . . . (1,0,31)} from core 3 to PPUs 48-63. Depending on the configuration data received at the PPUs, each of these PPUs performs the appropriate element-wise operation to combine these values with the corresponding layer K values stored in their respective registers 1220, and provides these values to the additional post-processing operations shown in FIG. 10 (via the multiplexers 1015, configured to select from the ALU input datapaths 1200). In subsequent clock cycles, the next 16 values are output for layer K, which are combined with the corresponding 16 values for layer K+1, and so on.

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT devices), etc.

Figure 25:
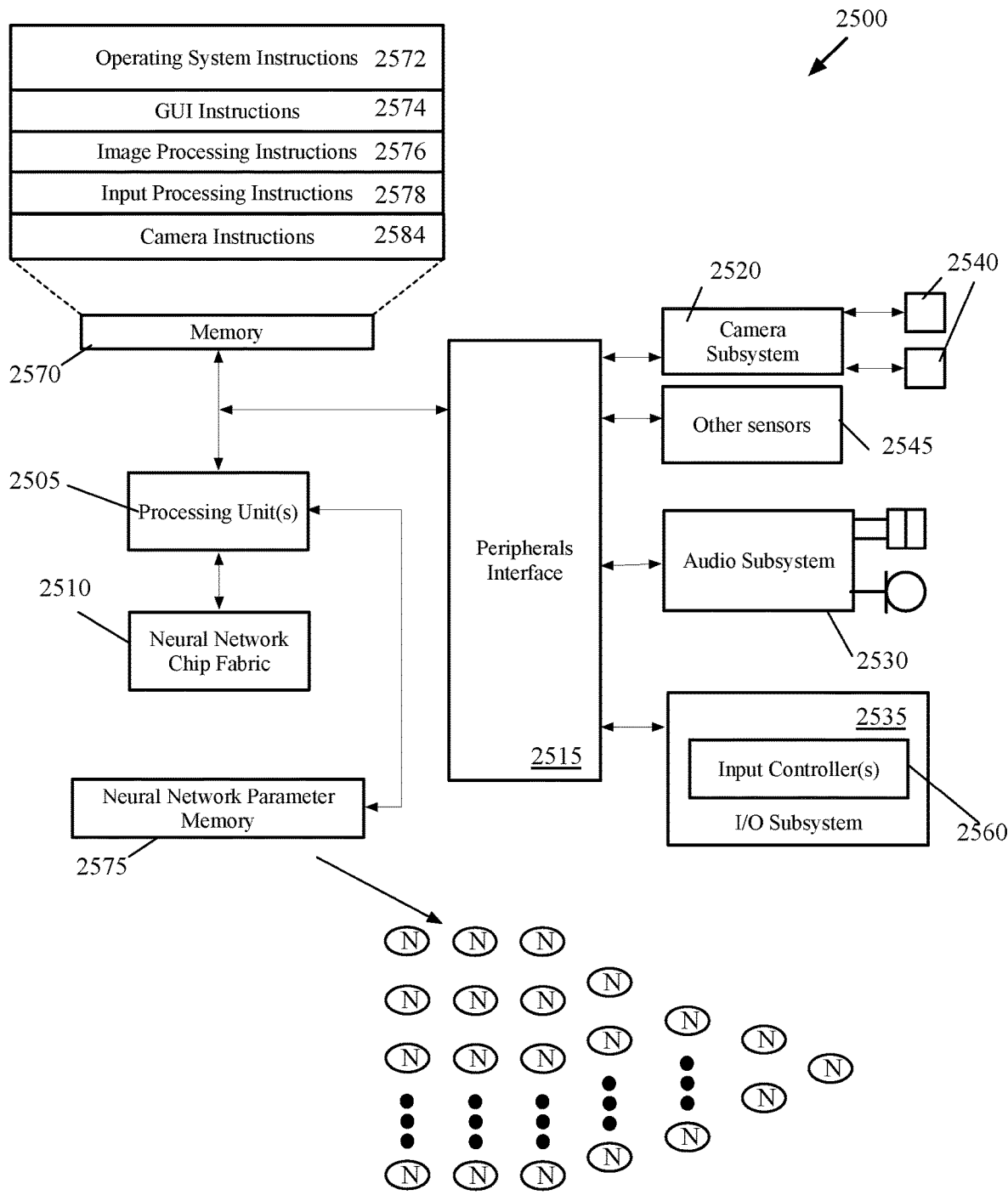
FIG. 25 is an example of an architecture of an electronic device that includes the neural network integrated circuit of some embodiments.

FIG. 25 is an example of an architecture 2500 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 2500 includes one or more general-purpose processing units 2505, a neural network chip fabric 2510, and a peripherals interface 2515.

The peripherals interface 2515 is coupled to various sensors and subsystems, including a camera subsystem 2520, an audio subsystem 2530, an I/O subsystem 2535, and other sensors 2545 (e.g., motion/acceleration sensors), etc. The peripherals interface 2515 enables communication between the processing units 2505 and various peripherals. For example, an orientation sensor (e.g., a gyroscope) and an acceleration sensor (e.g., an accelerometer) can be coupled to the peripherals interface 2515 to facilitate orientation and acceleration functions. The camera subsystem 2520 is coupled to one or more optical sensors 2540 (e.g., charged coupled device (CCD) optical sensors, complementary metal-oxide-semiconductor (CMOS) optical sensors, etc.). The camera subsystem 2520 and the optical sensors 2540 facilitate camera functions, such as image and/or video data capturing.

The audio subsystem 2530 couples with a speaker to output audio (e.g., to output voice navigation instructions). Additionally, the audio subsystem 2530 is coupled to a microphone to facilitate voice-enabled functions, such as voice recognition, digital recording, etc. The I/O subsystem 2535 involves the transfer between input/output peripheral devices, such as a display, a touch screen, etc., and the data bus of the processing units 2505 through the peripherals interface 2515. The I/O subsystem 2535 various input controllers 2560 to facilitate the transfer between input/output peripheral devices and the data bus of the processing units 2505. These input controllers 2560 couple to various input/control devices, such as one or more buttons, a touch-screen, etc.

In some embodiments, the device includes a wireless communication subsystem (not shown in FIG. 25) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 25, a memory 2570 (or set of various physical storages) stores an operating system (OS) 2572. The OS 2572 includes instructions for handling basic system services and for performing hardware dependent tasks. The memory 2570 also stores various sets of instructions, including (1) graphical user interface instructions 2574 to facilitate graphic user interface processing; (2) image processing instructions 2576 to facilitate image-related processing and functions; (3) input processing instructions 2578 to facilitate input-related (e.g., touch input) processes and functions; and (4) camera instructions 2584 to facilitate camera-related processes and functions. The processing units 2510 execute the instructions stored in the memory 2570 in some embodiments.

The memory 2570 may represent multiple different storages available on the device 2500. In some embodiments, the memory 2570 includes volatile memory (e.g., high-speed random access memory), non-volatile memory (e.g., flash memory), a combination of volatile and non-volatile memory, and/or any other type of memory.

The instructions described above are merely exemplary and the memory 2570 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 2575 stores the weight values, bias parameters, etc. for implementing one or more machine-trained networks by the neural network chip fabric 2510. As mentioned above, different clusters of cores of the fabric 2510 can implement different machine-trained networks in parallel in some embodiments. In different embodiments, these neural network parameters are stored on-chip (i.e., in memory that is part of the neural network chip fabric 2510) or loaded onto the IC 2510 from the neural network parameter memory 2575 via the processing unit(s) 2505.

While the components illustrated in FIG. 25 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 2505 and the neural network IC 2510, which enables the processing units 2505 to provide inputs to the neural network IC 2510 and receive the outputs of the network from the IC 2510. Also, while many of the functions have been described as being performed by one component, one of ordinary skill in the art will realize that the functions described with respect to FIG. 25 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 26:
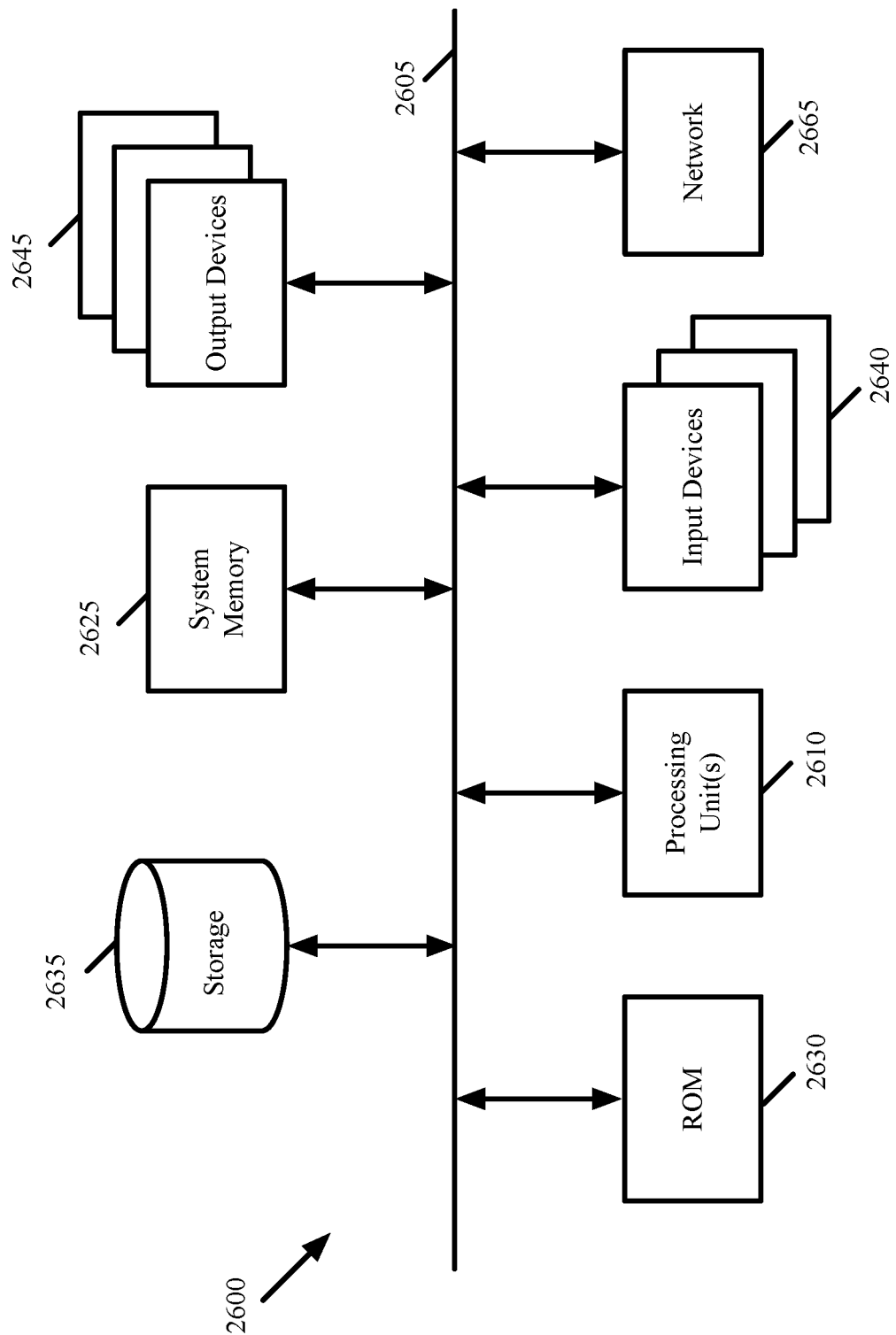
FIG. 26 conceptually illustrates an electronic system with which some embodiments of the invention are implemented.

FIG. 26 conceptually illustrates an electronic system 2600 with which some embodiments of the invention are implemented. The electronic system 2600 can be used to execute any of the control and/or compiler systems described above in some embodiments. The electronic system 2600 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2600 includes a bus 2605, processing unit(s) 2610, a system memory 2625, a read-only memory 2630, a permanent storage device 2635, input devices 2640, and output devices 2645.

The bus 2605 collectively represents all system, peripheral, and chipset buses that communicatively connect the numerous internal devices of the electronic system 2600. For instance, the bus 2605 communicatively connects the processing unit(s) 2610 with the read-only memory 2630, the system memory 2625, and the permanent storage device 2635.

From these various memory units, the processing unit(s) 2610 retrieves instructions to execute and data to process in order to execute the processes of the invention. The processing unit(s) may be a single processor or a multi-core processor in different embodiments.

The read-only-memory (ROM) 2630 stores static data and instructions that are needed by the processing unit(s) 2610 and other modules of the electronic system. The permanent storage device 2635, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive) as the permanent storage device 2635.

Other embodiments use a removable storage device (such as a floppy disk, flash drive, etc.) as the permanent storage device. Like the permanent storage device 2635, the system memory 2625 is a read-and-write memory device. However, unlike storage device 2635, the system memory is a volatile read-and-write memory, such a random-access memory. The system memory stores some of the instructions and data that the processor needs at runtime. In some embodiments, the invention's processes are stored in the system memory 2625, the permanent storage device 2635, and/or the read-only memory 2630. From these various memory units, the processing unit(s) 2610 retrieves instructions to execute and data to process in order to execute the processes of some embodiments.

The bus 2605 also connects to the input and output devices 2640 and 2645. The input devices enable the user to communicate information and select commands to the electronic system. The input devices 2640 include alphanumeric keyboards and pointing devices (also called "cursor control devices"). The output devices 2645 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 26, bus 2605 also couples electronic system 2600 to a network 2665 through a network adapter (not shown). In this manner, the computer can be a part of a network of computers (such as a local area network ("LAN"), a wide area network ("WAN"), or an Intranet, or a network of networks, such as the Internet. Any or all components of electronic system 2600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A neural network inference circuit for executing a neural network comprising a plurality of layers of computation nodes, the neural network inference circuit comprising:
   a first circuit that outputs dot products for computation nodes of a first set of neural network layers, said first set of layers comprising computation nodes that include dot product computations of sets of weight values with sets of input values;
   a second circuit that outputs values for computation nodes of a second set of neural network layers, said second set of layers comprising computation nodes that apply a set of calculations that do not include dot products to sets of input values; and
   a selection circuit that selects (i) a dot product output from the first circuit when a current layer being processed by the neural network inference circuit belongs to the first set of layers and (ii) a non-dot product output from the second circuit when the current layer belongs to the second set of layers.

2. The neural network inference circuit of claim 1, wherein the second set of layers comprises a pooling layer, wherein each computation node of the pooling layer combines a different plurality of the input values of the layer such that the pooling layer has fewer output values than input values.

3. The neural network inference circuit of claim 2, wherein each computation node of the pooling layer averages its respective plurality of input values.

4. The neural network inference circuit of claim 2, wherein each computation node of the pooling layer identifies a maximum value of its respective plurality of input values.

5. The neural network inference circuit of claim 1, wherein the second set of layers comprises an element-wise operation layer, wherein each computation node of the element-wise operation layer combines a first input value that is an output value of a first particular layer and a second input value that is an output value of a second particular layer.

6. The neural network inference circuit of claim 5, wherein combining the first and second input values comprises adding the first and second input values.

7. The neural network inference circuit of claim 5, wherein combining the first and second input values comprises multiplying the first and second input values.

8. The neural network inference circuit of claim 5, wherein the first particular layer and second particular layer each belong to the first set of layers and each have a same number of computation nodes.

9. The neural network inference circuit of claim 1, wherein the selection circuit is a multiplexer that receives data from each of the first and second circuits and selects the data from one of the circuits based on configuration data.

10. The neural network inference circuit of claim 9, wherein the configuration data is received from a controller circuit.

11. The neural network inference circuit of claim 1, wherein the first circuit, second circuit, and selection circuit are part of a post-processing circuit of the neural network inference circuit.

12. The neural network inference circuit of claim 11 further comprising a plurality of post-processing circuits that each comprises a corresponding first circuit, second circuit, and selection circuit.

13. The neural network inference circuit of claim 12, wherein each respective selection circuit of a respective post-processing circuit in the plurality of post-processing circuits makes a same selection of the respective non-dot product output from the respective second circuit when the current layer belongs to the second set of layers.

14. The neural network inference circuit of claim 13, wherein each of the selection circuits makes the same selection based on receiving a same set of configuration data.

15. The neural network inference circuit of claim 11, wherein the post-processing circuit further comprises a third circuit for performing additional post-processing operations on the output selected by the selection circuit.

16. The neural network inference circuit of claim 15, wherein the third circuit comprises (i) an adder circuit for adding a first predetermined value to the selected output and (ii) a multiplier circuit for multiplying an output of the adder circuit by a second predetermined value.

17. The neural network inference circuit of claim 15, wherein the third circuit comprises a set of circuits that set an output of the post-processing circuit to a desired precision and number of bits.

18. The neural network inference circuit of claim 17, wherein the output of the post-processing circuit is transported to a memory of the neural network inference circuit for storage.

19. The neural network inference circuit of claim 1 further comprising a plurality of cores for (i) computing partial dot products to provide to the first circuit and (ii) storing the sets of input values.

20. The neural network inference circuit of claim 19, wherein the cores provide sets of input values for layers of the second set of layers directly to the second circuit.

* * * * *